US012799333B2

(12) United States Patent
Welker et al.

(10) Patent No.: US 12,799,333 B2
(45) Date of Patent: Nov. 17, 2026

(54) COMPOSITION FORMED FROM A CALCIUM OR MAGNESIUM CARBONATE-COMPRISING MATERIAL AND A SURFACE-TREATMENT COMPOSITION COMPRISING AT LEAST ONE CROSS-LINKABLE COMPOUND

(71) Applicant: OMYA INTERNATIONAL AG, Oftringen (CH)

(72) Inventors: Matthias Welker, Hésingue (FR); Samuel Rentsch, Spiegel bei Bern (CH)

(73) Assignee: OMYA INTERNATIONAL AG, Oftringen (CH)

( * ) Notice: Subject to any disclaimer, the term of this patent is extended or adjusted under 35 U.S.C. 154(b) by 648 days.

(21) Appl. No.: 17/928,212

(22) PCT Filed: Jul. 15, 2021

(86) PCT No.: PCT/EP2021/069737
§ 371 (c)(1),
(2) Date: Nov. 28, 2022

(87) PCT Pub. No.: WO2022/013344
PCT Pub. Date: Jan. 20, 2022

(65) Prior Publication Data

US 2023/0220212 A1 Jul. 13, 2023

(30) Foreign Application Priority Data

Jul. 16, 2020 (EP) .................................... 20186199

(51) Int. Cl.

| | |
|---|---|
| ***C09C 1/02*** | (2006.01) |
| ***C08J 3/20*** | (2006.01) |
| ***C08J 3/24*** | (2006.01) |
| ***C08K 9/02*** | (2006.01) |
| ***C08L 9/06*** | (2006.01) |

(52) U.S. Cl.
CPC ................. *C09C 1/024* (2013.01); *C08J 3/20* (2013.01); *C08J 3/247* (2013.01); *C08K 9/02* (2013.01); *C08L 9/06* (2013.01); *C01P 2004/61* (2013.01); *C01P 2004/62* (2013.01); *C01P 2006/12* (2013.01); *C01P 2006/82* (2013.01); *C08J 2309/06* (2013.01)

(58) Field of Classification Search
CPC .. C09C 1/024; C09C 1/42; C09C 1/02; C09C 1/021; C08J 3/20; C08J 3/247; C08J 2309/06; C08K 9/02; C08K 3/346; C08K 9/06; C08K 2201/005; C08K 2201/006; C08K 2003/265; C08L 9/06; C08L 23/16; C01P 2004/61; C01P 2004/62; C01P 2006/12; C01P 2006/82; C01P 2004/51
See application file for complete search history.

(56) References Cited

U.S. PATENT DOCUMENTS

| | | | | |
|---|---|---|---|---|
| 3,374,198 | A | 3/1968 | Luigi et al. | |
| 2012/0202919 | A1 | 8/2012 | Prasse | |
| 2018/0016421 | A1 | 1/2018 | Utsumi et al. | |
| 2018/0355182 | A1* | 12/2018 | Ippolito | C09C 1/021 |
| 2023/0174741 | A1* | 6/2023 | Welker | C08J 3/2053 524/425 |

FOREIGN PATENT DOCUMENTS

| | | | | |
|---|---|---|---|---|
| EP | 1546265 | A2 | 4/2004 | |
| EP | 2496648 | B1 * | 4/2016 | C09C 3/08 |
| EP | 3192837 | A1 * | 7/2017 | C08K 3/26 |
| JP | S55-113619 | A | 9/1980 | |
| JP | S59-199702 | A | 11/1984 | |
| JP | 2003-112920 | A | 4/2003 | |

OTHER PUBLICATIONS

Ricon®-130-MA8_Data Sheet (Year: 2024).*
Sep. 23, 2021 International Search Report issued in International Patent Application No. PCT/EP2021/069737.
Sobhy, Maged S. et al. "Cure Characteristics and Physiomechanical Properties of Calcium Carbonate Reinforcement Rubber Composites". Egypt. J. Sol., vol. 26, No. 2, 2003, pp. 241-257.
Gane, Patrick A. et al. "Void Space Structure of Compressible Polymer Spheres and Consolidated Calcium Carbonate Paper-Coating Formulations". Ind. Eng. Chem. Res., 1996, vol. 35, No. 5, pp. 1753-1764.
Rothon, Roger N., M. Xanthos (Ed.) "Functional Polymers and Other Modifiers". Functional Fillers for Plastics, 2005, pp. 105-128.
Sep. 23, 2021 Written Opinion of the International Searching Authority issued in International Patent Application No. PCT/EP2021/069737.

* cited by examiner

*Primary Examiner* — Anthony J Green
*Assistant Examiner* — Anastasia A. Kuvayskaya
(74) *Attorney, Agent, or Firm* — Oliff PLC

(57) ABSTRACT

A composition formed from a calcium or magnesium carbonate-including material and a surface-treatment composition including at least one cross-linkable compound, a dry process for the preparation of such a composition, a curable elastomer mixture comprising an elastomer resin and the composition, a cured elastomer product formed from the curable elastomer mixture, a process for preparing the cured elastomer product, the use of at least one cross-linkable compound including at least two functional groups, wherein at least one functional group is suitable for cross-linking an elastomer resin and wherein at least one functional group is suitable for reacting with the calcium or magnesium carbonate-including material in the compounding of an elastomer formed from an elastomer resin and at least one calcium or magnesium carbonate-comprising material as filler as well as an article formed from the cured elastomer product.

19 Claims, No Drawings

COMPOSITION FORMED FROM A CALCIUM OR MAGNESIUM CARBONATE-COMPRISING MATERIAL AND A SURFACE-TREATMENT COMPOSITION COMPRISING AT LEAST ONE CROSS-LINKABLE COMPOUND

The present invention relates to a composition formed from a calcium or magnesium carbonate-comprising material and a surface-treatment composition comprising at least one cross-linkable compound, a dry process for the preparation of such a composition, a curable elastomer mixture comprising an elastomer resin and the composition, a cured elastomer product formed from the curable elastomer mixture, a process for preparing the cured elastomer product, the use of at least one cross-linkable compound comprising at least two functional groups, wherein at least one functional group is suitable for cross-linking an elastomer resin and wherein at least one functional group is suitable for reacting with the calcium or magnesium carbonate-comprising material in the compounding of an elastomer formed from an elastomer resin and at least one calcium or magnesium carbonate-comprising material as filler as well as an article formed from the cured elastomer product.

Elastomers, also commonly termed rubbers, are cross-linked polymeric materials having rubber-like elasticity, i.e., the ability of reversible deformation upon application of an external deforming force. Elastomers have found widespread application, for example in tubeless articles, membranes, sealings, gloves, pipes, cable, electrical connectors, oil hoses, shoe soles, O-ring seals, shaft seals, gaskets, tubing, valve stem seals, fuel hose, tank seals, diaphragms, flexi liners for pumps, mechanical seals, pipe coupling, valve lines, military flare blinders, electrical connectors, fuel joints, roll covers, firewall seals, clips for jet engines, and the like.

It is common in the art to add certain fillers to the elastomer compositions, for example, in order to improve the mechanical properties. Commonly employed reinforcing fillers include carbon black, (modified) silica particles, kaolin and other clays. However, these fillers have certain disadvantages. For example, carbon black cannot be used as filler for insulating cables because it is highly conductive. The color of carbon black also imposes restrictions with respect to its application, and filler materials such as carbon black or modified silica are difficult to handle due to health safety and environmental concerns. Furthermore, elastomers containing these filler material may be still deficient with respect to tear resistance. They may break easily during processing, for example, when there is a notch already existing. This may be particularly the case when the elastomer is still hot, for example, during unmolding.

The use of ground calcium carbonate and precipitated calcium carbonate in elastomer compositions has been reported. For example, U.S. Pat. No. 3,374,198 A discloses compositions comprising ethylene-propylene rubbers and calcium carbonate as a reinforcing filler. Sobhy et al. (Egyptian Journal of Solids 2003, 26, 241-257) report on the cure characteristics and mechanical properties of natural rubber and nitrile rubber filled with calcium carbonate.

EP3192837 A1 refers to a surface-modified calcium carbonate, which is surface-treated with an anhydride or acid or salt thereof, and suggests its use inter alia in polymer compositions, papermaking, paints, adhesives, sealants, pharma applications, crosslinking of rubbers, polyolefins, polyvinyl chlorides, in unsaturated polyesters and in alkyd resins.

In view of the foregoing, there is an ongoing need for elastomers with excellent mechanical properties.

Accordingly, it is an object of the present invention to provide an elastomer with excellent mechanical properties, and in particular, with an improved tear resistance, improved tensile modulus, tensile strength and/or elongation at break. Furthermore, it is desirable to provide an elastomer with good processability.

The foregoing and other objects are solved by the subject-matter as defined in the independent claims. Advantageous embodiments of the present invention are defined in the corresponding subclaims.

According to one aspect of the present invention, a composition is provided which is formed from a calcium or magnesium carbonate-comprising material selected from among sedimentary ground calcium carbonate (GCC), precipitated calcium carbonate (PCC), surface-reacted calcium carbonate (SRCC), precipitated hydromagnesite and mixtures thereof, and from 0.5 to 10 wt.-%, based on the total weight of the calcium or magnesium carbonate-comprising material, of a surface-treatment composition comprising at least one cross-linkable compound comprising at least two functional groups, wherein at least one functional group is suitable for cross-linking an elastomer resin and wherein at least one functional group is suitable for reacting with the calcium or magnesium carbonate-comprising material.

According to one embodiment, the sedimentary ground calcium carbonate (GCC) is selected from the group consisting of marble, limestone, dolomite, chalk and mixtures thereof, or the precipitated calcium carbonate (PCC) is selected from the group consisting of the aragonitic, vateritic and calcitic mineralogical crystal forms, colloidal PCC, and mixtures thereof, preferably the calcium carbonate-comprising material is sedimentary ground calcium carbonate.

According to another embodiment, the calcium carbonate-comprising material is sedimentary ground calcium carbonate (GCC) and/or precipitated calcium carbonate (PCC) and has i) a weight median particle size $d_{50}$ value measured by the sedimentation method in the range from 0.1 μm to 10 μm, preferably in the range from 0.15 μm to 5 μm, more preferably in the range from 0.2 μm to 3 μm and most preferably in the range from 0.25 μm to 3 μm, e.g. from 0.3 μm to 2 μm or from 0.3 μm to 1.5 μm, and/or ii) a top cut ($d_{98}$) measured by the sedimentation method of ≤45 μm, preferably of ≤30 μm, more preferably of ≤20 μm and most preferably of ≤15 μm, and/or iii) a specific surface area (BET) of from 0.5 to 150 $m^2/g$ as measured using nitrogen and the BET method according to ISO 9277:2010, preferably from 1 to 80 $m^2/g$, and/or iv) a residual total moisture content of ≤2 wt.-%, based on the total dry weight of the at least one calcium carbonate-comprising material, preferably ≤1.5 wt.-%, more preferably ≤1.2 wt.-%, and most preferably ≤0.8 wt.-%.

According to yet another embodiment, the calcium carbonate-comprising material is surface-reacted calcium carbonate (SRCC) being a reaction product of (sedimentary) ground calcium carbonate or precipitated calcium carbonate with carbon dioxide and one or more $H_3O^+$ ion donors, wherein the carbon dioxide is formed in situ by the $H_3O^+$ ion donors treatment or the magnesium carbonate-comprising material is precipitated hydromagnesite and has i) a volume median particle size $d_{50}$ from 0.1 to 75 μm, preferably from 0.5 to 50 μm, more preferably from 1 to 40 μm, even more preferably from 1.2 to 30 μm, and most preferably from 1.5 to 15 μm, and/or ii) a volume top cut particle size $d_{98}$ from 0.2 to 150 μm, preferably from 1 to 100 μm, more preferably from 2 to 80 μm, even more preferably from 2.4 to 60 μm, and most preferably from 3 to 30 μm, and/or iii) a specific surface area of from 15 $m^2/g$ to 200 $m^2/g$, preferably from 20 $m^2/g$ to 180 $m^2/g$, more preferably from 25 $m^2/g$ to 140 $m^2/g$, even more preferably from 27 $m^2/g$ to 120 $m^2/g$, and most preferably from 30 $m^2/g$ to 100 $m^2/g$, measured using nitrogen and the BET method.

According to one embodiment, the at least one functional group that is suitable for reacting with the calcium or magnesium carbonate-comprising material of the cross-linkable compound comprises one or more terminal triethoxysilyl, trimethoxysilyl and/or organic acid anhydride and/or salts thereof and/or carboxylic acid group(s) and/or salts thereof.

According to another embodiment, the cross-linkable compound is at least one grafted polymer comprising at least one succinic anhydride group obtained by grafting maleic anhydride onto a homo- or copolymer comprising butadiene units and optionally styrene units or a sulfur-containing trialkoxysilane, preferably a compound comprising two trialkoxysilyl alkyl groups linked with a polysulfide.

According to yet another embodiment, the at least one grafted polymer is a) a grafted polybutadiene homopolymer comprising at least one succinic anhydride group obtained by grafting maleic anhydride onto a polybutadiene homopolymer and having i) a number average molecular weight Mn measured by gel permeation chromatography from 1000 to 20000 g/mol, preferably from 1400 to 15000 g/mol, and more preferably from 2000 to 10000 g/mol, and/or ii) a number of functional groups per chain in the range from 2 to 12, preferably from 2 to 9, and more preferably from 2 to 6, and/or iii) an anhydride equivalent weight in the range from 400 to 2200, preferably from 500 to 2000, and more preferably from 550 to 1800, or b) a grafted polybutadiene-styrene copolymer comprising at least one succinic anhydride group obtained by grafting maleic anhydride onto a polybutadiene-styrene copolymer and having a 1,2 vinyl content from 20 to 80 mol.-%, preferably from 20 to 40 mol.-%, based on the total weight of the grafted polybutadiene-styrene copolymer.

According to one embodiment, the composition is formed in that the at least one calcium or magnesium carbonate-comprising material and the at least one cross-linkable compound are provided as physical mixture and/or in that the at least one calcium or magnesium carbonate-comprising material is contacted with the at least one cross-linkable compound such that a treatment layer comprising the at least one cross-linkable compound and/or salty reaction products thereof is formed on the surface of the at least one calcium or magnesium carbonate-comprising material.

According to another embodiment, the surface-treatment composition further comprises at least one further surface-treatment agent selected from the group consisting of I) a phosphoric acid ester blend of one or more phosphoric acid mono ester and/or salts thereof and/or one or more phosphoric acid di-ester and/or salts thereof, and/or II) at least one saturated or unsaturated aliphatic linear or branched carboxylic acid and/or salts thereof, preferably at least one aliphatic carboxylic acid having a total amount of carbon atoms from C4 to C24 and/or a salt thereof, more preferably at least one aliphatic carboxylic acid having a total amount of carbon atoms from C12 to C20 and/or a salt thereof, most preferably at least one aliphatic carboxylic acid having a total amount of carbon atoms from C16 to C18 and/or a salt thereof and/or III) at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or IV) at least one polydialkylsiloxane, and V) mixtures of one or more materials according to I) to IV).

According to a further aspect of the present invention, a dry process for the preparation of the composition as defined herein is provided, the process comprises at least the steps of:

a) providing a calcium or magnesium carbonate-comprising material selected from among sedimentary ground calcium carbonate (GCC), precipitated calcium carbonate (PCC), surface-reacted calcium carbonate (SRCC), precipitated hydromagnesite and mixtures thereof;

b) providing at least one cross-linkable compound comprising at least two functional groups, wherein at least one functional group is suitable for cross-linking an elastomer resin and wherein at least one functional group is suitable for reacting with the calcium or magnesium carbonate-comprising material in an amount from 0.1 to 10 $mg/m^2$, based on the total weight of the calcium or magnesium carbonate-comprising material, c) optionally providing at least one further surface-treatment agent as defined herein, d) optionally heating the at least one cross-linkable compound, and e) contacting the calcium or magnesium carbonate-comprising material under mixing, in one or more steps, with the at least one cross-linkable compound, f) if present, heating the at least one further surface-treatment agent to its melting point or above such that a molten surface-treatment agent is obtained and contacting the calcium or magnesium carbonate-comprising material under mixing, in one or more steps, with the molten surface-treatment agent simultaneously or subsequently to the at least one cross-linkable compound.

According to still a further aspect of the present invention, a curable elastomer mixture is provided comprising a) an elastomer resin, and b) from 5 to 300 wt.-%, preferably from 10 to 150 wt.-%, more preferably from 20 to 110 wt.-% and most preferably from 40 to 100 wt.-%, based on the total weight of the elastomer resin, of the composition as defined herein, wherein the composition is dispersed in the elastomer resin.

According to one embodiment, the elastomer resin is selected from natural or synthetic rubber, preferably from the group consisting of acrylic rubber, butadiene rubber, acrylonitrile-butadiene rubber, epichlorhydrin rubber, isoprene rubber, ethylene-propylene rubber, ethylene-propylene-diene monomer rubber, nitrile-butadiene rubber, butyl rubber, styrene-butadiene rubber, polyisoprene, hydrogenated nitrile-butadiene rubber, carboxylated nitrile-butadiene rubber, chloroprene rubber, isoprene isobutylene rubber, chloro-isobutene-isoprene rubber, brominated isobutene-isoprene rubber, silicone rubber, fluorocarbon rubber, polyurethane rubber, polysulfide rubber, thermoplastic rubber, and mixtures thereof.

According to another embodiment, the mixture further comprises additives such as colouring pigments, fibers, e.g. cellulose, glass or wood fibers, dyes, waxes, lubricants, oxidative- and/or UV-stabilizers, plasticizer, curing agents, crosslinking coagents, antioxidants and other fillers, such as carbon black, $TiO_2$, mica, clay, precipitated silica, talc or calcined kaolin.

According to still a further aspect of the present invention, a cured elastomer product is provided formed from the curable elastomer mixture as defined herein.

According to still a further aspect of the present invention, a process for preparing the cured elastomer product as defined herein is provided, wherein the process comprises the steps of a) providing an elastomer resin,
b) providing from 5 to 300 wt.-%, based on the total weight of the elastomer resin, of at least one calcium or magnesium carbonate-comprising material as filler,
c) providing from 0.1 to 10 mg/m$^2$, based on the total weight of the calcium or magnesium carbonate-comprising material, of at least one cross-linkable compound comprising at least two functional groups, wherein at least one functional group is suitable for cross-linking an elastomer resin and wherein at least one functional group is suitable for reacting with the calcium or magnesium carbonate-comprising material,
d) optionally providing at least one further surface-treatment agent as defined in claim 9,
e) optionally providing further additives such as colouring pigments, fibers, e.g. cellulose, glass or wood fibers, dyes, waxes, lubricants, oxidative- and/or UV-stabilizers, plasticizer, curing agents, crosslinking coagents, antioxidants and other fillers, such as carbon black, $TiO_2$, mica, clay, precipitated silica, talc or calcined kaolin,
h) contacting the components of step a), step b), step c) and optionally step d) and step e) in any order, and
g) curing the mixture obtained in step f) such that a cured elastomer product is formed.

According to one embodiment, in contacting step f) firstly the at least one calcium or magnesium carbonate-comprising material of step b) is contacted under mixing, in one or more steps, with the at least one cross-linkable compound of step c) and, if present, subsequently or simultaneously, with the at least one further surface-treatment agent of step d) such that a surface treatment layer comprising the at least one cross-linkable compound and/or salty reaction product(s) thereof and optionally the at least one further surface-treatment agent and/or salty reaction product(s) thereof is/are formed on the surface of said at least one calcium or magnesium carbonate-comprising material of step b), and secondly this surface-treated calcium or magnesium carbonate-comprising material is contacted under mixing, in one or more steps, with the elastomer resin of step a).

According to another embodiment, the further additives of step e) are contacted under mixing, in one or more steps, with the surface-treated calcium or magnesium carbonate-comprising material before or after, preferably after, the surface-treated calcium or magnesium carbonate-comprising material is contacted under mixing, in one or more steps, with the elastomer resin of step a).

According to yet another embodiment, contacting step f) is carried out during curing step g) in that the at least one cross-linkable compound is contacted under mixing with the elastomer resin of step a) before or after, preferably after, adding the at least one calcium or magnesium carbonate-comprising material.

According to still a further aspect of the present invention, use of at least one cross-linkable compound is provided, the at least one cross-linkable compound comprises at least two functional groups, wherein at least one functional group is suitable for cross-linking an elastomer resin and wherein at least one functional group is suitable for reacting with the calcium or magnesium carbonate-comprising material in the compounding of an elastomer formed from an elastomer resin and at least one calcium or magnesium carbonate-comprising material as filler, to increase the mechanical properties of such a compounded elastomer in comparison to the same elastomer formed from the same elastomer resin and at least one calcium or magnesium carbonate-comprising material but without the at least one cross-linkable compound comprising at least two functional groups, wherein at least one functional group is suitable for cross-linking an elastomer resin and wherein at least one functional group is suitable for reacting with the calcium or magnesium carbonate-comprising material.

According to still a further aspect of the present invention, an article formed from the cured elastomer product as defined herein is provided, wherein the article is selected from the group comprising tubeless articles, membranes, sealings, gloves, pipes, cable, electrical connectors, oil hoses, shoe soles, O-ring seals, shaft seals, gaskets, tubing, valve stem seals, fuel hose, tank seals, diaphragms, flexi liners for pumps, mechanical seals, pipe coupling, valve lines, military flare blinders, electrical connectors, fuel joints, roll covers, firewall seals, clips for jet engines, and the like.

It should be understood that for the purpose of the present invention, the following terms have the following meaning:

The term "acid" as used herein refers to an acid in the meaning of the definition by Brønsted and Lowry (e.g., $H_2SO_4$, $HSO_4^-$), wherein the term "free acid" refers only to those acids being in the fully protonated form (e.g., $H_2SO_4$).

As used herein, the term "polymer" generally includes homopolymers and co-polymers such as, for example, block, graft, random and alternating copolymers, as well as blends and modifications thereof. The polymer can be an amorphous polymer, a crystalline polymer, or a semi-crystalline polymer, i.e. a polymer comprising crystalline and amorphous fractions. The degree of crystallinity is specified in percent and can be determined by differential scanning calorimetry (DSC). An amorphous polymer may be characterized by its glass transition temperature and a crystalline polymer may be characterized by its melting point. A semi-crystalline polymer may be characterized by its glass transition temperature and/or its melting point.

The term "copolymer" as used herein refers to a polymer derived from more than one species of monomer. Copolymers that are obtained by copolymerization of two monomer species may also be termed bipolymers, those obtained from three monomers terpolymers, those obtained from four monomers quaterpolymers, etc. (cf. IUPAC Compendium of Chemical Terminology 2014, "copolymer"). Accordingly, the term "homopolymer" refers to a polymer derived from one species of monomer.

An "elastomer" is a polymer that shows rubber-like elasticity, and comprises crosslinks, preferably permanent crosslinks.

For the purposes of the present invention, a "crosslinkable polymer" is a polymer, which comprises crosslinkable sites, e.g., carbon multiple bonds, halogen functional groups, or hydrocarbon moieties, and which upon crosslinking forms an elastomer. The term is used synonymously with the term "elastomer precursor".

For the purpose of the present invention, the term "rubber" refers to a crosslinkable polymer or elastomer precursor, which can be converted into an elastomer by a curing reaction, e.g. by vulcanization.

The term "glass transition temperature" in the meaning of the present invention refers to the temperature at which the glass transition occurs, which is a reversible transition in amorphous materials (or in amorphous regions within semi-crystalline materials) from a hard and relatively brittle state into a molten or rubber-like state. The glass-transition temperature is always lower than the melting point of the crystalline state of the material, if one exists. The term "melting point" in the meaning of the present invention refers to the temperature at which a solid changes state from solid to liquid at atmospheric pressure. At the melting point the solid and liquid phase exist in equilibrium. Glass-transition temperature and melting point are determined by ISO 11357 with a heating rate of 10° C./min.

For the purpose of the present application, "water-insoluble" materials are defined as materials which, when 100 g of said material is mixed with 100 g deionised water and filtered on a filter having a 0.2 mm pore size at 20° C. to recover the liquid filtrate, provide less than or equal to 1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 mm pore size at 20° C. to recover the liquid filtrate, provide more than 1 g of recovered solid material following evaporation at 95 to 100° C. of 100 g of said liquid filtrate at ambient pressure.

The term "surface-reacted" in the meaning of the present application shall be used to indicate that a material has been subjected to a process comprising partial dissolution of said material in aqueous environment followed by a crystallization process on and around the surface of said material, which may occur in the absence or presence of further crystallization additives.

The term "surface-treated" in the meaning of the present invention refers to a material which has been contacted with a surface treatment agent such as to obtain a coating layer on at least a part of the surface of the material.

The "particle size" of particulate materials, other than surface-reacted calcium carbonate, and precipitated hydromagnesite, herein is described by its weight-based distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$ (wt) unless indicated otherwise. Particle sizes were determined by using Sedigraph™ 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$.

The "particle size" of surface-reacted calcium carbonate or precipitated hydromagnesite herein is described as volume-based particle size distribution. Volume-based median particle size $d_{50}$ was evaluated using a Malvern Mastersizer 3000 Laser Diffraction System. The $d_{50}$ or $d_{98}$ value, measured using a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

A "salt" in the meaning of the present invention is a chemical compound consisting of an assembly of cations and anions (cf. IUPAC, Compendium of Chemical Terminology, 2nd Ed. (the "gold book"), 1997, "salt").

The "specific surface area" (expressed in $m^2/g$) of a material as used throughout the present document can be determined by the Brunauer Emmett Teller (BET) method with nitrogen as adsorbing gas and by use of a ASAP 2460 instrument from Micromeritics. The method is well known to the skilled person and defined in ISO 9277:2010. Samples are conditioned at 100° C. under vacuum for a period of 30 min prior to measurement. The total surface area (in $m^2$) of said material can be obtained by multiplication of the specific surface area (in $m^2/g$) and the mass (in g) of the material.

For the purpose of the present invention, the "solids content" of a liquid composition is a measure of the amount of material remaining after all the solvent or water has been evaporated. If necessary, the "solids content" of a suspension given in wt. % in the meaning of the present invention can be determined using a Moisture Analyzer HR73 from Mettler-Toledo (T=120° C., automatic switch off 3, standard drying) with a sample size of 5 to 20 g.

Unless specified otherwise, the term "drying" refers to a process according to which at least a portion of water is removed from a material to be dried such that a constant weight of the obtained "dried" material at 105° C. is reached. Moreover, a "dried" or "dry" material may be defined by its total moisture content which may be dependent on the calcium or magnesium carbonate-comprising material used in the composition. In general, a "dried" or "dry" material has a residual total moisture content, unless specified otherwise, of less than or equal to 2 wt. %, preferably less than or equal to 1.5 wt. %, more preferably less than or equal to 1.2 wt. %, and most preferably between 0.005 and 0.8 wt. %, based on the total weight of the dried material. This is specifically applicable in case the calcium carbonate-comprising material is selected from among sedimentary ground calcium carbonate (GCC), precipitated calcium carbonate (PCC) and mixtures thereof. If the calcium carbonate-comprising material is surface-reacted calcium carbonate or the magnesium carbonate-comprising material is precipitated hydromagnesite, the "dried" or "dry" material preferably has a residual total moisture content of from 0.01 wt.-% to 10 wt.-%, based on the total dry weight of the at least one calcium or magnesium carbonate-comprising material, preferably from 0.01 wt.-% to 8 wt.-%, more preferably from 0.02 wt.-% to 6 wt.-%, and most preferably from 0.03 wt.-% to 4 wt.-%. For the purpose of the present invention, the term "viscosity" or "Brookfield viscosity" refers to Brookfield viscosity. The Brookfield viscosity can for this purpose be measured by a Brookfield DV-II+ Pro viscometer at 25° C.±1° C. at 100 rpm using an appropriate spindle of the Brookfield RV-spindle set and is specified in mPa·s or cPs. Based on his technical knowledge, the skilled person will select a spindle from the Brookfield RV-spindle set which is suitable for the viscosity range to be measured. For example, for a Brookfield viscosity range between 200 and 800 mPa·s the spindle number 3 may be used, for a viscosity range between 400 and 1600 mPa·s the spindle number 4 may be used, for a viscosity range between 800 and 3200 mPa·s the spindle number 5 may be used, for a viscosity range between 1000 and 2000000 mPa·s the spindle number 6 may be used, and for a viscosity range between 4000 and 8000000 mPa·s the spindle number 7 may be used.

A "suspension" or "slurry" in the meaning of the present invention comprises undissolved solids and water, and optionally further additives, and usually contains large amounts of solids and, thus, is more viscous and can be of higher density than the liquid from which it is formed.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

The composition of the present invention is formed from a calcium or magnesium carbonate-comprising material selected from among sedimentary ground calcium carbonate (GCC), precipitated calcium carbonate (PCC), surface-reacted calcium carbonate (SRCC), precipitated hydromagnesite and mixtures thereof, and from 0.5 to 10 wt.-%, based on the total weight of the calcium or magnesium carbonate-comprising material, of a surface-treatment composition comprising at least one cross-linkable compound comprising at least two functional groups, wherein at least one functional group is suitable for cross-linking an elastomer resin and wherein at least one functional group is suitable for reacting with the calcium or magnesium carbonate-comprising material.

In the following, preferred embodiments of the inventive products will be set out in more detail. It is to be understood that these embodiments and details also apply to the inventive methods for their preparation and their uses described herein.

The Calcium or Magnesium Carbonate-Comprising Material

The composition of the present invention is formed from a calcium or magnesium carbonate-comprising material selected from among sedimentary ground calcium carbonate (GCC), precipitated calcium carbonate (PCC), surface-reacted calcium carbonate (SRCC), precipitated hydromagnesite and mixtures thereof.

In one embodiment, the composition is formed from a calcium carbonate-comprising material being sedimentary ground calcium carbonate (GCC) and/or precipitated calcium carbonate (PCC) or surface-reacted calcium carbonate (SRCC). Preferably, the composition is formed from a calcium carbonate-comprising material being sedimentary ground calcium carbonate (GCC) or precipitated calcium carbonate (PCC) or surface-reacted calcium carbonate (SRCC). More preferably, the composition is formed from a calcium carbonate-comprising material being sedimentary ground calcium carbonate (GCC) or precipitated calcium carbonate (PCC). Most preferably, the composition is formed from a calcium carbonate-comprising material being sedimentary ground calcium carbonate (GCC).

Alternatively, the composition is formed from a magnesium carbonate-comprising material being precipitated hydromagnesite.

However, it is preferred that the composition is formed from a calcium carbonate-comprising material.

The calcium or magnesium carbonate-comprising material may be provided in any suitable dry form. For example, the calcium or magnesium carbonate-comprising material may be in form of a powder and/or in pressed or granulated form. For example, if the calcium carbonate-comprising material is sedimentary ground calcium carbonate (GCC) and/or precipitated calcium carbonate (PCC), the residual total moisture content is preferably of ≤2 wt.-%, based on the total dry weight of the at least one calcium carbonate-comprising material, more preferably ≤1.5 wt.-%, even more preferably ≤1.2 wt.-%, and most preferably ≤0.8 wt.-%. Additionally or alternatively, the residual total moisture content is preferably ≥0.001 wt.-%, based on the total dry weight of the at least one calcium carbonate-comprising material, more preferably ≥0.002 wt.-%, and most preferably ≥0.005 wt.-%.

In one embodiment, the residual total moisture content is preferably from 0.001 wt.-% to 2 wt.-%, based on the total dry weight of the at least one calcium carbonate-comprising material, preferably from 0.001 wt.-% to 1.5 wt.-%, more preferably from 0.002 wt.-% to 1.2 wt.-%, and most preferably from 0.005 wt.-% to 0.8 wt.-%.

"Ground calcium carbonate" (also called "sedimentary ground calcium carbonate") (GCC) in the meaning of the present invention is a calcium carbonate obtained from sedimentary sources, such as marble, limestone, dolomite, chalk and/or mixtures thereof, and processed through a wet and/or dry treatment such as grinding, screening and/or fractionating, for example, by a cyclone or classifier. The term "sedimentary" ground calcium carbonate refers to calcium carbonate that is formed by the accumulation or deposition of calcium carbonate particles and subsequent cementation of the particles on the floor of oceans or other bodies of water at the earth's surface.

According to one embodiment, the sedimentary ground calcium carbonate (GCC) is selected from the group consisting of marble, limestone, dolomite, chalk and mixtures thereof. The ground calcium carbonate may comprise further components occurring in sedimentary sources such as magnesium carbonate, alumino silicate etc. Thus, it is appreciated that the term "ground" calcium carbonate is not understood to refer to a calcium carbonate obtained by milling, but rather refers to the sedimentary origin of the calcium carbonate.

"Dolomite" in the meaning of the present invention is a calcium carbonate containing mineral, namely a carbonic calcium-magnesium-mineral, having the chemical composition of $CaMg(CO_3)_2$ ("$CaCO_3 \cdot MgCO_3$"). A dolomite mineral may contain at least 30.0 wt.-% $MgCO_3$, based on the total weight of dolomite, preferably more than 35.0 wt.-%, and more preferably more than 40.0 wt.-% $MgCO_3$.

In general, the grinding of sedimentary ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate-comprising material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate-comprising material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous, semi-dry or humid environment or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried. PCCs are described, for example, in EP2447213 A1, EP2524898 A1, EP2371766 A1, EP1712597 A1, EP1712523 A1, or WO2013/142473 A1. According to one embodiment of the present invention, the precipitated calcium carbonate is precipitated calcium carbonate, preferably selected from the group consisting of the aragonitic, vateritic and calcitic mineralogical crystal forms, colloidal PCC, and mixtures thereof.

According to one embodiment the sedimentary ground calcium carbonate (GCC) is selected from the group consisting of marble, limestone, dolomite, chalk and mixtures thereof, or the precipitated calcium carbonate (PCC) is selected from the group consisting of the aragonitic, vateritic and calcitic mineralogical crystal forms, colloidal PCC, and mixtures thereof.

Preferably, the calcium carbonate-comprising material is sedimentary ground calcium carbonate (GCC) such as marble, limestone or chalk. More preferably, the calcium carbonate-comprising material is sedimentary ground calcium carbonate (GCC) such as marble or limestone.

Most preferably, the calcium carbonate-comprising material is sedimentary ground calcium carbonate (GCC) being marble.

If the calcium carbonate-comprising material is sedimentary ground calcium carbonate (GCC) and/or precipitated calcium carbonate (PCC), the calcium carbonate-comprising material preferably has a weight median particle size $d_{50}$ value measured by the sedimentation method in the range from 0.1 μm to 10 μm, preferably in the range from 0.15 μm to 5 μm, more preferably in the range from 0.2 μm to 3 μm and most preferably in the range from 0.25 μm to 3 μm, e.g. from 0.3 μm to 2 μm or from 0.3 μm to 1.5 μm.

Additionally or alternatively, the calcium carbonate-comprising material being sedimentary ground calcium carbonate (GCC) and/or precipitated calcium carbonate (PCC) has a top cut ($d_{98}$) measured by the sedimentation method of ≤45 μm, preferably of ≤30 μm, more preferably of ≤20 μm and most preferably of ≤15 μm.

In a preferred embodiment, the calcium carbonate-comprising material being sedimentary ground calcium carbonate (GCC) and/or precipitated calcium carbonate (PCC) has a weight median particle size $d_{50}$ value measured by the sedimentation method in the range from 0.1 μm to 10 μm, preferably in the range from 0.15 μm to 5 μm, more preferably in the range from 0.2 μm to 3 μm and most preferably in the range from 0.25 μm to 3 μm, e.g. from 0.3 μm to 2 μm or from 0.3 μm to 1.5 μm and has a top cut ($d_{98}$) measured by the sedimentation method of ≤45 μm, preferably of ≤30 μm, more preferably of ≤20 μm and most preferably of ≤15 μm.

Additionally or alternatively, the calcium carbonate-comprising material being sedimentary ground calcium carbonate (GCC) and/or precipitated calcium carbonate (PCC) has a specific surface area (BET) of from 0.5 to 150 $m^2/g$ as measured using nitrogen and the BET method according to ISO 9277:2010, preferably from 1 to 80 $m^2/g$, more preferably from 2 to 50 $m^2/g$, even more preferably from 2 to 40 $m^2/g$, most preferably from 3 to 25 $m^2/g$, e.g. from 6 to 25 $m^2/g$.

In a preferred embodiment, the calcium carbonate-comprising material being sedimentary ground calcium carbonate (GCC) and/or precipitated calcium carbonate (PCC) has a weight median particle size $d_{50}$ value measured by the sedimentation method in the range from 0.1 μm to 10 μm, preferably in the range from 0.15 μm to 5 μm, more preferably in the range from 0.2 μm to 3 μm and most preferably in the range from 0.25 μm to 3 μm, e.g. from 0.3 μm to 2 μm or from 0.3 μm to 1.5 μm and has a top cut ($d_{98}$) measured by the sedimentation method of ≤45 μm, preferably of ≤30 μm, more preferably of ≤20 μm and most preferably of ≤15 μm and has a specific surface area (BET)

of from 0.5 to 150 $m^2/g$ as measured using nitrogen and the BET method according to ISO 9277:2010, preferably from 1 to 80 $m^2/g$, more preferably from 2 to 50 $m^2/g$, even more preferably from 2 to 40 $m^2/g$, most preferably from 3 to 25 $m^2/g$, e.g. from 6 to 25 $m^2/g$.

Additionally or alternatively, the calcium carbonate-comprising material being sedimentary ground calcium carbonate (GCC) and/or precipitated calcium carbonate (PCC) has a residual total moisture content of ≤2 wt.-%, based on the total dry weight of the at least one calcium carbonate-comprising material, more preferably ≤1.5 wt.-%, even more preferably ≤1.2 wt.-%, and most preferably ≤0.8 wt.-%.

For example, the calcium carbonate-comprising material is sedimentary ground calcium carbonate (GCC) and/or precipitated calcium carbonate (PCC) and has i) a weight median particle size $d_{50}$ value measured by the sedimentation method in the range from 0.1 μm to 10 μm, preferably in the range from 0.15 μm to 5 μm, more preferably in the range from 0.2 μm to 3 μm and most preferably in the range from 0.25 μm to 3 μm, e.g. from 0.3 μm to 2 μm or from 0.3 μm to 1.5 μm, or ii) a top cut ($d_{98}$) measured by the sedimentation method of ≤45 μm, preferably of ≤30 μm, more preferably of ≤20 μm and most preferably of ≤15 μm, or iii) a specific surface area (BET) of from 0.5 to 150 $m^2/g$ as measured using nitrogen and the BET method according to ISO 9277:2010, preferably from 1 to 80 $m^2/g$, more preferably from 2 to 50 $m^2/g$, even more preferably from 2 to 40 $m^2/g$, most preferably from 3 to 25 $m^2/g$, e.g. from 6 to 25 $m^2/g$, or iv) a residual total moisture content of ≤2 wt.-%, based on the total dry weight of the at least one calcium carbonate-comprising material, more preferably ≤1.5 wt.-%, even more preferably ≤1.2 wt.-%, and most preferably ≤0.8 wt.-%.

Alternatively, the calcium carbonate-comprising material is sedimentary ground calcium carbonate (GCC) and/or precipitated calcium carbonate (PCC) and has i) a weight median particle size $d_{50}$ value measured by the sedimentation method in the range from 0.1 μm to 10 μm, preferably in the range from 0.15 μm to 5 μm, more preferably in the range from 0.2 μm to 3 μm and most preferably in the range from 0.25 μm to 3 μm, e.g. from 0.3 μm to 2 μm or from 0.3 μm to 1.5 μm, and ii) a top cut ($d_{98}$) measured by the sedimentation method of ≤45 μm, preferably of ≤30 μm, more preferably of ≤20 μm and most preferably of ≤15 μm, and iii) a specific surface area (BET) of from 0.5 to 150 $m^2/g$ as measured using nitrogen and the BET method according to ISO 9277:2010, preferably from 1 to 80 $m^2/g$, more preferably from 2 to 50 $m^2/g$, even more preferably from 2 to 40 $m^2/g$, most preferably from 3 to 25 $m^2/g$, e.g. from 6 to 25 $m^2/g$, and iv) a residual total moisture content of ≤2 wt.-%, based on the total dry weight of the at least one calcium carbonate-comprising material, more preferably ≤1.5 wt.-%, even more preferably ≤1.2 wt.-%, and most preferably ≤0.8 wt.-%.

According to one embodiment, the calcium carbonate-comprising material is surface-reacted calcium carbonate (SRCC). The surface-reacted calcium carbonate is a reaction product of (sedimentary) ground calcium carbonate or precipitated calcium carbonate with carbon dioxide and one or more $H_3O^+$ ion donors, wherein the carbon dioxide is formed in situ by the $H_3O^+$ ion donors treatment. Preferably, the surface-reacted calcium carbonate is a reaction product of (sedimentary) ground calcium carbonate or precipitated calcium carbonate with carbon dioxide and one or more $H_3O^+$ ion donors, wherein the carbon dioxide is formed in situ by the $H_3O^+$ ion donors treatment.

An $H_3O^+$ ion donor in the context of the present invention is a Brønsted acid and/or an acid salt.

In a preferred embodiment of the invention, the surface-reacted calcium carbonate is obtained by a process comprising the steps of: (a) providing a suspension of (sedimentary) ground or precipitated calcium carbonate, (b) adding at least one acid having a $pK_a$ value of 0 or less at 20° C. or having a $pK_a$ value from 0 to 2.5 at 20° C. to the suspension of step (a), and (c) treating the suspension of step (a) with carbon dioxide before, during or after step (b). According to another embodiment the surface-reacted calcium carbonate is obtained by a process comprising the steps of: (A) providing a (sedimentary) ground or precipitated calcium carbonate, (B) providing at least one water-soluble acid, (C) providing gaseous $CO_2$, (D) contacting said (sedimentary) ground or precipitated calcium carbonate of step (A) with the at least one acid of step (B) and with the $CO_2$ of step (C), characterised in that: (i) the at least one acid of step B) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with (sedimentary) ground or precipitated calcium carbonate, at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

Precipitated calcium carbonate may be ground prior to the treatment with carbon dioxide and at least one $H_3O^+$ ion donor by the same means as used for grinding (sedimentary) ground calcium carbonate as described above.

According to one embodiment of the present invention, the (sedimentary) ground or precipitated calcium carbonate is in form of particles having a weight median particle size $d_{50}$ of 0.05 to 10.0 μm, preferably 0.1 to 5.0 μm, more preferably 0.2 to 3.0 μm, even more preferably 0.3 to 1.2 μm, and most preferably 0.3 to 0.4 μm. According to a further embodiment of the present invention, the (sedimentary) ground or precipitated calcium carbonate is in form of particles having a top cut particle size $d_{98}$ of 0.15 to 55 μm, preferably 1 to 40 μm, more preferably 2 to 25 μm, most preferably 3 to 15 μm, especially 3 μm.

The (sedimentary) ground and/or precipitated calcium carbonate may be used dry or suspended in water. Preferably, a corresponding slurry has a content of (sedimentary) ground or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more $H_3O^+$ ion donor used for the preparation of surface reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acidic salt, generating $H_3O^+$ ions under the preparation conditions.

According to one embodiment, the at least one $H_3O^+$ ion donor is a strong acid having a $pK_a$ of 0 or less at 20° C.

According to another embodiment, the at least one $H_3O^+$ ion donor is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acidic salt, for example, $HSO_4^-$ or $H_2PO_4^-$, being at least partially neutralized by a corresponding cation such as $Li^+$, $Na^+$ or $K^+$, or $HPO_4^{2-}$, being at least partially neutralised by a corresponding cation such as $Li^+$, $Na^+$, $K^+$, $Mg^{2+}$ or $Ca^{2+}$. The at least one $H_3O^+$ ion donor can also be a mixture of one or more acids and one or more acidic salts.

According to still another embodiment, the at least one $H_3O^+$ ion donor is a weak acid having a $pK_a$ value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided. According to the preferred embodiment, the weak acid has a $pK_a$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, an acidic salt, acetic acid, formic acid, and mixtures thereof. Preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a corresponding cation such as $Li^+$, $Na^+$ or $K^+$, $HPO_4^{2-}$, being at least partially neutralised by a corresponding cation such as $Li^+$, $Na^+$, $K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the (sedimentary) ground or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the (sedimentary) ground or precipitated calcium carbonate is suspended.

In a preferred embodiment, the surface-reacted calcium carbonate is a reaction product of (sedimentary) ground calcium carbonate with carbon dioxide and one or more $H_3O^+$ ion donors in an aqueous medium, wherein the carbon dioxide is formed in-situ by the $H_3O^+$ ion donors treatment and wherein the $H_3O^+$ ion donor is phosphoric acid. In a more preferred embodiment, the surface-reacted calcium carbonate is a reaction product of calcium carbonate containing minerals selected from the group comprising marble, chalk, limestone and mixtures thereof with carbon dioxide and one or more $H_3O^+$ ion donors in an aqueous medium, wherein the carbon dioxide is formed in-situ by the $H_3O^+$ ion donors treatment and wherein the $H_3O^+$ ion donor is phosphoric acid.

In a next step, the (sedimentary) ground or precipitated calcium carbonate is treated with carbon dioxide. If a strong acid such as sulphuric acid or hydrochloric acid is used for the $H_3O^+$ ion donor treatment of the (sedimentary) ground or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a $pK_a$ in the range of 0 to 2.5 at 20° C., wherein carbon dioxide is formed in situ, and thus, the carbon dioxide treatment will automatically be carried out simultaneously with the $H_3O^+$ ion donor treatment, followed by the additional treatment with carbon dioxide supplied from an external source.

In a preferred embodiment, the $H_3O^+$ ion donor treatment step and/or the carbon dioxide treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted (sedimentary) ground or precipitated calcium carbonate as an aqueous suspension having a pH of greater than 6.0, preferably greater than 6.5, more preferably greater than 7.0, even more preferably greater than 7.5.

Further details about the preparation of the surface-reacted (sedimentary) ground calcium carbonate are disclosed in WO00/39222 A1, WO2004/083316 A1, WO2005/121257 A2, WO2009/074492 A1, EP2264108 A1, EP2264109 A1 and US2004/0020410 A1, the content of these references herewith being included in the present application.

Similarly, surface-reacted precipitated calcium carbonate is obtained. As can be taken in detail from WO2009/074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted (sedimentary) ground or precipitated calcium carbonate, the (sedimentary) ground or precipitated calcium carbonate is reacted with the one or more $H_3O^+$ ion donors and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the (sedimentary) ground or precipitated calcium carbonate before adding the one or more $H_3O^+$ ion donors and/or carbon dioxide.

Alternatively, the silicate and/or silica and/or aluminium hydroxide and/or earth alkali aluminate and/or magnesium oxide component(s) can be added to the aqueous suspension of (sedimentary) ground or precipitated calcium carbonate while the reaction of (sedimentary) ground or precipitated calcium carbonate with the one or more $H_3O^+$ ion donors and carbon dioxide has already started. Further details about the preparation of the surface-reacted (sedimentary) ground or precipitated calcium carbonate in the presence of at least one silicate and/or silica and/or aluminium hydroxide and/or earth alkali aluminate component(s) are disclosed in WO2004/083316 A1, the content of this reference herewith being included in the present application.

In order to obtain a solid surface-reacted calcium carbonate in the form of granules or a powder, the aqueous suspension comprising the surface-reacted calcium carbonate is dried. Suitable drying methods are known to the skilled person.

In case the surface-reacted calcium carbonate has been dried, the residual total moisture content of the dried surface-reacted calcium carbonate can be between 0.01 and 10 wt.-%, based on the total weight of the dried surface-reacted calcium carbonate. According to one embodiment, the residual total moisture content of the dried surface-reacted calcium carbonate is less than or equal to 10 wt. %, based on the total weight of the dried surface-reacted calcium carbonate, preferably less than or equal to 8 wt. %, and more preferably less than or equal to 6 wt. % and most preferably less than or equal to 4 wt. %. According to another embodiment, the residual total moisture content of the dried surface-reacted calcium carbonate is from 0.01 wt.-% to 10 wt.-%, based on the total dry weight of the at least one calcium or magnesium carbonate-comprising material, preferably from 0.01 wt.-% to 8 wt.-%, more preferably from 0.02 wt.-% to 6 wt.-%, and most preferably from 0.03 wt.-% to 4 wt.-%.

The surface-reacted calcium carbonate may have different particle shapes, such as e.g. the shape of roses, golf balls and/or brains.

In a preferred embodiment, the surface-reacted calcium carbonate has a specific surface area of from 15 $m^2/g$ to 200 $m^2/g$, preferably from 20 $m^2/g$ to 180 $m^2/g$, more preferably from 25 $m^2/g$ to 140 $m^2/g$, even more preferably from 27 $m^2/g$ to 120 $m^2/g$, most preferably from 30 $m^2/g$ to 100 $m^2/g$, measured using nitrogen and the BET method. For example, the surface-reacted calcium carbonate has a specific surface area of from 75 $m^2/g$ to 100 $m^2/g$, measured using nitrogen and the BET method. The BET specific surface area in the meaning of the present invention is defined as the surface area of the particles divided by the mass of the particles. As used therein the specific surface area is measured by adsorption using the BET isotherm (ISO 9277:2010) and is specified in $m^2/g$.

It is furthermore preferred that the surface-reacted calcium carbonate particles have a volume median particle size $d_{50}$ (vol) of from 0.1 to 75 m, preferably from 0.5 to 50 m, more preferably 1 to m, even more preferably from 1.2 to 30 μm, and most preferably from 1.5 to 15 m.

According to one embodiment the surface-reacted calcium carbonate particles have a volume top cut particle size $d_{98}$ from 0.2 to 150 μm, preferably from 1 to 100 μm, more preferably from 2 to 80 μm, even more preferably from 2.4 to 60 μm, and most preferably from 3 to 30 μm.

The value $d_x$ represents the diameter relative to which x % of the particles have diameters less than $d_x$. This means that the $d_{98}$ value is the particle size at which 98% of all particles are smaller. The $d_{98}$ value is also designated as "top cut". The $d_x$ values may be given in volume or weight percent. The $d_{50}$ (wt) value is thus the weight median particle size, i.e. 50 wt.-% of all grains are smaller than this particle size, and the $d_{50}$ (vol) value is the volume median particle size, i.e. 50 vol.-% of all grains are smaller than this particle size.

Volume median particle size $d_{50}$ was evaluated using a Malvern Mastersizer 3000 Laser Diffraction System. The $d_{50}$ or $d_{98}$ value, measured using a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median particle size is determined by the sedimentation method, which is an analysis of sedimentation behaviour in a gravimetric field. The measurement is made with a Sedigraph™ 5120, Micromeritics Instrument Corporation. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and sonicated.

The processes and instruments are known to the skilled person and are commonly used to determine particle size of fillers and pigments.

The specific pore volume is measured using a mercury intrusion porosimetry measurement using a Micromeritics Autopore V 9620 mercury porosimeter having a maximum applied pressure of mercury 414 MPa (60000 psi), equivalent to a Laplace throat diameter of 0.004 μm (~ nm). The equilibration time used at each pressure step is 20 seconds. The sample material is sealed in a 5 $cm^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764.).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Preferably, the surface-reacted calcium carbonate has an intra-particle intruded specific pore volume in the range from 0.1 to 2.3 $cm^3/g$, more preferably from 0.2 to 2.0 $cm^3/g$, especially preferably from 0.4 to 1.8 $cm^3/g$ and most preferably from 0.6 to 1.6 $cm^3/g$, calculated from mercury porosimetry measurement.

The intra-particle pore size of the surface-reacted calcium carbonate preferably is in a range of from 0.004 to 1.6 μm, more preferably in a range of from 0.005 to 1.3 μm, especially preferably from 0.006 to 1.15 μm and most preferably of 0.007 to 1.0 μm, e.g. 0.02 to 0.6 μm determined by mercury porosimetry measurement.

According to one embodiment of the present invention, the calcium carbonate-comprising material comprises, preferably consists of, surface-reacted calcium carbonate (SRCC), and the (sedimentary) ground calcium carbonate is selected from the group consisting of marble, chalk, limestone, and mixtures thereof, or the precipitated calcium carbonate is selected from the group consisting of precipitated calcium carbonates having an aragonitic, vateritic or calcitic crystal form, and mixtures thereof.

According to a further embodiment the calcium carbonate-comprising material comprises, preferably consists of, surface-reacted calcium carbonate (SRCC), and the at least one $H_3O^+$ ion donor is selected from the group consisting of hydrochloric acid, sulphuric acid, sulphurous acid, phosphoric acid, citric acid, oxalic acid, an acidic salt, acetic acid, formic acid, and mixtures thereof, preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a cation selected from $Li^+$, $Na^+$ and/or $K^+$, $HPO_4^{2-}$, being at least partially neutralised by a cation selected from $Li^+$, $Na^+$, $K^+$, $Mg^{2+}$, and/or $Ca^{2+}$, and mixtures thereof, more preferably the at least one $H_3O^+$ ion donor is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

In one embodiment, the magnesium carbonate-comprising material is precipitated hydromagnesite ($Mg_5(CO_3)_4(OH)_2 \cdot 4H_2O$). In case the hydromagnesite has been dried, the residual total moisture content of the dried precipitated hydromagnesite can be between 0.01 and 10 wt.-%, based on the total weight of the dried precipitated hydromagnesite. According to one embodiment, the residual total moisture content of the dried precipitated hydromagnesite is less than or equal to 10 wt. %, based on the total weight of the dried precipitated hydromagnesite, preferably less than or equal to 8 wt. %, and more preferably less than or equal to 6 wt. % and most preferably less than or equal to 4 wt. %. According to another embodiment, the residual total moisture content of the dried precipitated hydromagnesite is from 0.01 wt.-% to 10 wt.-%, based on the total dry weight of the precipitated hydromagnesite, preferably from 0.01 wt.-% to 8 wt.-%, more preferably from 0.02 wt.-% to 6 wt.-%, and most preferably from 0.03 wt.-% to 4 wt.-%. In a preferred embodiment, the precipitated hydromagnesite has a specific surface area of from 15 $m^2/g$ to 200 $m^2/g$, preferably from 20 $m^2/g$ to 180 $m^2/g$, more preferably from 25 $m^2/g$ to 140 $m^2/g$, even more preferably from 27 $m^2/g$ to 120 $m^2/g$, most preferably from 30 $m^2/g$ to 100 $m^2/g$, measured using nitrogen and the BET method. For example, the precipitated hydromagnesite has a specific surface area of from 75 $m^2/g$ to 100 $m^2/g$, measured using nitrogen and the BET method.

It is furthermore preferred that the precipitated hydromagnesite particles have a volume median particle size $d_{50}$ (vol) of from 0.1 to 75 m, preferably from 0.5 to 50 m, more preferably 1 to m, even more preferably from 1.2 to 30 μm, and most preferably from 1.5 to 15 m.

According to one embodiment the precipitated hydromagnesite particles have a volume particle size $d_{95}$, preferably a volume top cut particle size $d_{98}$, from 0.2 to 150 μm, preferably from 1 to 100 μm, more preferably from 2 to 80 μm, even more preferably from 2.4 to 60 μm, and most preferably from 3 to 30 μm.

The Surface-Treatment Composition

The composition of the present invention is formed from the calcium or magnesium carbonate-comprising material and from 0.5 to 10 wt.-%, based on the total weight of the calcium or magnesium carbonate-comprising material, of a surface-treatment composition.

The surface-treatment composition comprises, preferably consists of, at least one cross-linkable compound comprising at least two functional groups, wherein at least one functional group is suitable for cross-linking an elastomer resin and wherein at least one functional group is suitable for reacting with the calcium or magnesium carbonate-comprising material.

It is appreciated that the "surface-treatment composition" comprises, preferably consists of, one or more surface-treatment agent(s). For example, the "surface-treatment composition" comprises, preferably consists of, one surface-treatment agent. Alternatively, the "surface-treatment composition" comprises, preferably consists of, two or more, preferably two, surface-treatment agents.

A "surface-treatment agent" in the meaning of the present invention is any material, which is capable of reacting and/or forming an adduct with the surface of the calcium or magnesium carbonate-comprising material, thereby forming a surface-treatment layer on at least a part of the surface of the calcium or magnesium carbonate-comprising material. It should be understood that the present invention is not limited to any particular surface-treatment agents. The skilled person knows how to select suitable materials for use as surface-treatment agents. However, it is to be noted that the surface-treatment composition according to the present invention must comprise at least one cross-linkable compound comprising at least two functional groups, wherein at least one functional group is suitable for cross-linking an elastomer resin and wherein at least one functional group is suitable for reacting with the calcium or magnesium carbonate-comprising material, as surface-treatment agent. That is to say, if the surface-treatment composition comprises, preferably consists of, one surface-treatment agent, the surface treatment agent is a cross-linkable compound comprising at least two functional groups, wherein at least one functional group is suitable for cross-linking an elastomer resin and wherein at least one functional group is suitable for reacting with the calcium or magnesium carbonate-comprising material. If the surface-treatment composition comprises, preferably consists of, two or more surface-treatment agents, one surface treatment agent is a cross-linkable compound comprising at least two functional groups, wherein at least one functional group is suitable for cross-linking an elastomer resin and wherein at least one functional group is suitable for reacting with the calcium or magnesium carbonate-comprising material, whereas the further surface-treatment agent(s) may be a surface-treatment agent differing from such a cross-linkable compound. Such further surface-treatment agent(s) are described in more detail below.

The term "at least one" cross-linkable compound comprising at least two functional groups in the meaning of the present invention means that the cross-linkable compound comprises, preferably consists of, one or more cross-linkable compound(s) comprising at least two functional groups.

In one embodiment of the present invention, the at least one cross-linkable compound comprising at least two functional groups comprises, preferably consists of, one cross-linkable compound. Alternatively, the at least one cross-linkable compound comprising at least two functional groups comprises, preferably consists of, two or more cross-linkable compounds. For example, the at least one cross-linkable compound comprising at least two functional groups comprises, preferably consists of, two or three cross-linkable compounds.

Preferably, the at least one cross-linkable compound comprising at least two functional groups comprises, more preferably consists of, one cross-linkable compound comprising at least two functional groups.

It is appreciated that the at least one cross-linkable compound comprising at least two functional groups comprises at least one functional group that is suitable for cross-linking an elastomer resin.

For the purposes of the present invention, a "cross-linkable compound" is a compound, which comprises functional groups, e.g., carbon multiple bonds, halogen functional groups, sulfur functional groups, or hydrocarbon moieties, and which upon crosslinking is suitable for cross-linking an elastomer resin. The inventors surprisingly found out that such a cross-linkable compound can react with the elastomer resin, i.e. the elastomer precursor, in a crosslinking step, e.g., a chemical crosslinking step. In this way, the elastomer resin is (evenly) distributed all over the surface of the calcium or magnesium carbonate-comprising material such that, even if used in small amounts only, the chemical compatibility in the elastomer resin and the mechanical properties of the elastomer product are improved.

Additionally, the at least one cross-linkable compound comprising at least two functional groups comprises at least one functional group that is suitable for reacting with the calcium or magnesium carbonate-comprising material. For example, the at least one functional group that is suitable for reacting with the calcium or magnesium carbonate-comprising material of the cross-linkable compound comprises one or more terminal triethoxysilyl, trimethoxysilyl and/or organic acid anhydride and/or salts thereof and/or carboxylic acid group(s) and/or salts thereof. Preferably, the at least one functional group that is suitable for reacting with the calcium or magnesium carbonate-comprising material of the cross-linkable compound comprises one or more terminal triethoxysilyl, trimethoxysilyl or organic acid anhydride and/or salts thereof or carboxylic acid group(s) and/or salts thereof.

In a preferred embodiment, the at least one functional group that is suitable for reacting with the calcium or magnesium carbonate-comprising material of the cross-linkable compound comprises one or more organic acid anhydride and/or salts thereof or carboxylic acid group(s) and/or salts thereof. Most preferably, the at least one functional group that is suitable for reacting with the calcium or magnesium carbonate-comprising material of the cross-linkable compound comprises one or more organic acid anhydride group(s) and/or salts thereof. Alternatively, the at least one functional group that is suitable for reacting with the calcium or magnesium carbonate-comprising material of the cross-linkable compound comprises one or more triethoxysilyl or trimethoxysilyl functional group(s) and/or salts thereof.

Preferably, the one or more organic acid anhydride group(s) is/are one or more succinic anhydride group(s) obtained by grafting maleic anhydride onto a homo- or copolymer.

In view of this, the at least one functional group that is suitable for reacting with the calcium or magnesium carbonate-comprising material of the cross-linkable compound preferably comprises, more preferably consists of, one or more succinic anhydride group(s) obtained by grafting maleic anhydride onto a homo- or copolymer. For example, the at least one functional group that is suitable for reacting with the calcium or magnesium carbonate-comprising material of the cross-linkable compound preferably comprises, more preferably consists of, one succinic anhydride group obtained by grafting maleic anhydride onto a homo- or copolymer. Alternatively, the at least one functional group that is suitable for reacting with the calcium or magnesium carbonate-comprising material of the cross-linkable compound preferably comprises, more preferably consists of, two or more succinic anhydride groups obtained by grafting maleic anhydride onto a homo- or copolymer, e.g. from 2 to 12, particularly from 2 to 9 such as from 2 to 6, succinic anhydride groups. Alternatively, the at least one functional group that is suitable for reacting with the calcium or magnesium carbonate-comprising material of the cross-linkable compound preferably comprises, more preferably consists of, one triethoxysilyl or trimethoxysilyl functional group. For example, the at least one functional group that is suitable for reacting with the calcium or magnesium carbonate-comprising material of the cross-linkable compound preferably comprises, more preferably consists of, two or more triethoxysilyl or trimethoxysilyl functional groups, e.g. from 2 to 12, particularly from 2 to 9 such as from 2 to 6, triethoxysilyl or trimethoxysilyl functional groups.

It is appreciated that the at least one functional group that is suitable for reacting with the calcium or magnesium carbonate-comprising material of the cross-linkable compound may be present as salt, preferably in the form of the sodium or potassium salt.

In view of the foregoing, the at least one cross-linkable compound comprising at least two functional groups may comprise two or more functional groups, e.g. one or more functional group(s) that is/are suitable for cross-linking an elastomer resin and one or more functional group(s) that is/are suitable for reacting with the calcium or magnesium carbonate-comprising material.

In a preferred embodiment, the at least one cross-linkable compound comprising at least two functional groups preferably comprises two functional groups, e.g. one functional group that is suitable for cross-linking an elastomer resin and one functional group that is suitable for reacting with the calcium or magnesium carbonate-comprising material.

It is appreciated that the number of functional groups in the at least one cross-linkable compound refers to the number of different functional groups, i.e. functional groups not having the same chemical structure. That is to say, if the at least one cross-linkable compound comprises e.g. two functional groups, the two functional groups are of different chemical structures, whereas each of the two different functional groups may be present one or more times.

According to one embodiment, the at least one cross-linkable compound comprising at least two functional groups is at least one grafted polymer comprising at least one succinic anhydride group obtained by grafting maleic anhydride onto a homo- or copolymer comprising butadiene units and optionally styrene units.

The term "grafted" or "maleic anhydride grafted" means that a succinic anhydride is obtained after reaction of substituent(s) $R^1$ and/or $R^2$ comprising a carbon-carbon double bond with the double bond of maleic anhydride. Thus, the terms "grafted homopolymer" and "grafted copolymer" refer to a corresponding homopolymer and copolymer each bearing succinic anhydride moieties formed from the reaction of a carbon-carbon double bond with the double bond of maleic anhydride, respectively. It is appreciated the at least one grafted polymer or maleic anhydride grafted polymer may be also referred to as "polymer, e.g. polybutadiene, functionalized with maleic anhydride" or "polymer, e.g. polybutadiene, adducted maleic anhydride".

That is to say, the at least one cross-linkable compound comprising at least two functional groups is preferably a grafted polybutadiene homopolymer comprising at least one succinic anhydride group obtained by grafting maleic anhydride onto a polybutadiene homopolymer or a grafted polybutadiene-styrene copolymer comprising at least one succinic anhydride group obtained by grafting maleic anhydride onto a polybutadiene-styrene copolymer. More preferably, the at least one cross-linkable compound comprising at least two functional groups is a grafted polybutadiene homopolymer comprising at least one succinic anhydride group obtained by grafting maleic anhydride onto a polybutadiene homopolymer.

According to an alternative embodiment, the at least one cross-linkable compound comprising at least two functional groups is a sulfur-containing trialkoxysilane, preferably a compound comprising two trialkoxysilyl alkyl groups linked with a polysulfide.

If the at least one cross-linkable compound comprising at least two functional groups is a grafted polybutadiene homopolymer comprising at least one succinic anhydride group obtained by grafting maleic anhydride onto a polybutadiene homopolymer, the grafted polybutadiene homopolymer preferably has i) a number average molecular weight Mn measured by gel permeation chromatography from 1000 to 20000 g/mol, preferably from 1400 to 15000 g/mol, and more preferably from 2000 to 10000 g/mol measured according to EN ISO 16014-1:2019, and/or
ii) a number of functional groups per chain in the range from 2 to 12, preferably from 2 to 9, and more preferably from 2 to 6, and/or
iii) an anhydride equivalent weight in the range from 400 to 2200, preferably from 500 to 2000, and more preferably from 550 to 1800.

In one embodiment, the grafted polybutadiene homopolymer comprising at least one succinic anhydride group obtained by grafting maleic anhydride onto a polybutadiene homopolymer preferably has i) a number average molecular weight Mn measured by gel permeation chromatography from 1000 to 20000 g/mol, preferably from 1400 to 15000 g/mol, and more preferably from 2000 to 10000 g/mol measured according to EN ISO 16014-1:2019, or
ii) a number of functional groups per chain in the range from 2 to 12, preferably from 2 to 9, and more preferably from 2 to 6, or
iii) an anhydride equivalent weight in the range from 400 to 2200, preferably from 500 to 2000, and more preferably from 550 to 1800.

In a preferred embodiment, the grafted polybutadiene homopolymer comprising at least one succinic anhydride group obtained by grafting maleic anhydride onto a polybutadiene homopolymer preferably has i) a number average molecular weight Mn measured by gel permeation chromatography from 1000 to 20000 g/mol, preferably from 1400 to 15000 g/mol, and more preferably from 2000 to 10000 g/mol measured according to EN ISO 16014-1:2019, and
ii) a number of functional groups per chain in the range from 2 to 12, preferably from 2 to 9, and more preferably from 2 to 6, and
iii) an anhydride equivalent weight in the range from 400 to 2200, preferably from 500 to 2000, and more preferably from 550 to 1800.

Additionally or alternatively, the grafted polybutadiene homopolymer comprising at least one succinic anhydride group obtained by grafting maleic anhydride onto a polybutadiene homopolymer has an acid number in the range from 10 to 300 meq KOH per g of grafted polybutadiene homopolymer, preferably 20 to 200 meq KOH/g, more preferably 30 to 150 meq KOH/g, measured according to ASTM D974-14.

In one embodiment, the grafted polybutadiene homopolymer comprising at least one succinic anhydride group obtained by grafting maleic anhydride onto a polybutadiene homopolymer thus has i) a number average molecular weight Mn measured by gel permeation chromatography from 1000 to 20000 g/mol, preferably from 1400 to 15000 g/mol, and more preferably from 2000 to 10000 g/mol measured according to EN ISO 16014-1:2019, and
ii) a number of functional groups per chain in the range from 2 to 12, preferably from 2 to 9, and more preferably from 2 to 6, and
iii) an anhydride equivalent weight in the range from 400 to 2200, preferably from 500 to 2000, and more preferably from 550 to 1800, and iv) an acid number in the range from 10 to 300 meq KOH per g of grafted polybutadiene homopolymer, preferably 20 to 200 meq KOH/g, more preferably 30 to 150 meq KOH/g, measured according to ASTM D974-14.

Additionally or alternatively, the grafted polybutadiene homopolymer comprising at least one succinic anhydride group obtained by grafting maleic anhydride onto a polybutadiene homopolymer has a Brookfield viscosity at 25° C. in the range from 3000 to 70000 cPs, preferably in the range from 5000 to 50000 cPs. Alternatively, the maleic anhydride grafted polybutadiene homopolymer has a Brookfield viscosity at 55° C. in the range from 100000 to 170000 cPs, preferably in the range from 120000 to 160000 cPs.

In one embodiment, the grafted polybutadiene homopolymer comprising at least one succinic anhydride group obtained by grafting maleic anhydride onto a polybutadiene homopolymer thus has i) a number average molecular weight Mn measured by gel permeation chromatography from 1000 to 20000 g/mol, preferably from 1400 to 15000 g/mol, and more preferably from 2000 to 10000 g/mol measured according to EN ISO 16014-1:2019, and
ii) a number of functional groups per chain in the range from 2 to 12, preferably from 2 to 9, and more preferably from 2 to 6, and
iii) an anhydride equivalent weight in the range from 400 to 2200, preferably from 500 to 2000, and more preferably from 550 to 1800, and
iv) an acid number in the range from 10 to 300 meq KOH per g of grafted polybutadiene homopolymer, preferably 20 to 200 meq KOH/g, more preferably 30 to 150 meq KOH/g, measured according to ASTM D974-14, and
v) a Brookfield viscosity at 25° C. in the range from 3000 to 70000 cPs, preferably in the range from 5000 to 50000 cPs.

For example, the grafted polybutadiene homopolymer comprising at least one succinic anhydride group obtained by grafting maleic anhydride onto a polybutadiene homopolymer may have a number average molecular weight $M_n$ measured by gel permeation chromatography from 1000 to 20000 g/mol, preferably from 1400 to 15000 g/mol, more preferably from 2000 to 10000 g/mol, an acid number in the range from 20 to 200 meq KOH per g of grafted polybutadiene homopolymer, preferably 30 to 150 meq KOH/g, measured according to ASTM D974-14. In another embodiment, the grafted polybutadiene homopolymer comprising at least one succinic anhydride group obtained by grafting maleic anhydride onto a polybutadiene homopolymer may have a number average molecular weight $M_n$ measured by gel permeation chromatography from 2000 to 5000 g/mol, an acid number in the range from 30 to 100 meq KOH/g, measured according to ASTM D974-14.

In one embodiment, the grafted polybutadiene homopolymer comprising at least one succinic anhydride group obtained by grafting maleic anhydride onto a polybutadiene homopolymer has a number average molecular weight Mn measured by gel permeation chromatography from 2000 to 10 000 g/mol, preferably from 2000 to 4500 g/mol or from 4500 to 7000 g/mol, a number of functional groups per chain in the range from 2 to 6, preferably from 2 to 4 or from 4 to 6, an anhydride equivalent weight in the range from 550 to 1800, preferably from 550 to 1000 or from 1000 to 1800, and a Brookfield viscosity at 25° C. in the range from 5000 to 50000 cPs, preferably from 5000 to 10 000 cPs or from 35000 to 50000 cPs.

For example, the grafted polybutadiene homopolymer comprising at least one succinic anhydride group obtained by grafting maleic anhydride onto a polybutadiene homopolymer has a number average molecular weight Mn measured by gel permeation chromatography from 200 to 4500 g/mol, a number of functional groups per chain in the range from 2 to 4, an anhydride equivalent weight in the range from 1000 to 1800, and a Brookfield viscosity at 25° C. in the range from 5000 to 10000 cPs. In an alternative embodiment, the grafted polybutadiene homopolymer comprising at least one succinic anhydride group obtained by grafting maleic anhydride onto a polybutadiene homopolymer has a number average molecular weight Mn measured by gel permeation chromatography from 4500 to 7000 g/mol, a number of functional groups per chain in the range from 4 to 6, an anhydride equivalent weight in the range from 550 to 1000, and a Brookfield viscosity at 25° C. in the range from 35000 to 50000 cPs. In an alternative embodiment, the grafted polybutadiene homopolymer comprising at least one succinic anhydride group obtained by grafting maleic anhydride onto a polybutadiene homopolymer has a number average molecular weight Mn measured by gel permeation chromatography from 2500 to 4500 g/mol, a number of functional groups per chain in the range from 2 to 4, an anhydride equivalent weight in the range from 550 to 1000, and a Brookfield viscosity at 55° C. in the range from 120000 to 160000 cPs.

Additionally or alternatively, the at least one cross-linkable compound comprising at least two functional groups is a grafted polybutadiene-styrene copolymer comprising at least one succinic anhydride group obtained by grafting maleic anhydride onto a polybutadiene-styrene copolymer and having i) a number average molecular weight Mn measured by gel permeation chromatography from 1000 to 20000 g/mol, preferably from 1400 to 15000 g/mol, and more preferably from 2000 to 10000 g/mol measured according to EN ISO 16014-1:2019, and/or
ii) a number of functional groups per chain in the range from 2 to 12, preferably from 2 to 9, and more preferably from 2 to 6, and/or
iii) an anhydride equivalent weight in the range from 400 to 2200, preferably from 500 to 2000, and more preferably from 550 to 1800, and/or
iv) a 1,2 vinyl content from 20 to 80 mol.-%, preferably from 20 to 40 mol.-%, based on the total weight of the grafted polybutadiene-styrene copolymer.

In one embodiment, the grafted polybutadiene-styrene copolymer comprising at least one succinic anhydride group obtained by grafting maleic anhydride onto a polybutadiene-styrene copolymer preferably has i) a number average molecular weight Mn measured by gel permeation chromatography from 1000 to 20000 g/mol, preferably from 1400 to 15000 g/mol, and more preferably from 2000 to 10000 g/mol measured according to EN ISO 16014-1:2019, or
ii) a number of functional groups per chain in the range from 2 to 12, preferably from 2 to 9, and more preferably from 2 to 6, or
iii) an anhydride equivalent weight in the range from 400 to 2200, preferably from 500 to 2000, and more preferably from 550 to 1800, or
iv) a 1,2 vinyl content from 20 to 80 mol.-%, preferably from 20 to 40 mol.-%, based on the total weight of the grafted polybutadiene-styrene copolymer.

In a preferred embodiment, the grafted polybutadiene-styrene copolymer comprising at least one succinic anhydride group obtained by grafting maleic anhydride onto a polybutadiene-styrene copolymer preferably has i) a number average molecular weight Mn measured by gel permeation chromatography from 1000 to 20000 g/mol, preferably from 1400 to 15000 g/mol, and more preferably from 2000 to 10000 g/mol measured according to EN ISO 16014-1:2019, and
ii) a number of functional groups per chain in the range from 2 to 12, preferably from 2 to 9, and more preferably from 2 to 6, and
iii) an anhydride equivalent weight in the range from 400 to 2200, preferably from 500 to 2000, and more preferably from 550 to 1800, and
iv) a 1,2 vinyl content from 20 to 80 mol.-%, preferably from 20 to 40 mol.-%, based on the total weight of the grafted polybutadiene-styrene copolymer.

Additionally or alternatively, the grafted polybutadiene-styrene copolymer comprising at least one succinic anhydride group obtained by grafting maleic anhydride onto a polybutadiene-styrene copolymer has a Brookfield viscosity at 45° C. in the range from 100000 to 200000 cPs, preferably in the range from 150000 to 200000 cPs.

In one embodiment, the grafted polybutadiene-styrene copolymer comprising at least one succinic anhydride group obtained by grafting maleic anhydride onto a polybutadiene-styrene copolymer has a number average molecular weight Mn measured by gel permeation chromatography from 2000 to 10000 g/mol, a number of functional groups per chain in the range from 2 to 6, an anhydride equivalent weight in the range from 550 to 1800, and a Brookfield viscosity at 45° C. in the range from 150000 to 200000 cPs.

According to yet another embodiment of the present invention, the at least one cross-linkable compound is a sulfur-containing trialkoxysilane.

In one embodiment, the sulfur-containing trialkoxysilane is preferably selected from the group comprising, preferably consisting of, mercaptopropyltrimethoxysilane (MPTS), mercaptopropyltriethoxysilane, bis(triethoxysilylpropyl) disulfide (TESPD), bis(triethoxysilylpropyl) tetrasulfide (TESPT), 3-aminopropyltrimethoxysilane (APTMS), 3-aminopropyltriethoxysilane, and mixtures thereof.

In one embodiment, the sulfur-containing trialkoxysilane is preferably a compound comprising two trialkoxysilyl alkyl groups linked with a polysulfide. For example, the compound comprising two trialkoxysilyl alkyl groups linked with a polysulfide is selected from bis(triethoxysilylpropyl) disulfide (TESPD), bis(triethoxysilylpropyl) tetrasulfide (TESPT) and mixtures thereof. Preferably, the compound comprising two trialkoxysilyl alkyl groups linked with a polysulfide is bis(triethoxysilylpropyl) tetrasulfide (TESPT).

The composition of the present invention is formed from a calcium or magnesium carbonate-comprising material and from 0.5 to 20 wt.-%, based on the total weight of the calcium or magnesium carbonate-comprising material, of the surface-treatment composition comprising at least one cross-linkable compound comprising at least two functional groups, wherein at least one functional group is suitable for cross-linking an elastomer resin and wherein at least one functional group is suitable for reacting with the calcium or magnesium carbonate-comprising material.

Thus, the surface-treatment composition may comprise, preferably consist of, a grafted polybutadiene homopolymer comprising at least one succinic anhydride group obtained by grafting maleic anhydride onto a polybutadiene homopolymer or a grafted polybutadiene-styrene copolymer comprising at least one succinic anhydride group obtained by grafting maleic anhydride onto a polybutadiene-styrene copolymer, preferably a polybutadiene homopolymer comprising at least one succinic anhydride group obtained by grafting maleic anhydride onto a polybutadiene homopolymer. Thus, a treatment layer is formed on the surface of the at least one calcium or magnesium carbonate-comprising material by contacting the calcium or magnesium carbonate-comprising material with said surface-treatment composition. Preferably, a treatment layer is formed on the surface of the at least one calcium or magnesium carbonate-comprising material by contacting the calcium or magnesium carbonate-comprising material with said surface-treatment composition in an amount from 0.5 to 20 wt.-%, based on the total weight of the calcium or magnesium carbonate-comprising material, more preferably 0.5 to 10 wt.-%, even more preferably 0.5 to 8 wt.-%, and most preferably 0.6 to 7 wt.-%.

Alternatively, a treatment layer is formed on the surface of the at least one calcium or magnesium carbonate-comprising material by contacting the calcium or magnesium carbonate-comprising material with said surface-treatment composition in an amount from 0.1 to 10 $mg/m^2$ of calcium or magnesium carbonate-comprising material surface, preferably 0.1 to 8 $mg/m^2$, more preferably 0.11 to 3 $mg/m^2$.

For example, the treatment layer on at least a part of the surface of the calcium or magnesium carbonate-comprising material may be formed by contacting the calcium or magnesium carbonate-comprising material with the grafted polybutadiene homopolymer comprising at least one succinic anhydride group obtained by grafting maleic anhydride onto a polybutadiene homopolymer, and having a number average molecular weight Mn measured by gel permeation chromatography from 1000 to 20000 g/mol, preferably from 1400 to 15000 g/mol, more preferably from 2000 to 10000 g/mol, an acid number in the range from 20 to 200 meq KOH per g of grafted polybutadiene homopolymer, preferably 30 to 150 meq KOH/g, measured according to ASTM D974-14, in an amount from 0.5 to 20 wt.-%, based on the total weight of the calcium or magnesium carbonate-comprising material, more preferably 0.5 to 10 wt.-%, even more preferably, 0.5 to 8 wt.-%, and most preferably 0.6 to 7 wt.-% or in an amount from 0.1 to 10 $mg/m^2$ of calcium or magnesium carbonate-comprising material surface, preferably 0.1 to 8 $mg/m^2$, more preferably 0.11 to 3 $mg/m^2$.

Alternatively, the surface-treatment layer on at least a part of the surface of the calcium or magnesium carbonate-comprising material may be formed by contacting the calcium carbonate-comprising material with the grafted polybutadiene-styrene copolymer comprising at least one succinic anhydride group obtained by grafting maleic anhydride onto a polybutadiene-styrene copolymer and having a number average molecular weight $M_n$ measured by gel permeation chromatography from 1000 to 20000 g/mol, preferably from 1400 to 15000 g/mol, more preferably from 2000 to 10000 g/mol, an acid number in the range from 20 to 200 meq KOH per g of grafted polybutadiene homopolymer, preferably 30 to 150 meq KOH/g, measured according to ASTM D974-14, and/or a molar amount of 1,2-vinyl groups in the range from 20 to 80 mol-%, preferably 20 to 40 mol-%, in an amount from 0.5 to 20 wt.-%, based on the total weight of the calcium or magnesium carbonate-comprising material, more preferably 0.5 to 10 wt.-%, even more preferably, 0.5 to 8 wt.-%, and most preferably 0.6 to 7 wt.-% or in an amount from 0.1 to 10 $mg/m^2$ of calcium or magnesium carbonate-comprising material surface, preferably 0.1 to 8 $mg/m^2$, more preferably 0.11 to 3 $mg/m^2$.

In one embodiment, the surface-treatment composition comprises a grafted polybutadiene homopolymer comprising at least one succinic anhydride group obtained by grafting maleic anhydride onto a polybutadiene homopolymer having a Brookfield viscosity at 25° C. in the range from 1000 to 300000 mPa·s, and/or an acid number in the range from 10 to 300 mg potassium hydroxide per g grafted polybutadiene homopolymer and/or an iodine number in the range from 100 to 1000 g iodine per 100 g grafted polybutadiene homopolymer. For example, the surface-treatment composition comprises a grafted polybutadiene homopolymer comprising at least one succinic anhydride group obtained by grafting maleic anhydride onto a polybutadiene homopolymer having a Brookfield viscosity at 25° C. in the range from 1000 to 300000 mPa·s, or an acid number in the range from 10 to 300 mg potassium hydroxide per g grafted polybutadiene homopolymer or an iodine number in the range from 100 to 1000 g iodine per 100 g grafted polybutadiene homopolymer. Alternatively, the surface-treatment composition comprises a grafted polybutadiene homopolymer comprising at least one succinic anhydride group obtained by grafting maleic anhydride onto a polybutadiene homopolymer having a Brookfield viscosity at 25° C. in the range from 1000 to 300000 mPa·s, and an acid number in the range from 10 to 300 mg potassium hydroxide per g grafted polybutadiene homopolymer and an iodine number in the range from 100 to 1000 g iodine per 100 g grafted polybutadiene homopolymer.

In view of the above, it is appreciated that the composition of the instant invention formed from a calcium or magnesium carbonate-comprising material selected from among sedimentary ground calcium carbonate (GCC), precipitated calcium carbonate (PCC), surface-reacted calcium carbonate (SRCC), precipitated hydromagnesite and mixtures thereof, and from 0.5 to 20 wt.-%, based on the total weight of the calcium or magnesium carbonate-comprising material, of a surface-treatment composition comprising at least one cross-linkable compound comprising at least two functional groups, wherein at least one functional group is suitable for cross-linking an elastomer resin and wherein at least one functional group is suitable for reacting with the calcium or magnesium carbonate-comprising material which is preferably a surface-treated calcium or magnesium carbonate-comprising material selected from among sedimentary ground calcium carbonate (GCC), precipitated calcium carbonate (PCC), surface-reacted calcium carbonate (SRCC), precipitated hydromagnesite and mixtures thereof.

It is appreciated that the composition of the present invention is preferably formed from a surface-treatment composition comprising, preferably consisting of, at least one cross-linkable compound comprising at least two functional groups, wherein at least one functional group is suitable for cross-linking an elastomer resin and wherein at least one functional group is suitable for reacting with the calcium or magnesium carbonate-comprising material.

In one embodiment, the surface-treatment composition further comprises at least one further surface-treatment agent selected from the group consisting of I) a phosphoric acid ester blend of one or more phosphoric acid mono ester and/or salts thereof and/or one or more phosphoric acid di-ester and/or salts thereof, and/or II) at least one saturated or unsaturated aliphatic linear or branched carboxylic acid and/or salts thereof, preferably at least one aliphatic carboxylic acid having a total amount of carbon atoms from C4 to C24 and/or a salt thereof, more preferably at least one aliphatic carboxylic acid having a total amount of carbon atoms from C12 to C20 and/or a salt thereof, most preferably at least one aliphatic carboxylic acid having a total amount of carbon atoms from C16 to C18 and/or a salt thereof and/or III) at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or IV) at least one polydialkylsiloxane, and/or V) mixtures of one or more materials according to I) to IV).

According to one embodiment of the present invention, the surface-treatment composition comprises a further surface-treatment agent, which is a phosphoric acid ester blend of one or more phosphoric acid mono-ester and/or salts thereof and/or one or more phosphoric acid di-ester and/or salts thereof.

In one embodiment of the present invention, the one or more phosphoric acid mono-ester consists of an o-phosphoric acid molecule esterified with one alcohol selected from saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from saturated, branched or linear, aliphatic or aromatic alcohols having a total amount of carbon atoms from C8 to C22, more preferably from C8 to C20 and most preferably from C8 to C18 in the alcohol substituent.

Alkyl esters of phosphoric acid are well known in the industry especially as surfactants, lubricants and antistatic agents (Die Tenside; Kosswig und Stache, Carl Hanser Verlag Munchen, 1993).

The synthesis of alkyl esters of phosphoric acid by different methods and the surface treatment of minerals with alkyl esters of phosphoric acid are well known by the skilled man, e.g. from Pesticide Formulations and Application Systems: 17th Volume; Collins H M, Hall F R, Hopkinson M, STP1268; Published: 1996, U.S. Pat. Nos. 3,897,519 A, 4,921,990 A, 4,350,645 A, 6,710,199 B2, 4,126,650 A, 5,554,781 A, EP 1092000 B1 and WO 2008/023076 A1.

In one embodiment of the present invention, the one or more phosphoric acid mono-ester consists of an o-phosphoric acid molecule esterified with one alcohol selected from saturated and linear or branched and aliphatic alcohols having a total amount of carbon atoms from $C_6$ to $C_{30}$ in the alcohol substituent. For example, the one or more phosphoric acid mono-ester consists of an o-phosphoric acid molecule esterified with one alcohol selected from saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid mono-ester consists of an o-phosphoric acid molecule esterified with one alcohol selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the treatment layer of the surface-treated material product and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear or branched and aliphatic alcohols having a total amount of carbon atoms from C6 to C30 in the alcohol substituent. For example, the one or more phosphoric acid di-ester consists of an o-phosphoric acid molecule esterified with two alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

According to another embodiment of the present invention, the surface-treatment composition comprises a further surface-treatment agent, which is at least one saturated or unsaturated aliphatic linear or branched carboxylic acid and/or salts thereof preferably at least one aliphatic carboxylic acid having a total amount of carbon atoms from C4 to C24 and/or a salt thereof, more preferably at least one aliphatic carboxylic acid having a total amount of carbon atoms from C12 to C20 and/or a salt thereof, most preferably at least one aliphatic carboxylic acid having a total amount of carbon atoms from C16 to C18 and/or a salt thereof.

The carboxylic acid in the meaning of the present invention may be selected from one or more linear chain, branched chain, saturated, or unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic linear or branched carboxylic acid and/or salt thereof is selected from saturated unbranched carboxylic acids, preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid, their salts, their anhydrides and mixtures thereof.

In another embodiment of the present invention, the aliphatic linear or branched carboxylic acid and/or salt thereof is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid, their salts, their anhydrides and mixtures thereof.

Preferably, the aliphatic carboxylic acid and/or a salt or anhydride thereof is stearic acid and/or a stearic acid salt or stearic anhydride.

Alternatively, the unsaturated aliphatic linear or branched carboxylic acid is preferably selected from the group consisting of myristoleic acid, palmitoleic acid, sapienic acid, oleic acid, elaidic acid, vaccenic acid, linoleic acid, α-linolenic acid, eicosapentaenoic acid, docosahexaenoic acid and mixtures thereof. More preferably, the unsaturated aliphatic linear or branched carboxylic acid selected from the group consisting of myristoleic acid, palmitoleic acid, sapienic acid, oleic acid, elaidic acid, vaccenic acid, linoleic acid, α-linolenic acid and mixtures thereof. Most preferably, the unsaturated aliphatic linear or branched carboxylic acid is oleic acid and/or linoleic acid, preferably oleic acid or linoleic acid, most preferably linoleic acid.

Additionally or alternatively, the surface treatment agent is a salt of an unsaturated aliphatic linear or branched carboxylic acid.

The term "salt of an unsaturated aliphatic linear or branched carboxylic acid" refers to an unsaturated fatty acid, wherein the active acid group is partially or completely neutralized. The term "partially neutralized" unsaturated aliphatic linear or branched carboxylic acid refers to a degree of neutralization of the active acid groups in the range from 40 and 95 mole-% preferably from 50 to 95 mole-%, more preferably from 60 to 95 mole-% and most preferably from 70 to 95 mole-%. The term "completely neutralized" unsaturated aliphatic linear or branched carboxylic acid refers to a degree of neutralization of the active acid groups of >95 mole-%, preferably of >99 mole-%, more preferably of >99.8 mole-% and most preferably of 100 mole-%. Preferably, the active acid groups are partially or completely neutralized.

The salt of unsaturated aliphatic linear or branched carboxylic acid is preferably a compound selected from the group consisting of sodium, potassium, calcium, magnesium, lithium, strontium, primary amine, secondary amine, tertiary amine and/or ammonium salts thereof, whereby the amine salts are linear or cyclic. For example, the unsaturated aliphatic linear or branched carboxylic acid is a salt of oleic acid and/or linoleic acid, preferably oleic acid or linoleic acid, most preferably linoleic acid.

According to another embodiment of the present invention, the surface-treatment composition comprises a further surface-treatment agent, which is at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof. Preferably. the surface-treatment composition comprises a further surface-treatment agent, which is at least one mono-substituted succinic anhydride consisting of succinic anhydride mono-substituted with a group being a linear aliphatic group having a total amount of carbon atoms from at least C2 to C30 in the substituent and/or salts thereof. Additionally or alternatively, the surface-treatment composition comprises a further surface-treatment agent, which is at least one mono-substituted succinic anhydride consisting of succinic anhydride mono-substituted with a group being a branched aliphatic group having a total amount of carbon atoms from at least C3 to C30 in the substituent and/or salts thereof. Additionally or alternatively, the surface-treatment composition comprises a further surface-treatment agent, which is at least one mono-substituted succinic anhydride consisting of succinic anhydride mono-substituted with a group being a cyclic aliphatic group having a total amount of carbon atoms from at least C5 to C30 in the substituent and/or salts thereof.

Accordingly, it should be noted that the at least one mono-substituted succinic anhydride may be one kind of mono-substituted succinic anhydride. Alternatively, the at least one mono-substituted succinic anhydride may be a mixture of two or more kinds of mono-substituted succinic anhydride. For example, the at least one mono-substituted succinic anhydride may be a mixture of two or three kinds of mono-substituted succinic anhydride, like two kinds of mono-substituted succinic anhydride.

In one embodiment of the present invention, the at least one mono-substituted succinic anhydride is one kind of mono-substituted succinic anhydride.

It is appreciated that the at least one mono-substituted succinic anhydride represents a surface treatment agent and consists of succinic anhydride mono-substituted with a group selected from any linear, branched, aliphatic, and cyclic group having a total amount of carbon atoms from C2 to C30 in the substituent.

In one embodiment of the present invention, the at least one mono-substituted succinic anhydride consists of succinic anhydride mono-substituted with a group selected from a linear, branched, aliphatic, and cyclic group having a total amount of carbon atoms from C3 to C20 in the substituent. For example, the at least one mono-substituted succinic anhydride consists of succinic anhydride mono-substituted with a group selected from a linear, branched, aliphatic, and cyclic group having a total amount of carbon atoms from C4 to C18 in the substituent. Preferably. the surface-treatment composition comprises a further surface-treatment agent, which is at least one mono-substituted succinic anhydride consisting of succinic anhydride mono-substituted with a group being a linear aliphatic group having a total amount of carbon atoms from C3 to C20, more preferably from C4 to C18, in the substituent and/or salts thereof. Additionally or alternatively, the surface-treatment composition comprises a further surface-treatment agent, which is at least one mono-substituted succinic anhydride consisting of succinic anhydride mono-substituted with a group being a branched aliphatic group having a total amount of carbon atoms from C3 to C20, more preferably from C4 to C18, in the substituent and/or salts thereof. Additionally or alternatively, the surface-treatment composition comprises a further surface-treatment agent, which is at least one mono-substituted succinic anhydride consisting of succinic anhydride mono-substituted with a group being a cyclic aliphatic group having a total amount of carbon atoms from C5 to C20, more preferably from C5 to C18 in the substituent and/or salts thereof.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched and aliphatic group having a total amount of carbon atoms from C3 to C30, preferably from C3 to C20 and most preferably from C4 to C18 in the substituent.

Thus, it is preferred that the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, it is preferred that the at least one mono-substituted succinic anhydride consists of succinic anhydride mono-substituted with one group being a branched alkyl group having a total amount of carbon atoms from C3 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C3 to C30, preferably from C3 to C20 and most preferably from C4 to C18 in the substituent.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

Accordingly, it is appreciated that, e.g., the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that, e.g., the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

According to another embodiment of the present invention, the surface-treatment composition comprises a further surface-treatment agent, which is at least one polydialkylsiloxane.

Preferred polydialkylsiloxanes are described e.g. in US 2004/0097616 A1. Most preferred are polydialkylsiloxanes selected from the group consisting of polydimethylsiloxane, preferably dimethicone, polydiethylsiloxane and polymethylphenylsiloxane and/or mixtures thereof.

For example, the at least one polydialkylsiloxane is preferably a polydimethylsiloxane (PDMS).

The composition of the present invention is preferably formed in that the at least one calcium or magnesium carbonate-comprising material and the at least one cross-linkable compound are provided as physical mixture and/or in that the at least one calcium or magnesium carbonate-comprising material is contacted with the at least one cross-linkable compound such that a treatment layer comprising the at least one cross-linkable compound and/or salty reaction products thereof is formed on the surface of the at least one calcium or magnesium carbonate-comprising material. For example, the composition of the present invention is formed in that the at least one calcium or magnesium carbonate-comprising material and the at least one cross-linkable compound are provided as physical mixture or in that the at least one calcium or magnesium carbonate-comprising material is contacted with the at least one cross-linkable compound such that a treatment layer comprising the at least one cross-linkable compound and/or salty reaction products thereof is formed on the surface of the at least one calcium or magnesium carbonate-comprising material. Preferably, the composition of the present invention is formed in that the at least one calcium or magnesium carbonate-comprising material is contacted with the at least one cross-linkable compound such that a treatment layer comprising the at least one cross-linkable compound and/or salty reaction products thereof is formed on the surface of the at least one calcium or magnesium carbonate-comprising material. Thus, the composition of the present invention is preferably a surface-treated calcium or magnesium carbonate-comprising material comprising a treatment layer comprising the at least one cross-linkable compound and/or salty reaction products thereof is formed on the surface of the at least one calcium or magnesium carbonate-comprising material.

In a further embodiment, the composition of the present invention is formed in that the at least one calcium or magnesium carbonate-comprising material, the at least one cross-linkable compound and the further surface-treatment agent are provided as physical mixture and/or in that the at least one calcium or magnesium carbonate-comprising material is contacted with the at least one cross-linkable compound and the further surface-treatment agent such that a treatment layer comprising the at least one cross-linkable compound and/or salty reaction products thereof and the further surface-treatment agent and/or salty reaction products thereof is formed on the surface of the at least one calcium or magnesium carbonate-comprising material. For example, the composition of the present invention is formed in that the at least one calcium or magnesium carbonate-comprising material, the at least one cross-linkable compound and the further surface-treatment agent are provided as physical mixture or in that the at least one calcium or magnesium carbonate-comprising material is contacted with the at least one cross-linkable compound and the further surface-treatment agent such that a treatment layer comprising the at least one cross-linkable compound and/or salty reaction products thereof and the further surface-treatment agent and/or salty reaction products thereof is formed on the surface of the at least one calcium or magnesium carbonate-comprising material. Preferably, the composition of the present invention is formed in that the at least one calcium or magnesium carbonate-comprising material is contacted with the at least one cross-linkable compound and the further surface-treatment agent such that a treatment layer comprising the at least one cross-linkable compound and/or salty reaction products thereof and the further surface-treatment agent and/or salty reaction products thereof is formed on the surface of the at least one calcium or magnesium carbonate-comprising material. In this embodiment, the composition of the present invention is preferably a surface-treated calcium or magnesium carbonate-comprising material comprising a treatment layer comprising the at least one cross-linkable compound and/or salty reaction products thereof and the further surface-treatment agent and/or salty reaction products thereof is formed on the surface of the at least one calcium or magnesium carbonate-comprising material.

It is appreciated that the treatment layer on at least a part of the calcium or magnesium carbonate-comprising material is formed by contacting the calcium or magnesium carbonate-comprising material with the further surface-treatment agent as described hereinabove. The calcium or magnesium carbonate-comprising material is contacted with the surface-treatment composition in an amount from 0.1 to 10 mg/m$^2$ of the calcium or magnesium carbonate-comprising material surface, preferably 0.1 to 8 mg/m$^2$, more preferably 0.11 to 3 mg/m$^2$. That is, a chemical reaction may take place between the calcium or magnesium carbonate-comprising material and the surface treatment agent. In other words, the treatment layer may comprise the surface treatment agent and/or salty reaction products thereof.

The term “salty reaction products” of the further surface-treatment agent refers to products obtained by contacting the calcium or magnesium carbonate-comprising material with the surface-treatment composition comprising the further surface-treatment agent. Said reaction products are formed between at least a part of the applied further surface-treatment agent and reactive molecules located at the surface of the calcium or magnesium carbonate-comprising material.

Process for the Preparation of the Composition

Methods for the preparation of compositions as described herein, and especially the surface treatment of fillers, are known to the skilled person, and are described, for example, in EP 3 192 837 A1, EP 2 770 017 A1, and WO 2016/023937. According to one aspect of the present invention, the composition of the present invention is obtainable by a dry process comprising at least the following steps:

a) providing a calcium or magnesium carbonate-comprising material selected from among sedimentary ground calcium carbonate (GCC), precipitated calcium carbonate (PCC), surface-reacted calcium carbonate (SRCC), precipitated hydromagnesite and mixtures thereof;
b) providing at least one cross-linkable compound comprising at least two functional groups, wherein at least one functional group is suitable for cross-linking an elastomer resin and wherein at least one functional group is suitable for reacting with the calcium or magnesium carbonate-comprising material in an amount from 0.1 to 10 $mg/m^2$, based on the total weight of the calcium or magnesium carbonate-comprising material,
c) optionally providing at least one further surface-treatment agent as defined herein,
d) optionally heating the at least one cross-linkable compound, and
e) contacting the calcium or magnesium carbonate-comprising material under mixing, in one or more steps, with the at least one cross-linkable compound,
f) if present, heating the at least one further surface-treatment agent to its melting point or above such that a molten surface-treatment agent is obtained and contacting the calcium or magnesium carbonate-comprising material under mixing, in one or more steps, with the molten surface-treatment agent simultaneously or subsequently to the at least one cross-linkable compound.

It is appreciated that the calcium or magnesium carbonate-comprising material in step a) is preferably provided in dry form. Additionally or alternatively, the at least one grafted polymer material in step b) is preferably provided in dry form. Preferably, the calcium carbonate-comprising material in step a) is provided in dry form and the at least one cross-linkable compound in step b) is provided in dry form. In a preferred embodiment, the composition is thus prepared in a dry process. With respect to the process, it is to be noted that the wording "dry form" or "dry process" means that the calcium carbonate-comprising material in step a) and/or the at least one cross-linkable compound in step b) is/are provided without the use of solvent(s) such as water.

It is appreciated that the at least one cross-linkable compound may be in solid, highly viscous or liquid state. Typically, the at least one cross-linkable compound is in highly viscous or liquid state. It is preferred that the at least one cross-linkable compound is provided in liquid state in process step e). Thus, the at least one cross-linkable compound may be optionally heated to provide the at least one cross-linkable compound in liquid stated, i.e. in a less viscous state. In one embodiment, the process thus includes a step of heating the at least one cross-linkable compound. Such a heating step d) is preferably carried out in case the at least one cross-linkable compound is solid or highly viscous. However, even if the at least one cross-linkable compound in step b) is in liquid state it may be favourable to carry out heating step d) in order to speed up and increase the reaction.

In general, step e) is carried out at a temperature from 5 to 200° C. preferably from 20 to 150° C., and most preferably from 40 to 150° C., e.g. from 80 to 150° C. If the process comprises step d) of heating the at least one cross-linkable compound, step d) and step e) are preferably carried out at a temperature from 40 to 150° C., e.g. from 80 to 150° C. It is appreciated that the temperature in optional step d) and step e) are adjusted such that the at least one cross-linkable compound is in a liquid state but without thermally decomposing the at least one cross-linkable compound.

If step d) is present, step d) and step e) can be carried out simultaneously or separately. If step d) and step e) are carried out separately, step d) is preferably carried out after step e). If step d) is carried out after step e), the at least one cross-linkable compound of step b) is preferably added in dry form and heated (i.e. the at least one cross-linkable compound is made less viscous) once in contact with the calcium carbonate-comprising material of step a). It is also possible that the calcium carbonate-comprising material is contacted under mixing, in one or more steps, with the at least one cross-linkable compound and subsequently heated.

It is preferred that, if present, step d) and step e) are carried out simultaneously, preferably in the same vessel, i.e. in that the mixture of the at least one calcium or magnesium carbonate-comprising material and the at least one cross-linkable compound is heated to a temperature from 5 to 200° C., preferably from 20 to 150° C., and most preferably from 40 to 150° C., e.g. from 80 to 150° C.

Step e) and optional step f) are carried out under mixing. It is appreciated that the mixing can be carried out by any method or in any vessel known to the skilled person resulting in a homogeneous composition. For example, step e) and optional step f) are carried out in a high speed mixer or pin mill.

If the dry process comprises a step of contacting the calcium or magnesium carbonate-comprising material with the further surface-treatment agent, step f) is carried out at a temperature of at least 2° C., preferably at least 5° C. and most preferably at least 10° C., above the melting point of the further surface treatment agent, preferably at a temperature from 5 to 200° C., e.g. from 20 to 150° C. Such temperature results in a molten surface treatment agent. It is appreciated that the temperature in step f) is adjusted such that the further surface treatment agent is in a molten state but without thermally decomposing the further surface treatment agent.

Such a dry process results in a favourable composition of the present invention in that the composition obtained has an advantageous residual total moisture content as well as moisture pick-up susceptibility. It is appreciated that a low residual total moisture content results in favourable mechanical characteristics of the elastomer when the composition of the present invention is incorporated therein. Furthermore, it is to be noted that in such a dry process there may be residual functional groups of the at least one cross-linkable compound left that may not have been reacted or only partially reacted with the calcium or magnesium carbonate-comprising material, which may be an advantage for the use in the elastomer. In this regard, it is assumed that the residual functional groups of the at least one cross-linkable compound that may not have been reacted or only partially reacted with the calcium or magnesium carbonate-comprising material may act as a processing aid during compounding. Contrary thereto, in a wet process, i.e. if the treatment is carried out in a slurry, no further advantages are achieved when the composition is incorporated into the elastomer.

Preferably, the composition has a residual total moisture content of ≤2 wt.-%, based on the total dry weight of the at least one calcium carbonate-comprising material, more preferably ≤1.5 wt.-%, even more preferably ≤1.2 wt.-%, and most preferably ≤0.8 wt.-%. In one embodiment, the composition has a residual moisture content of from 0.001 wt.-% to 2 wt.-%, based on the total dry weight of the at least one calcium carbonate-comprising material, preferably from 0.001 wt.-% to 1.5 wt.-%, more preferably from 0.002 wt.-% to 1.2 wt.-%, and most preferably from 0.005 wt.-% to 0.8 wt.-%. This is especially applicable in case the calcium carbonate-comprising material is sedimentary ground calcium carbonate (GCC) and/or precipitated calcium carbonate (PCC). If the calcium carbonate-comprising material is surface-reacted calcium carbonate or the magnesium carbonate-comprising material is precipitated hydromagnesite, the composition preferably has a residual total moisture content of from 0.01 wt.-% to 10 wt.-%, based on the total dry weight of the calcium or magnesium carbonate-comprising material, preferably from 0.01 wt.-% to 8 wt.-%, more preferably from 0.02 wt.-% to 6 wt.-%, and most preferably from 0.03 wt.-% to 4 wt.-%.

In a preferred embodiment, the composition is formed from the calcium or magnesium carbonate-comprising material and the surface-treatment composition comprising, preferably consisting of, at least one cross-linkable compound comprising at least two functional groups, wherein at least one functional group is suitable for cross-linking an elastomer resin and wherein at least one functional group is suitable for reacting with the calcium or magnesium carbonate-comprising material only.

In this embodiment, the present process comprises at least the following steps:

a) providing a calcium or magnesium carbonate-comprising material selected from among sedimentary ground calcium carbonate (GCC), precipitated calcium carbonate (PCC), surface-reacted calcium carbonate (SRCC), precipitated hydromagnesite and mixtures thereof;
b) providing at least one cross-linkable compound comprising at least two functional groups, wherein at least one functional group is suitable for cross-linking an elastomer resin and wherein at least one functional group is suitable for reacting with the calcium or magnesium carbonate-comprising material in an amount from 0.1 to 10 mg/m$^2$, based on the total weight of the calcium or magnesium carbonate-comprising material,
c) optionally heating the at least one cross-linkable compound, and
d) contacting the calcium or magnesium carbonate-comprising material under mixing, in one or more steps, with the at least one cross-linkable compound.

In this embodiment, the surface-treatment layer is formed upon contacting the calcium or magnesium carbonate-comprising material with the at least one cross-linkable compound only. Thus, the surface treatment composition consists of the at least one cross-linkable compound.

It is appreciated that step d) is preferably carried out at a temperature from 5 to 200° C., more preferably from 20 to 150° C., and most preferably from 40 to 150° C., e.g. from 80 to 150° C. If optional heating step c) is present, step c) is preferably carried out at a temperature from 40 to 150° C., e.g. from 80 to 150° C.

In another preferred embodiment, the composition is formed from the calcium or magnesium carbonate-comprising material and the surface-treatment composition comprising, preferably consisting of, at least one cross-linkable compound comprising at least two functional groups, wherein at least one functional group is suitable for cross-linking an elastomer resin and wherein at least one functional group is suitable for reacting with the calcium or magnesium carbonate-comprising material and the further surface-treatment agent.

In this embodiment, the present process comprises at least the following steps:

a) providing a calcium or magnesium carbonate-comprising material selected from among sedimentary ground calcium carbonate (GCC), precipitated calcium carbonate (PCC), surface-reacted calcium carbonate (SRCC), precipitated hydromagnesite and mixtures thereof;
b) providing at least one cross-linkable compound comprising at least two functional groups, wherein at least one functional group is suitable for cross-linking an elastomer resin and wherein at least one functional group is suitable for reacting with the calcium or magnesium carbonate-comprising material in an amount from 0.1 to 10 mg/m$^2$, based on the total weight of the calcium or magnesium carbonate-comprising material,
c) providing at least one further surface-treatment agent,
d) optionally heating the at least one cross-linkable compound, and
e) contacting the calcium or magnesium carbonate-comprising material under mixing, in one or more steps, with the at least one cross-linkable compound,
f) heating the at least one further surface-treatment agent to its melting point or above such that a molten surface-treatment agent is obtained and contacting the calcium or magnesium carbonate-comprising material under mixing, in one or more steps, with the molten surface-treatment agent simultaneously or subsequently, preferably subsequently, to the at least one cross-linkable compound.

If the surface-treatment composition comprises a further surface treatment agent, the at least one cross-linkable compound and the further surface-treatment agent may be provided as a mixture prior to contacting the calcium or magnesium carbonate-comprising material with the surface-treatment composition. In this embodiment, the calcium or magnesium carbonate-comprising material is contacted with the molten surface-treatment agent simultaneously to the at least one cross-linkable compound. Alternatively, the calcium or magnesium carbonate-comprising material may be contacted with the at least one cross-linkable compound, and the further surface-treatment agent subsequently in any order. That is to say, the surface-treatment layer is formed upon contacting the calcium or magnesium carbonate-comprising material with the at least one cross-linkable compound and the molten further surface-treatment agent in subsequent steps. It is appreciated that the calcium or magnesium carbonate-comprising material is contacted with the molten surface-treatment agent preferably before the contacting of the calcium or magnesium carbonate-comprising material with the at least one cross-linkable compound.

In a preferred embodiment, process step e) and process step f) are carried out subsequently and the calcium or magnesium carbonate-comprising material is first contacted with the molten surface-treatment agent followed by the at least one cross-linkable compound.

In an alternative embodiment, process step e) and process step f) are carried out subsequently and the calcium or magnesium carbonate-comprising material is first contacted with the at least one cross-linkable compound followed by the molten surface-treatment agent.

It is appreciated that step f) is preferably carried out at a temperature of at least 2° C., preferably at least 5° C. and most preferably at least 10° C. above the melting point of the further surface treatment agent(s). For example, step f) is carried out at a temperature of 2° C. to 30° C., preferably of 5° C. to 25° C., and most preferably 10° C. to 20° C., above the melting point of the further surface treatment agent(s).

In one embodiment, optional step d), step e) and step f) are carried out at a temperature from 5 to 200° C., preferably from 20 to 150° C., and most preferably from 40 to 150° C., e.g. from 80 to 150° C.

Products

Another aspect of the present invention refers to a curable elastomer mixture comprising an elastomer resin and from 5 to 300 wt.-%, preferably from 10 to 150 wt.-%, more preferably from 20 to 110 wt.-% and most preferably from 40 to 100 wt.-%, based on the total weight of the elastomer resin, of the composition as defined herein, wherein the composition is dispersed in the elastomer resin.

The elastomer resin of the present invention is a cross-linkable polymer that results in an elastomer showing rubber-like elasticity. Thus, it is understood that the elastomer resin of the present invention is suitable of forming cross-linkings of the cross-linkable polymer, also denoted as the elastomer precursor. Any crosslinking method, such as chemical crosslinking by crosslinking agents, vulcanization, crosslinking by ultraviolet light radiation, electron-beam radiation, nuclear radiation, gamma radiation, microwave radiation and/or ultrasonic radiation, is suitable for the purposes of the present invention.

The elastomer resin of the present invention may comprise any kind of natural or synthetic rubber. For example, the elastomer resin may be selected from an acrylic rubber, butadiene rubber, acrylonitrile-butadiene rubber, epichlorhydrin rubber, isoprene rubber, ethylene-propylene rubber, ethylene-propylene-diene monomer rubber, nitrile-butadiene rubber, butyl rubber, styrene-butadiene rubber, polyisoprene, hydrogenated nitrile-butadiene rubber, carboxylated nitrile-butadiene rubber, chloroprene rubber, isoprene isobutylene rubber, chloro-isobutene-isoprene rubber, brominated isobutene-isoprene rubber, silicone rubber, fluorocarbon rubber, polyurethane rubber, polysulfide rubber, thermoplastic rubber, and mixtures thereof. These types of rubber are well-known to the skilled person (see Winnacker/Küchler, "Chemische Technik. Prozesse und Produkte", $5^{th}$ vol., $5^{th}$ Ed., Wiley-VCH 2005, Ch. 4, pp. 821 to 896). Commonly, the rubbers are denoted in abbreviated form according to DIN ISO-R 1629:2015-03 or ASTM D1418-17. The elastomer resin according to the present invention is suitable of forming crosslinkings of suitable elastomer precursors described hereinbelow.

Natural rubber (NR) in the sense of the present invention is a polymeric material comprising polyisoprene, wherein the polyisoprene may be obtained from natural sources, such as the rubber tree (*Hevea brasiliensis*), spurges (*Euphorbia* spp.), dandelion (*Taxacum officinale* and *Taxacum koksaghyz*), *Palaquium gutta*, rubber fig (*Ficus elastica*), bulletwood (*Manilkara bidentata*) or guayule (*Parthenium argentatum*). Depending on the source of natural rubber, the rubber may be present, e.g., as cautchouc (cis-1,4-polyisoprene), gutta-percha (trans-1,4-polyisoprene), or chicle (commonly a mixture of cis-1,4-polyisoprene and trans-1,4-polyisoprene).

Synthetic rubbers are commonly produced from radical, anionic, cationic or coordination polymerization from synthetic monomers, and subsequent crosslinking. The polymerization reaction may be performed, e.g., as polymerization in emulsion, solution, or suspension.

For example, ethylene-propylene rubber (EPR) is typically formed by radical copolymerization of ethylene and propylene. Optionally, small amounts (e.g., less than 10 mol-%, based on the total amount of monomers, preferably less than 5 mol-%) of diene monomers, such as butadiene, dicyclopentadiene, ethylidene norbornene or norbornadiene may be present. If a diene monomer is present during the copolymerization, the formed ethylene-propylene rubber is denoted as ethylene-propylene-diene rubber (EPDM) and comprises unsaturated carbon moieties, which may facilitate crosslinking of the obtained rubber. Alternatively, EPDM may be synthesized by coordination polymerization using vanadium-based catalysts, such as $VCl_4$ or $VOCl_3$. Commercially available EPDM is for example EPDM Vistalon™ 2504 form ExxonMobile or EPDM Keltan® 6950C from ARLANXEO Netherlands B.V Butadiene rubbers (BR) are commonly formed from coordination polymerization of butadiene in the presence of Ziegler-Natta catalysts, and also by anionic polymerization. The butadiene rubber thus obtained may have different structural units, such as cis-1,4-, trans-1,4- and 1,2-butadiene structural units, wherein the latter may be present in syndiotactic, isotactic and/or atactic form.

Styrene-butadiene rubbers (SBR) are copolymers of styrene and butadiene, which may be present as random copolymers or block-copolymers. Specific examples include E-SBR (i.e., SBR obtained by emulsion polymerization) and L-SBR (i.e., SBR obtained by anionic polymerization in solution).

Acrylonitrile-butadiene rubbers (NBR) typically are statistical copolymers of acrylonitrile and butadiene, which may comprise cis-1,4-, trans-1,4- and 1,2-butadiene and acrylonitrile structural units in varying amounts. The skilled person knows how to adjust the polymerization conditions in emulsion copolymerization, e.g., the monomer ratio, reaction time, reaction temperature, use of emulsifiers, accelerators (e.g., thiurams, dithiocarbamates, sulfonamides, benzothiazole disulfide) and chain terminating agents (such as dimehtyldithiocarbamate and diethyl hydroxylamine), in order to obtain a suitable distribution of these structural units. NBR may have a number average molecular weight $M_n$ in a broad range from 1500 g/mol to 1500 kg/mol, for example from 3000 g/mol to 1000 kg/mol, or from 5000 g/mol to 500 kg/mol. The acrylonitrile content may range from 10 mol-% to 75 mol-%, preferably from 15 to 60 mol-%, based on the total amount of monomer units. NBR may be resistant to oil, fuel and other non-polar chemicals, and therefore, is commonly applied in fuel and oil handling hoses, seals, grommets, and self-sealing fuel tanks, protective gloves, footwear, sponges, expanded foams, mats and in aeronautical applications. Mixtures of NBR with other rubbers, such as EPDM, or thermoplastic polymers, such as PVC, may also be employed.

Hydrogenated nitrile-butadiene rubber (HNBR) may be obtained by hydrogenation of NBR in the presence of hydrogenation catalysts, such as cobalt-, rhodium-, ruthenium-, iridium-, or palladium-based systems.

In another embodiment of the present invention, carboxylated NBR (XNBR) may be used, which may be obtained by copolymerization of butadiene and acrylonitrile with small amounts (e.g., less than 10 mol-%, preferably less than 5 mol-%, based on the total amount of monomers) of acrylic or methacrylic acid. XNBR may be crosslinked by the addition of metal salts, preferably multivalent metal salts, such as calcium salts, zinc salts, magnesium salts, zirconium salts, or aluminum salts, in addition or alternatively to the crosslinking methods described hereinbelow.

Polyisoprene, also termed isoprene rubber (IR), may be synthesized by anionic or Ziegler-Natta polymerization of isoprene, and may comprise cis-1,4-, trans-1,4-, 1,2-, and 3,4-isoprene structural units. The skilled person knows how to adjust the reaction conditions in order to obtain a suitable molar distribution of said building units.

Isobutene-isoprene rubbers (IIR), also termed butyl rubber, are typically synthesized by cationic polymerization starting from isobutene and isoprene monomer units in the presence of a catalyst, such as aluminum trichloride or dialkylaluminum chlorides. Halogenated IIR, such as chlorinated IIR (CIIR) or brominated IIR (BIIR) may suitably be obtained by post polymerization modification of IIR, e.g., chlorination using chlorine or bromination using bromine, which is typically performed under exclusion of light and temperatures in the range from 40 to 60° C. The halogen content of the halogenated IIRs preferably is in the range from 0.5 to 5 wt.-%, more preferably 1.0 to 2.5 wt.-%, based on the total weight of the halogenated IIR.

Polychloroprene, also denoted as chloroprene rubber (CR), may be produced by radical emulsion polymerization of chloroprene (2-chlorobutadiene). The polymer may primarily comprise trans-1,4-chloroprene and 1,2-chloroprene units in varying amounts, depending on the polymerization conditions, which may be suitably adapted by the skilled person. In addition or alternatively to the crosslinking methods hereinbelow, CR may be crosslinked at higher temperatures due to the extrusion of hydrochloric acid, optionally in the presence of an acid acceptor, such as a metal oxide or hydroxide, preferably zinc oxide, magnesium oxide, or combinations thereof. Said acid acceptor may be introduced into the elastomer already during polymerization or during mixing of the elastomer precursor with the remaining compounds of the elastomer composition.

Acrylic rubbers (ACM) may be synthesized by emulsion or suspension radical polymerization. Typical monomers comprise acrylic acid ester monomers, preferably comprising a saturated or unsaturated, linear or branched group comprising from 1 to 20 carbon atoms, preferably 1 to 8 carbon atoms. Suitable ACM are commercially available, e.g., under the tradenames Noxtite® ACM or Nipol® AR.

Epichlorohydrin rubbers may be obtained by ring-opening polymerization of epichlorohydrin, optionally further comprising monomers selected from the group comprising ethylene oxide, propylene oxide, and allylglycidyl ether, typically in the presence of a catalyst, such as trialkyl aluminum.

Silicone rubbers typically are poly(diorganyl)siloxanes and may be formed by hydrolysis-condensation of, e.g., diorganyldihalogenidosiloxanes. The organyl groups may be selected from the group comprising alkyl, aryl, and alkenyl groups.

Polyurethane rubbers comprise urethane structural building units formed from the reaction of isocyanates (i.e., diisocyanates and polyisocyanates) and alcohols (i.e., diols, triols, polyols).

Polysulfide rubbers may be formed from the polycondensation reaction of dihalides (X—R—X) with sodium polysulfides (Na—$S_x$—Na, with x≥2). Typical examples include Thiokol A, Thiokol FA, and Thiokol ST.

Thermoplastic rubbers (TPR or TPE) in the meaning of the present invention are materials, which show elastic properties, and processing properties of thermoplastic materials. The TPR may be selected from the group comprising block copolymers, such as styrene-diene block copolymers, styrene-ethylene-butylene rubbers, polyester TPE, polyurethane TPE or polyamide TPE, mixtures of elastomers and non-elastomers, such as mixtures of EPDM with PP and/or PE, mixtures of NR with polyolefins, or mixtures of IIR and polyolefins, and ionomeric polymers, for example zincous salts of sulfonated and maleinized EPDM.

A "fluorocarbon rubber" in the meaning of the present invention is a fluorine-containing polymer which has a low Tg value, e.g. a Tg value of less than 0° C., preferably less than −5° C., more preferably less than −10° C., and most preferably less than −15° C., and displays rubber-like elasticity (cf. IUPAC, Compendium of Chemical Terminology, 2nd Ed. (the "gold book"), 1997, "elastomer"). Fluorocarbon rubbers may be categorized according to ASTM D1418—"Standard Practice for Rubber and Rubber Latices—Nomenclature". ASTM D1418 specifies three classes of fluorocarbon rubbers:

FKM fluorocarbon rubbers: Fluororubber of the polymethylene type that utilizes vinylidene fluoride as a comonomer and have substituent fluoro, alkyl, perfluoroalkyl or perfluoroalkoxy groups in the polymer chain, with or without a curesite monomer. FFKM fluorocarbon rubbers: Perfluororubber of the polymethylene type having all substituent groups on the polymer chain either fluoro, perfluoroalkyl, or perfluoroalkoxy groups. FEPM fluorocarbon rubbers: Fluororubber of the polymethylene type containing one or more of the monomeric alkyl, perfluoroalkyl, and/or perfluoroalkoxy groups with or without a curesite monomer (having a reactive pendant group). Most preferably the crosslinkable fluorocarbon rubber is a copolymer of vinylidene fluoride, hexafluoropropylene, and tetrafluoroethylene.

Methods for producing the crosslinkable fluorine-containing polymer are known in the art. Alternatively, crosslinkable fluorine-containing polymers are commercially available. Examples of commercially available fluorocarbon rubbers are Viton®, Viton®Extreme™, and Kalrez® fluorocarbon rubbers of DuPont Corporation, Dyneon™ fluorocarbon rubbers of 3M Corporation, DAI-EL™ fluorocarbon rubbers of Daikin Industries, Technoflon® of Solvay S.A., and Aflas® of Asahi Glass Co., Ltd. The skilled person will select the appropriate grade within these fluorocarbon rubber brands according to his needs.

Preferred elastomer resins according to the present invention are NBR, EPDM, CIIR, BIIR and CR, wherein NBR and EPDM are especially preferred.

The curable elastomer mixture may further comprise additives, such as colouring pigments, fibers, e.g. cellulose, glass or wood fibers, dyes, waxes, lubricants, oxidative- and/or UV-stabilizers, plasticizer, curing agents, crosslinking coagents, antioxidants and other fillers.

According to one embodiment, the curable elastomer mixture comprises a filler differing from the calcium or magnesium carbonate-comprising material of the present composition, preferably the other filler is selected from the group comprising carbon black, silica, sedimentary ground calcium carbonate, precipitated calcium carbonate, nanofillers, graphite, clay, talc, diatomaceous earth, barium sulfate, titanium dioxide, wollastonite, and mixtures thereof. Preferably, the curable elastomer mixture comprises another filler, such as carbon black, $TiO_2$, mica, clay, precipitated silica, talc or calcined kaolin.

Preferably, the other filler is present in the curable elastomer mixture in a volume ratio with the calcium or magnesium carbonate-comprising material in the range from 10:90 to 90:10, preferably from 25:75 to 75:25, and more preferably from 40:60 to 60:40, for example 50:50.

In a preferred embodiment, the elastomer composition further comprises a crosslinking coagent, wherein the crosslinking coagent preferably is selected from the group consisting of peroxide crosslinking agents and/or sulfur-based crosslinking agents.

If the crosslinking coagent is a peroxide, the crosslinking coagent can be selected from a very wide range, including peresters, perketals, hydroperoxides, peroxydicarbonates, diacyl peroxides and ketone peroxides. Examples of such peroxides include t-butyl peroctanoate, perbenzoate, methyl ethyl ketone peroxide, cyclohexanone peroxide, acetyl acetone peroxide, dibenzoyl peroxide, bis(4-t-butyl-cyclohexyl) peroxydicarbonate, dicumyl peroxide, 1,1-bis(tert-butylperoxy)-3,3,5-trimethylcyclohexane, 2,5-bis-(t-butylperoxy)-2,5-dimethylhexane, 2,5-bis-(t-butylperoxy)-2,5-dimethylhexyne, or α,α'-bis(t-butylperoxy) diisopropylbenzene, diisopropyl peroxydicarbonate, 1,1-bis (tert-hexylperoxy)-3,5,5-trimethylcyclohexane, 2,5-dimethylhexane-2,5-dihydroperoxide, di-tert-butyl peroxide, tert-butylcumyl peroxide, 2,5-dimethyl-2,5-bis (tert-butylperoxy)hexane, 2,5-dimethyl-2,5-bis(tert-butylperoxy)-3-hexine, tert-butyl peroxybenzoate, 2,5-dimethyl-2,5-bis(benzoylperoxy)hexane, tert-butyl peroxymaleate or tert-hexylperoxyisopropyl monocarbonate and the like. If desired, a mixture of two or more peroxides can be used.

Preferably the peroxide crosslinking coagents may be used in combination with 1,2,-polybutadiene, ethylene glycol dimethacrylate, triallyl phosphate, triallylisocyanurate, m-phenylenediamie-bis-maleimide or triallylcyanurate.

The sulphur based crosslinking coagent can be elemental sulphur or a sulphur-containing system, such as thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazole sulfenamide, N-tert-butyl-2-benzothiazole sulfenamide (TBBS) and the like; 2-mercaptoimidazoline, N,N-diphenylguanadine, N,N-di-(2-methylphenyl)-guanadine, thiazole accelerators such as 2-mercaptobenzothiazole, 2-(morpholinodithio)benzothiazole disulfide, zinc 2-mercaptobenzothiazole and the like; dithiocarbamates accelerators such as tellurium diethyldithiocarbamate, copper dimethyldithiocarbamate, bismuth dimethyldithiocarbamate, cadmium diethyldithiocarbamate, lead dimethyldithiocarbamate, zinc diethyldithiocarbamate and zinc dimethyldithiocarbamate. If desired, a mixture of two or more sulphur based crosslinking coagents can be used.

Alternatively, the crosslinking coagent may be selected from bisphenol-based crosslinking agents, or amine or diamine-based crosslinking agents. Examples of suitable amine crosslinking-agents are butylamine, dibutylamine, piperidine, trimethylamine, or diethylcyclohexylamine. Examples of suitable diamine crosslinking-agents are bis-cinnamylidene hexamethylene diamine, hexamethylene diamine carbamate, bis-peroxycarbamate such as hexamethylene-N,N'bis(tert-butyl peroxycarbamate or methylene bis-4-cyclohexyl-N, N'(tert-butylperoxycarbamate), piperazine, triethylene diamine, tetramethylethyldiamine, or diethylene triamine.

Examples of suitable bisphenol crosslinking-agents are 2,2-bis(4-hydroxyphenyl)hexafluoropropane, substituted hydroquinone, 4,4'-disubstituted bisphenol, or hexafluorobisphenol A.

It should be understood that the crosslinking coagent react with the elastomer resin during the crosslinking step, and thus, may form a part of the elastomer in the elastomer product. Furthermore, the elastomer product thus may comprise reaction products of the crosslinking coagent. Additionally or alternatively, crosslinking coagents such as peroxides may act as radical sources and thus provide radical initiation for crosslinking the elastomer resin.

It is appreciated that the present invention further relates to a cured elastomer product formed from the curable elastomer mixture as defined herein.

The cured elastomer product may be prepared by any method known to the skilled person. A suitable process for preparing the cured elastomer product comprises the steps of a) providing an elastomer resin,
b) providing from 5 to 300 wt.-%, based on the total weight of the elastomer resin, of at least one calcium or magnesium carbonate-comprising material as filler,
c) providing from 0.1 to 10 $mg/m^2$, based on the total weight of the calcium or magnesium carbonate-comprising material, of at least one cross-linkable compound comprising at least two functional groups, wherein at least one functional group is suitable for cross-linking an elastomer resin and wherein at least one functional group is suitable for reacting with the calcium or magnesium carbonate-comprising material,
d) optionally providing at least one further surface-treatment agent as defined herein,
e) optionally providing further additives such as colouring pigments, fibers, e.g. cellulose, glass or wood fibers, dyes, waxes, lubricants, oxidative- and/or UV-stabilizers, plasticizer, curing agents, crosslinking coagents, antioxidants and other fillers, such as carbon black, $TiO_2$, mica, clay, precipitated silica, talc or calcined kaolin,
f) contacting the components of step a), step b), step c) and optionally step d) and step e) in any order, and
g) curing the mixture obtained in step f such that a cured elastomer product is formed.

In one embodiment, the cured elastomer product comprises additives. A suitable process for preparing the cured elastomer product thus comprises the steps of a) providing an elastomer resin,
b) providing from 5 to 300 wt.-%, based on the total weight of the elastomer resin, of at least one calcium or magnesium carbonate-comprising material as filler,
c) providing from 0.1 to 10 $mg/m^2$, based on the total weight of the calcium or magnesium carbonate-comprising material, of at least one cross-linkable compound comprising at least two functional groups, wherein at least one functional group is suitable for cross-linking an elastomer resin and wherein at least one functional group is suitable for reacting with the calcium or magnesium carbonate-comprising material,
e) providing further additives such as colouring pigments, fibers, e.g. cellulose, glass or wood fibers, dyes, waxes, lubricants, oxidative- and/or UV-stabilizers, plasticizer, curing agents, crosslinking coagents, antioxidants and other fillers, such as carbon black, $TiO_2$, mica, clay, precipitated silica, talc or calcined kaolin, f) contacting the components of step a), step b), step c) and step e) in any order, and g) curing the mixture obtained in step f) such that a cured elastomer product is formed.

In one embodiment, the cured elastomer product comprises at least one further surface treatment agent in addition to the additives. A suitable process for preparing the cured elastomer product thus comprises the steps of a) providing an elastomer resin, b) providing from 5 to 300 wt.-%, based on the total weight of the elastomer resin, of at least one calcium or magnesium carbonate-comprising material as filler, c) providing from 0.1 to 10 mg/m$^2$, based on the total weight of the calcium or magnesium carbonate-comprising material, of at least one cross-linkable compound comprising at least two functional groups, wherein at least one functional group is suitable for cross-linking an elastomer resin and wherein at least one functional group is suitable for reacting with the calcium or magnesium carbonate-comprising material, d) providing at least one further surface-treatment agent as defined herein, e) providing further additives such as colouring pigments, fibers, e.g. cellulose, glass or wood fibers, dyes, waxes, lubricants, oxidative- and/or UV-stabilizers, plasticizer, curing agents, crosslinking coagents, antioxidants and other fillers, such as carbon black, $TiO_2$, mica, clay, precipitated silica, talc or calcined kaolin, f) contacting the components of step a), step b), step c), step d) and step e) in any order, and g) curing the mixture obtained in step f) such that a cured elastomer product is formed.

According to step f) of the inventive process, the components of step a), step b) and step c) are contacted in any order. Preferably, the contacting is carried out by mixing the components to form a mixture. During mixing step f), optionally at least one further surface-treatment agent and/or one or more additives, which are well known to the skilled person, may be added to the mixture as described hereinabove.

Preferably, in contacting step f) firstly the at least one calcium or magnesium carbonate-comprising material of step b) is contacted under mixing, in one or more steps, with the at least one cross-linkable compound of step c) and, if present, subsequently or simultaneously, with the at least one further surface-treatment agent of step d) such that a surface treatment layer comprising the at least one cross-linkable compound and/or salty reaction product(s) thereof and optionally the at least one further surface-treatment agent and/or salty reaction product(s) thereof is/are formed on the surface of said at least one calcium or magnesium carbonate-comprising material of step b), and secondly this surface-treated calcium or magnesium carbonate-comprising material is contacted under mixing, in one or more steps, with the elastomer resin of step a).

For example, in contacting step f) firstly the at least one calcium or magnesium carbonate-comprising material of step b) is contacted under mixing, in one or more steps, with the at least one cross-linkable compound of step c) such that a surface treatment layer comprising the at least one cross-linkable compound and/or salty reaction product(s) thereof is formed on the surface of said at least one calcium or magnesium carbonate-comprising material of step b), and secondly this surface-treated calcium or magnesium carbonate-comprising material is contacted under mixing, in one or more steps, with the elastomer resin of step a).

Alternatively, in contacting step f) firstly the at least one calcium or magnesium carbonate-comprising material of step b) is contacted under mixing, in one or more steps, with the at least one cross-linkable compound of step c) and subsequently or simultaneously, preferably subsequently, with the at least one further surface-treatment agent of step d) such that a surface treatment layer comprising the at least one cross-linkable compound and/or salty reaction product(s) thereof and the at least one further surface-treatment agent and/or salty reaction product(s) thereof is formed on the surface of said at least one calcium or magnesium carbonate-comprising material of step b), and secondly this surface-treated calcium or magnesium carbonate-comprising material is contacted under mixing, in one or more steps, with the elastomer resin of step a).

In view of the above, it is preferred that the components of step b), step c) and optional step d) are contacted first in order to obtain the composition of the present invention. As regards the process conditions, it is referred to the information provided above when providing detailed information on the method for the preparation of the composition. In a further step, the composition obtained by mixing the components of step b), step c) and optional step d) is then contacted with the elastomer resin of step a) and the further additives of optional step e).

If present, the further additives of step e) are contacted under mixing, in one or more steps, with the surface-treated calcium or magnesium carbonate-comprising material before or after, preferably after, the surface-treated calcium or magnesium carbonate-comprising material is contacted under mixing, in one or more steps, with the elastomer resin of step a).

It is appreciated that the further additives of optional step e) can be contacted in one or more steps with the components of step a), step b), step c) and optional step d). For example, the further additives of optional step e) can be contacted in several steps with the components of step a), step b), step c) and optional step d). For example, the further additives of optional step e), such as a crosslinking coagent, can be added before and during step g).

Contacting step f) may be performed by any means known to the skilled person, including, but not limited to, blending, extruding, kneading, and high-speed mixing.

Preferably, contacting step f) is performed in an internal mixer and/or external mixer, wherein the external mixer preferably is a cylinder mixer.

The mixture of step f) is cured to form a cured elastomer product in step g). The curing may be performed by any method known to the skilled person resulting in a curing of the elastomer resin, i.e. a cross-linking of the elastomer resin.

For example, step g) is performed by the addition of a crosslinking coagent and subsequent thermal crosslinking. The mixture is heated to a temperature sufficiently high to allow for the crosslinking coagent to react with the cross-linkable polymer and the al least one cross-linkable compound comprising at least two functional groups, for example at least 100° C., preferably at least 150° C., more preferably at least 180° C. Optionally, the curing step may be performed in combination with compression molding or injection molding or extrusion. During compression molding, pressure is applied to force the mixture into the defined shape of the mold, such that the mixture is in contact with all areas of the mold, and the mixture is crosslinked in the mold, such that the elastomer composition retains the desired shape. Preferably, compression molding is performed at a pressure of at least 100 bar, preferably of at least 150 bar, and more preferably of at least 200 bar.

Suitable crosslinking coagents are those referred to hereinabove.

In another preferred embodiment of the present invention, the curing in step g), i.e. crosslinking, is performed by energy-intense radiation, such as ultraviolet light radiation, electron-beam radiation, nuclear radiation, gamma radiation, microwave radiation, temperature-induced radiation and/or ultrasonic radiation.

In one embodiment, contacting step f is carried out during curing step g) in that the at least one cross-linkable compound is contacted under mixing with the elastomer resin of step a) before or after, preferably after, adding the at least one calcium or magnesium carbonate-comprising material.

It is appreciated that the process may comprise further steps such as processing/forming the cured elastomer product in any desired shape. Such steps of processing/forming are well known to the skilled person and can be e.g. carried out by shaping the cured elastomer product.

In another aspect, the present invention relates to the use of at least one cross-linkable compound comprising at least two functional groups, wherein at least one functional group is suitable for cross-linking an elastomer resin and wherein at least one functional group is suitable for reacting with the calcium or magnesium carbonate-comprising material in the compounding of an elastomer formed from an elastomer resin and at least one calcium or magnesium carbonate-comprising material as filler, to increase the mechanical properties of such a compounded elastomer in comparison to the same elastomer formed from the same elastomer resin and at least one calcium or magnesium carbonate-comprising material but without the at least one cross-linkable compound comprising at least two functional groups, wherein at least one functional group is suitable for cross-linking an elastomer resin and wherein at least one functional group is suitable for reacting with the calcium or magnesium carbonate-comprising material.

In a further aspect, the present invention relates to an article formed from a cured elastomer product, wherein the article is selected from the group comprising tubeless articles, membranes, sealings, gloves, pipes, cable, electrical connectors, oil hoses, shoe soles, O-ring seals, shaft seals, gaskets, tubing, valve stem seals, fuel hose, tank seals, diaphragms, flexi liners for pumps, mechanical seals, pipe coupling, valve lines, military flare blinders, electrical connectors, fuel joints, roll covers, firewall seals, clips for jet engines, and the like.

The scope and interest of the invention will be better understood based on the following examples which are intended to illustrate certain embodiments of the present invention and are non-limitative.

EXAMPLES

1. Measurement Methods

In the following, measurement methods implemented in the examples are described.

Particle Size Distribution

Volume median particle size $d_{50}$ (vol) and volume top cut particle size $d_{98}$ (vol) are evaluated using a Malvern Mastersizer 3000 Laser Diffraction System. The $d_{50}$ or $d_{98}$ value, measured using a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median particle size $d_{50}$ (wt) and weight top cut particle size $d_{98}$ (wt) is determined by the sedimentation method, which is an analysis of sedimentation behaviour in a gravimetric field. The measurement is made with a Sedigraph™ 5120, Micromeritics Instrument Corporation. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and sonicated.

The processes and instruments are known to the skilled person and are commonly used to determine the particle size of fillers and pigments.

Specific Surface Area (SSA)

The specific surface area was measured via the BET method according to ISO 9277:2010 using nitrogen as adsorbing gas on a Micromeritics ASAP 2460 instrument from Micromeritics. The samples were pretreated in vacuum (10-5 bar) by heating at 150° C. for a period of 60 min prior to measurement.

Porosimetry

The specific pore volume was measured using a mercury intrusion porosimetry measurement using a Micromeritics Autopore V 9620 mercury porosimeter having a maximum applied pressure of mercury 414 MPa (60000 psi), equivalent to a Laplace throat diameter of 0.004 μm (~nm). The equilibration time used at each pressure step is 20 seconds. The sample material is sealed in a 3 $cm^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764.).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Amount of Surface-Treatment Layer

The amount of the treatment layer on the magnesium and/or calcium ion-containing material is calculated theoretically from the values of the BET of the untreated magnesium and/or calcium ion-containing material and the amount of the one or more compound(s) that is/are used for the surface-treatment. It is assumed that 100% of the one or more compound(s) are present as surface treatment layer on the surface of the magnesium and/or calcium ion-containing material.

Molecular Weight

The number-average molecular weight $M_n$ is measured by gel permeation chromatography, according to ISO 16014-1:2019 and ISO 16014-2/2019.

Acid Number

The acid number is measured according to ASTM D974-14.

Iodine Number

The iodine number is measured according to DIN 53241/1.

Total Residual Moisture Content

The total residual moisture content was determined by thermogravimetric analysis (TGA). The equipment used to measure the TGA was the Mettler-Toledo TGA/DSC1 (TGA 1 STARe System) and the crucibles used were aluminium oxide 900 µl. The method consists of several heating steps under air (80 mL/min). The first step was a heating from 25 to 105° C. at a heating rate of 20° C./minute (step 1), then the temperature was maintained for 10 minutes at 105° C. (step 2), then heating was continued at a heating rate of 20° C./minute from 105 to 400° C. (step 3). The temperature was then maintained at 400° C. for 10 minutes (step 4), and finally, heating is continued at a heating rate of 20° C./minute from 400 to 600° C. (step 5). The total residual moisture content is the cumulated weight loss after steps 1 and 2.

Analysis on Cross-Linked Elastomer Product Samples

For all tests on the cured elastomer product samples, a minimum period of 16 h was kept between molding and testing of the product samples. The samples were kept in a controlled environment (temperature: 23±2° C., relative humidity: 50±5%).

Tensile Strength, Elongation at Break, Modulus M300, and Modulus M100:

Tensile strength, elongation at break, modulus M300, and modulus M100 were measured according to NF ISO 37 on a Zwick T2000, Zwick Z005, or Zwick Z100 device using the parameters outlined in Table 1 below.

TABLE 1

Tensile strength, elongation at break, modulus M300, and Modulus M100 measurement parameters.

| | |
|---|---|
| Standard | NF ISO 37 |
| Type of test piece | Type H2 |
| Preparation of test piece | Samples were cut from sheets of 2 ± 0.2 mm thickness |
| Cutting direction | Parallel of calendering direction |
| State | Initial |
| Temperature | 23 ± 2° C. |
| Relative humidity | 50 ± 5% |
| Number of test pieces used | 3 |
| Units | MPa for strength |
| Test specimen conditioning before test | Minimum 16 h at 23° C. and 50% relative humidity |
| Conditioning after ageing in air | None |
| Conditioning after immersion | None |
| Rate of grip separation | 500 mm/min |
| Relative uncertainty | ±10% |

Tear Resistance

Tear resistance (DELFT) was measured according to NF ISO 34-2 on a Zwick T2000, Zwick Z005, Zwick Z100 device using the parameters outlined in Table 2.

TABLE 2

Tear resistance (DELFT) measurement parameters.

| | |
|---|---|
| Standard | NF ISO 34-2 |
| Type of test piece | Delft |
| Preparation of test piece | Samples were cut from sheets of 2 ± 0.2 mm thickness |
| Cutting direction | perpendicular to calendering direction |
| State | Initial |
| Temperature | 23 ± 2° C. |
| Relative humidity | 50 ± 5% |
| Number of test pieces used | 3 |
| Test specimen conditioning before test | Minimum 16 h at 23° C. and 50% relative humidity |
| Rate of grip separation | 500 mm/min |
| Relative uncertainty | ±10% |

Hardness Shore A

Hardness (Shore A) was measured according to NE ISO 7619-1 on a Bareiss Digitest II apparatus using the parameters outlined in Table 3.

TABLE 3

Hardness (Shore A) measurement parameters.

| | |
|---|---|
| Standard | NF ISO 7619-1 |
| Type of device | A |
| Type of test piece | 50 × 25 × (2.0 ± 0.2) mm |
| Number of test pieces used | 3 |
| Test carry out | 3 s |
| Preparation of test piece | Samples were cut from sheets of 2 ± 0.2 mm thickness |
| State | Initial |
| Temperature | 23 ± 2° C. |
| Relative humidity | 50 ± 5% |
| Number of measurements | 5 |
| Unit | points |
| Test specimen conditioning before test | Minimum 16 h at 23° C. and 50% relative humidity |
| Absolute uncertainty | ±2 points % |

Hardness IRHD

Hardness (IRHD) was measured according to NE ISO 48-1 on a Wallace IRHD H14/1+Gibitre-PC type N automatic apparatus using the parameters outlined in Table 4.

TABLE 4

| Hardness (IRHD) measurement parameters. | |
|---|---|
| Standard | NF ISO 48-1 |
| Method | N |
| Type of test piece | 50 × 20 × (2.0 ± 0.2) mm |
| Number of test pieces used | 4 |
| Preparation of test piece | Samples were cut from sheets of 2 ± 0.2 mm thickness |
| State | Initial |
| Temperature | 23 ± 2° C. |
| Relative humidity | 50 ± 5% |
| Number of measurements | 5 |
| Unit | 0 |
| Test specimen conditioning before test | Minimum 16 h at 23° C. and 50% relative humidity |
| Conditioning after ageing in air | 16 h to 6 days at 23° C. and 50% relative humidity |
| Conditioning after immersion | none |
| Absolute uncertainty | ±2° |

Compression Set

These tests were provided on compression set plots type B, which are cylindrical molded rubber samples. The diameter of the sample was 13.0±0.5 mm and the thickness was 6.3±0.3 mm. Tests were carried out for 72 h at 10000 using the parameters outlined in Table 5.

TABLE 5

| Compression set. | |
|---|---|
| Standard | NF ISO 815-1 |
| Method | After 30 ± 3 min |
| Type of test piece | B |
| Number of test pieces used | 3 or 4 |
| nit | % |
| Compression | 25% |
| Conditioning after immersion | none |
| Lubricant | Silicone |
| Preparation of test piece | molded |
| Temperature | 23 ± 2° C. |
| Relative humidity | 50 ± 5% |
| Relative uncertainty | ±10% |

Electric Resistivity

Electrical resistivity was measured according to ISO 14309 with a Keithley electrometer, type 6517B using the parameters outlined in Table 6.

TABLE 6

| Electrical resistivity | |
|---|---|
| Standard | ISO 14309 |
| Type of test piece | 100 × 100 × 2 mm |
| Number of test pieces used: | 1 |
| Preparation of test piece | Samples were cut from sheets of 2 ± 0.2 mm thickness |
| State: | Initial, 23° C. |

2. Materials Used

The materials used for the present invention had the characteristics set out in the following.

Treatment A

Treatment A was a grafted polybutadiene homopolymer comprising at least one succinic anhydride group obtained by grafting maleic anhydride onto a polybutadiene homopolymer (Mn=3100 Da, Brookfield viscosity (25° C.)=6500 cPs+/−3500, functional groups/chain=2, anhydride equivalent weight 1238; acid number: 40.1-51.5 meq KOH/g, total acid: 7-9 wt.-%, microstructure (molar % of butadiene): 20-35% 1-2 vinyl functional groups) commercially available from Cray Valley under the trade name RICON® 130MA8.

Treatment B

Treatment B was a grafted polybutadiene homopolymer comprising at least one succinic anhydride group obtained by grafting maleic anhydride onto a polybutadiene homopolymer (Mn=5000 Da, Brookfield viscosity (25° C.)=48000 cPs, functional groups/chain=5, anhydride equivalent weight 981) commercially available from Cray Valley under the trade name RICON® 131MA10.

Treatment C

Treatment C was a grafted polybutadiene homopolymer comprising at least one succinic anhydride group obtained by grafting maleic anhydride onto a polybutadiene homopolymer (Mn=2500 Da, Brookfield viscosity (55° C.)=140000 cPs, functional groups/chain=3, anhydride equivalent weight 583) commercially available from Cray Valley under the trade name RICON® 156MA17.

Treatment D

Treatment D was a low molecular weight grafted polybutadiene-styrene copolymer comprising at least one succinic anhydride group obtained by grafting maleic anhydride onto a polybutadiene-styrene copolymer (Mn=9900 Da, Brookfield viscosity (45° C.)=170000 cPs, functional groups/chain=6, anhydride equivalent weight 1651, acid number=28.5-40 meqKOH/g, Styrene amount: 17-27 wt %) commercially available from Cray Valley under the trade name RICON® 184MA6.

Treatment E

Treatment E was (Bis[3-(triethoxysilyl)propyl] tetrasulfide) from Sigma-Aldrich (CAS: 40372-72-3).

Treatment F

Treatment F was a mono-substituted alkenyl succinic anhydride (2,5-Furandione, dihydro-, mono-$C_{15-20}$-alkenyl derivs., CAS No. 68784-12-3), which was a blend of mainly branched octadecenyl succinic anhydrides (CAS #28777-98-2) and mainly branched hexadecenyl succinic anhydrides (CAS #32072-96-1). More than 80% of the blend was branched octadecenyl succinic anhydrides. The purity of the blend was >95 wt %. The residual olefin content was below 3 wt %.

Treatment G

Treatment G was a fatty acid mixture which was a 1:1 mixture of stearic acid and palmitic acid.

Treatment H

Treatment H was a low molecular weight vinyl butadiene functionalized with maleic anhydride ($M_n$=5000 g/mol, Brookfield viscosity: 48000 cps at 25° C., 28 wt.-% 1-2 vinyl functional groups; functional groups/chain=5), commercially available under the trade name RICOBOND® 1031 (Cray Valley).

Calcium Carbonate-Comprising Filler Material 1 (Powder 1)

Powder 1 was a dry sedimentary ground calcium carbonate from Italy ($d_{50}$ (wt)=3.4 μm, $d_{98}$ (wt)=14 μm, BET specific surface area=2.6 $m^2/g$).

Calcium Carbonate-Comprising Filler Material 2 (Powder 2)

Powder 2 was a stearic acid-surface treated dry sedimentary ground calcium carbonate from Italy ($d_{50}$ (wt)=3.4 μm, $d_{98}$ (wt)=14 μm, BET specific surface area=2.6 $m^2/g$).

Surface-Treated Calcium Carbonate-Comprising Filler Material 3 (Powder 3)

900 g of powder 1 was placed in a high speed mixer (Somakon MP-LB Mixer, Somakon Verfahrenstechnik, Germany), and conditioned by stirring for 10 minutes (2000 rpm, 120° C.). After that time, 0.8 parts by weight relative to 100 parts by weight $CaCO_3$ of Treatment A (7.2 g) was added to the mixture. Stirring and heating was then continued for another 20 minutes (120° C., 2000 rpm). After that time, the mixture was allowed to cool and the free-flowing powder was collected (powder 3).

Surface-Treated Calcium Carbonate-Comprising Filler Material 4 (Powder 4)

900 g of powder 1 was placed in a high speed mixer (Somakon MP-LB Mixer, Somakon Verfahrenstechnik, Germany), and conditioned by stirring for 10 minutes (2000 rpm, 120° C.). After that time, 0.8 parts by weight relative to 100 parts by weight $CaCO_3$ of Treatment B (7.2 g) was added to the mixture. Stirring and heating was then continued for another 20 minutes (120° C., 2000 rpm). After that time, the mixture was allowed to cool and the free-flowing powder was collected (powder 4).

Surface-Treated Calcium Carbonate-Comprising Filler Material 5 (Powder 5)

900 g of powder 1 was placed in a high speed mixer (Somakon MP-LB Mixer, Somakon Verfahrenstechnik, Germany), and conditioned by stirring for 10 minutes (2000 rpm, 120° C.). After that time, 0.8 parts by weight relative to 100 parts by weight $CaCO_3$ of Treatment C (7.2 g) was added to the mixture. Stirring and heating was then continued for another 20 minutes (120° C., 2000 rpm). After that time, the mixture was allowed to cool and the free-flowing powder was collected (powder 5).

Surface-Treated Calcium Carbonate-Comprising Filler Material 6 (Powder 6)

900 g of powder 1 was placed in a high speed mixer (Somakon MP-LB Mixer, Somakon Verfahrenstechnik, Germany), and conditioned by stirring for 10 minutes (2000 rpm, 120° C.). After that time, 0.8 parts by weight relative to 100 parts by weight $CaCO_3$ of Treatment D (7.2 g) was added to the mixture. Stirring and heating was then continued for another 20 minutes (120° C., 2000 rpm). After that time, the mixture was allowed to cool and the free-flowing powder was collected (powder 6).

Surface-Treated Calcium Carbonate-Comprising Filler Material 7 (Powder 7)

900 g of powder 1 was placed in a high speed mixer (Somakon MP-LB Mixer, Somakon Verfahrenstechnik, Germany), and conditioned by stirring for 10 minutes (2000 rpm, 120° C.). After that time, 0.4 parts by weight relative to 100 parts by weight $CaCO_3$ of Treatment A (3.6 g) and 0.4 parts by weight relative to 100 parts by weight $CaCO_3$ of Treatment G (3.6 g) were added directly one after another in the given order to the mixture. Stirring and heating is then continued for another 20 minutes (120° C., 2000 rpm). After that time, the mixture was allowed to cool and the free-flowing powder was collected (powder 7).

Surface-Treated Calcium Carbonate-Comprising Filler Material 8 (Powder 8)

900 g of powder 1 was placed in a high speed mixer (Somakon MP-LB Mixer, Somakon Verfahrenstechnik, Germany), and conditioned by stirring for 10 minutes (2000 rpm, 120° C.). After that time, 0.4 parts by weight relative to 100 parts by weight $CaCO_3$ of Treatment A (3.6 g) and 0.4 parts by weight relative to 100 parts by weight $CaCO_3$ of Treatment F (3.6 g) were added directly one after another in the given order to the mixture. Stirring and heating was then continued for another 20 minutes (120° C., 2000 rpm). After that time, the mixture was allowed to cool and the free-flowing powder was collected (powder 8).

Surface-Treated Calcium Carbonate-Comprising Filler Material 9 (Powder 9)

Powder 9 was a wet ground and dried sedimentary ground calcium carbonate from Norway partially treated (0.6 wt %) with treatment G ($d_{50}$ (wt)=0.3 μm, $d_{98}$ (wt)=1.4 μm (measured with sedigraph), BET specific surface area=14.4 $m^2/g$).

Surface-Treated Calcium Carbonate-Comprising Filler Material 10 (Powder 10)

400 g of powder 9 was placed in a high speed mixer (Somakon MP-LB Mixer, Somakon Verfahrenstechnik, Germany), and conditioned by stirring for 5 minutes (800 rpm, 120° C.). After that time, 2.5 parts by weight relative to 100 parts by weight $CaCO_3$ of Treatment A (10 g) were added to the mixture. Stirring and heating was then continued for another 10 minutes (120° C., 800 rpm). After that time, the mixture was allowed to cool and the free-flowing powder was collected (powder 10). The material obtained had a residual total moisture content of 0.08 wt.-%, based on the total dry weight of the at least one calcium carbonate-comprising material.

Surface-Treated Calcium Carbonate-Comprising Filler Material 11 (Powder 11)

400 g of powder 9 was placed in a high speed mixer (Somakon MP-LB Mixer, Somakon Verfahrenstechnik, Germany), and conditioned by stirring for 5 minutes (1000 rpm, 90° C.). After that time, 2.5 parts by weight relative to 100 parts by weight $CaCO_3$ of Treatment E (10 g) were added to the mixture. Stirring and heating was then continued for another 15 minutes (90° C., 1000 rpm). After that time, the mixture was allowed to cool and the free-flowing powder was collected (powder 10).

Precipitated Calcium Carbonate-Comprising Filler Material 12 (Powder 12)

Powder 12 was a precipitated calcium carbonate from Austria ($d_{50}$ (wt)=1.5 μm, $d_{98}$ (wt)=8 μm (measured with sedigraph), BET specific surface area=34.4 $m^2/g$).

Surface-Treated Precipitated Calcium Carbonate-Comprising Filler Material 13 (Powder 13)

Powder 13 was prepared by surface-treating powder 12 with 2.5 wt % of treatment A. To carry out the treatment, the treatment A (25 g) was first dispersed in 200 mL of deionized water, heated to 60° C. and neutralized to pH 10 with sodium hydroxide solution.

A suspension of powder 12 (1.00 kg in 7 L deionized water) was prepared in a 10 L ESCO batch reactor and heated to 85° C. The pH was adjusted to 10 with $Ca(OH)_2$ and the neutralized treatment agent was then added under vigorous stirring. Mixing was continued at 85° C. for 45 minutes, and the suspension was then transferred to a metallic tray and dried in an oven (110° C.). The dried cake was then deagglomerated using a Retsch SR300 rotor beater mill.

Precipitated Calcium Carbonate-Comprising Filler Material 14 (Powder 14)

Powder 14 was a precipitated calcium carbonate from Austria ($d_{50}$ (wt)=2.7 μm, $d_{98}$ (wt)=3.9 μm (measured with sedigraph), BET specific surface area=70.8 $m^2/g$).

Surface-Treated Precipitated Calcium Carbonate-Comprising Filler Material 15 (Powder 15)

Powder 15 was prepared by surface-treating powder 14 with 2.5 wt % of treatment A. To carry out the treatment, the treatment A (25 g) was first dispersed in 200 mL of deionized water, heated to 60° C. and neutralized to pH 10 with sodium hydroxide solution.

A suspension of powder 14 (1.00 kg in 7 L deionized water) was prepared in a 10 L ESCO batch reactor and heated to 85° C. The pH was adjusted to 10 with $Ca(OH)_2$ and the neutralized treatment agent was then added under vigorous stirring. Mixing was continued at 85° C. for 45 minutes, and the suspension was then transferred to a metallic tray and dried in an oven (110° C.). The dried cake was then deagglomerated using a Retsch SR300 rotor beater mill.

Calcined Kaolin-Comprising Filler Material 16 (Powder 16)

Powder 16 was a high purity fully calcined kaolin from Imerys (Polestar 200P) with a $d_{50}$ (wt) of 2 μm (measured with sedigraph).

Carbon Black-Comprising Filler Material 17 (Powder 17)

Powder 17 was a N550 carbon black filler obtained from Orion engineered Carbons GmbH (Purex® HS 45, iodine number: 43±5 mg/g; STSA surface area (according to ASTM D 6556): 39±5 $m^2/g$).

Precipitated Silica-Comprising Filler Material 18 (Powder 18)

Powder 18 was a precipitated silica from Evonik (Ultrasil VN3) with a BET specific surface area of 180 $m^2/g$.

Calcined Kaolin-Comprising Filler Material 19 (Powder 19)

Powder 19 was high purity fully calcined kaolin from Imerys (Polestar 200R) with a $d_{50}$ of 2 μm.

Calcium Carbonate Comprising Filler Material 20 (Powder 20)

Powder 20 was a calcium carbonate from Imerys (Micronic O) with a $d_{50}$ of 2.4 μm, a $d_{98}$ of 9 μm and a BET specific surface area of 2.0 $m^2/g$.

Surface-Reacted Calcium Carbonate Comprising Filler 21 (Powder 21)

Powder 21 was a surface-reacted calcium carbonate composed of 80% hydroxyapatite and 20% calcite (BET=85 $m^2/g$, $d_{50}$ (vol)=6.1 μm, $d_{98}$ (vol)=13.8 μm; measured with laser diffraction), prepared with the following method:

In a mixing vessel, 350 liters of an aqueous suspension of (sedimentary) ground calcium carbonate was prepared by adjusting the solids content of a ground marble calcium carbonate from Hustadmarmor, Norway, with a particle size distribution of 90 wt.-% less than 2 μm as determined by sedimentation, such that a solids content of 10 wt.-%, based on the total weight of the aqueous suspension, was obtained.

Whilst mixing the suspension, 62 kg of a 30% concentrated phosphoric acid was added to said suspension over a period of 10 minutes at a temperature of 70° C. Finally, after the addition of the phosphoric acid, the slurry was stirred for additional 5 minutes, before removing it from the vessel and drying.

Surface-Treated Surface-Reacted Calcium Carbonate Comprising Filler 22 (Powder 22)

Powder 22 was prepared by surface treatment of powder 21 with 7.5% of treatment E. Surface treatment was carried out in a high speed mixer (Somakon MP-LB Mixer, Somakon Verfahrenstechnik, Germany). Powder 21 (300 g) was put in the mixer and stirred at 500 rpm and room temperature. Treatment E (7.5 wt.-%, 24 g) was then added dropwise to the mixture and stirring was continued for another 10 minutes. After that time, the mixture was allowed to cool and the powder was collected.

Precipitated Hydromagnesite Filler 23 (Powder 23)

Powder 23 was a precipitated Hydromagnesite (BET specific surface area: 84.2 $m^2/g$, $d_{50}$ (vol)=7.6 μm; $d_{95}$ (vol)=20.6 μm).

Surface-Treated Precipitated Hydromagnesite Filler 24 (Powder 24)

Powder 24 was prepared by surface-treating powder 23 with 2.5 wt.-% of treatment A. To carry out the treatment, the treatment A (25 g) was first dispersed in 100 mL of deionized water, heated to 60° C. and neutralized to pH 9-10 with sodium hydroxide solution.

A suspension of powder 23 (1 kg in 7.5 L deionized water) was prepared in a 10 L ESCO batch reactor (ESCO-Labor AG, Switzerland) and heated to 85° C. The pH was adjusted to 10-11 with $Ca(OH)_2$ and the neutralized treatment agent was then added under vigorous stirring. Mixing was continued at 85° C. for 45 minutes, and the suspension was then transferred to metallic tray and dried in an oven (110° C.). The dried cake was then deagglomerated using a SR300 rotor beater mill (Retsch GmbH, Germany).

Calcined Kaolin-Comprising Filler Material 25 (Powder 25)

Powder 25 was a fine calcined kaolin from Imerys (Polestar 400) with a $d_{50}$ of 0.6 μm Surface-Treated Calcium Carbonate-Comprising Filler Material 26 (Powder 26)

Powder 26 was a wet ground and dried sedimentary ground calcium carbonate from Norway treated (3.6 wt %) with treatment G ($d_{50}$ (wt)=0.3 μm, $d_{98}$ (wt)=1.4 μm, BET specific surface area=14.4 $m^2/g$). The material had a residual total moisture content of 0.08 wt.-%, based on the total dry weight of the at least one calcium carbonate-comprising material.

Precipitated Hydromagnesite Filler 27 (Powder 27)

Powder 27 was a precipitated hydromagnesite (BET specific surface area=46.7 $m^2/g$, $d_{50}$ (vol)=8.75 μm; $d_{98}$ (vol) =29 μm). The material had a residual total moisture content of 3.76 wt.-%, based on the total dry weight of the at least one calcium carbonate-comprising material.

Surface-Treated Precipitated Hydromagnesite Filler 28 (Powder 28)

Powder 28 was prepared by surface-treating powder 27 with 3 wt.-% of treatment G and 3 wt % of treatment A. To carry out the treatment, the treatment G (24 g) was first dispersed in 500 mL of deionized water, heated to 80° C. 5.4 g of sodium hydroxide dissolved in 100 mL water was added to it. The corresponding sodium salt dissolved in water. In parallel, treatment A (24 g) was first dispersed in 400 mL of deionized water, heated to 60° C. and neutralized to pH 9-10 with sodium hydroxide.

After that, a suspension of powder 27 (800 g in 5 L deionized water) was prepared in a 10 L ESCO batch reactor (ESCO-Labor AG, Switzerland) and heated to 85° C. The neutralized treatment agents prepared above were then added under vigorous stirring. Mixing was continued at 80° C. for 45 minutes. The suspension was then filtered on a filter press, and the filter cake was then transferred to metallic tray and dried in an oven (110° C.). The dried cake was then deagglomerated using a SR300 rotor beater mill equipped with a 200 m sieve (Retsch GmbH, Germany). The material had a residual total moisture content of 1.48 wt.-%, based on the total dry weight of the at least one calcium carbonate-comprising material.

Carbon Black Filler Material 29 (Powder 29)

Powder 29 was a N220 carbon black filler, commercially available from Cabot under the Vulcan® 6, iodine number: 121 mg/kg, STSA surface area (according to ASTM D 6556): 104 $m^2/g$).

Calcium Carbonate-Comprising Filler Material 30 (Powder 30)

Powder 30 was ground calcium carbonate powder from France (Micromya-OM), $d_{50}$ (wt)=2.4 μm, $d_{98}$ (wt)=20 μm. The material had a residual total moisture content of 0.01 wt.-%, based on the total dry weight of the at least one calcium carbonate-comprising material.

Surface-Treated Surface-Reacted Calcium Carbonate Comprising Filler 31 (Powder 31)

Powder 31 was prepared by surface treatment of powder 21 with 7 wt.-% of treatment F. Surface treatment was carried out in a high speed mixer (Somakon MP-LB Mixer, Somakon Verfahrenstechnik, Germany). Powder 21 (500 g) was put in the mixer and stirred at 500 rpm and 120° C. Treatment F (7 wt.-%, 35 g) was then added dropwise to the mixture and stirring was continued for another 15 minutes. After that time, the mixture was allowed to cool and the powder was collected. The material obtained had a residual total moisture content of 1.09 wt.-%, based on the total dry weight of the at least one calcium carbonate-comprising material and a moisture pick-up of 17 mg/g.

Surface-Treated Surface-Reacted Calcium Carbonate Comprising Filler 32 (Powder 32)

Powder 32 was prepared by surface treatment of powder 21 with 8 wt.-% of treatment E. Surface treatment was carried out in a high speed mixer (Somakon MP-LB Mixer, Somakon Verfahrenstechnik, Germany). Powder 21 (500 g) was put in the mixer and stirred at 500 rpm and 70° C. Treatment E (8 wt.-%, 40 g) was then added dropwise to the mixture and stirring was continued for another 15 minutes. After that time, the mixture was allowed to cool and the powder was collected.

Surface-Treated Surface-Reacted Calcium Carbonate Comprising Filler 33 (Powder 33)

Powder 33 was prepared by surface-treating powder 21 with 7.5 wt.-% of treatment H. To carry the treatment, the treatment agent (60 g) was first dispersed in 400 mL of deionized water, heated to 60° C. and neutralized to pH 9-10 with sodium hydroxide.

A suspension of powder 21 (0.8 kg in 6 L deionized water) was prepared in a 10 L ESCO batch reactor (ESCO-Labor AG, Switzerland) and heated to 85° C. The pH was adjusted to 10-11 with $Ca(OH)_2$ and the neutralized treatment agent was then added under vigorous stirring. Mixing was continued at 85° C. for 45 minutes. The suspension was then filtered using a filter press (ca 6 bar). The filter cake was then transferred to metallic tray and dried in an oven (110° C.). The dried cake was then deagglomerated using a SR300 rotor beater mill (Retsch GmbH, Germany). The material obtained had a residual total moisture content of 1.43 wt.-%, based on the total dry weight of the at least one calcium carbonate-comprising material.

Precipitated Hydromagnesite Filler 34 (Powder 34) Powder 34 was a precipitated hydromagnesite (BET specific surface area=46.7 $m^2/g$, $d_{50}$ (vol)=8.8 μm; $d_{98}$ (vol)=29 μm, moisture pick-up=27.2 mg/g). The material had a residual total moisture content of 3.74 wt.-%, based on the total dry weight of the at least one calcium carbonate-comprising material.

Surface-Treated Precipitated Hydromagnesite Filler 35 (Powder 35)

Powder 35 was prepared by surface-treating powder 34 with 7.5 wt.-% of treatment A. To carry out the treatment, the treatment agent (64 g) was first dispersed in 400 mL of deionized water, heated to 60° C. and neutralized to pH 10 with sodium hydroxide solution.

A suspension of powder 34 (850 g in 6 L deionized water) was prepared in a 10 L ESCO batch reactor and heated to 85° C. The pH was adjusted to 10 with $Ca(OH)_2$ and the neutralized treatment agent was then added under vigorous stirring. Mixing was continued at 85° C. for 45 minutes, and the suspension was then filtered on a filter press and dried overnight in an oven (110° C.). The dried filter cake was then deagglomerated using a Retsch SR300 rotor beater mill. The material obtained had a residual total moisture content of 1.78 wt.-%, based on the total dry weight of the at least one calcium carbonate-comprising material.

Surface-Treated Precipitated Hydromagnesite Filler 36 (Powder 36)

Powder 36 was prepared by treating a precipitated hydromagnesite powder with treatment agent E. Surface treatment was carried out in a high speed mixer (Somakon MP-LB Mixer, Somakon Verfahrenstechnik, Germany). The untreated precipitated hydromagnesite powder (400 g) was put in the mixer and stirred at 500 rpm and 70° C. Treatment E (7.5 wt.-%, 30 g) was then added dropwise to the mixture and stirring was continued for another 15 minutes. After that time, the mixture was allowed to cool and the powder was collected (BET specific surface area=32.8 $m^2/g$, $d_{50}$ (vol) =8.6 μm; $d_{98}$ (vol)=45 μm).

Surface-Treated Precipitated Calcium Carbonate Filler 37 (Powder 37)

Powder 37 was prepared by treating a precipitated calcium carbonate from Austria (BET specific surface area=70 $m^2/g$, $d_{50}$ (vol)=2 μm) with 7.5% treatment agent E. Surface treatment was carried out in a high speed mixer (Somakon MP-LB Mixer, Somakon Verfahrenstechnik, Germany). The untreated PCC (400 g) was put in the mixer and stirred at 500 rpm and 70° C. Treatment E (7.5 wt.-%, 75 g) was then added dropwise to the mixture and stirring was continued for another 15 minutes. After that time, the mixture was allowed to cool and the powder was collected (BET specific surface area=50 $m^2/g$). The material obtained had a residual total moisture content of 1.3 wt.-%, based on the total dry weight of the at least one calcium carbonate-comprising material.

Surface-Treated Calcium Carbonate-Comprising Filler Material 38 (Powder 38)

Powder 38 was prepared by treating a ultrafine ground calcium carbonate produced from eggshells (BET specific surface area=16 $m^2/g$, $d_{50}$ (wt)=0.7 μm, $d_{98}$ (wt)=4.1 m) with 0.6% treatment agent F, 1.2% treatment agent A and 1% treatment agent E. Surface treatment was carried out in a high speed mixer (Somakon MP-LB Mixer, Somakon Verfahrenstechnik, Germany). The untreated calcium carbonate powder (1 kg) was put in the mixer and stirred at 500 rpm and 120° C. The treatment agents were then added successively to the mixture and stirring was continued for another 15 minutes. After that time, the mixture was allowed to cool and the powder was collected (BET specific surface area=12 $m^2/g$). The material obtained had a residual total moisture content of 0.30 wt.-%, based on the total dry weight of the at least one calcium carbonate-comprising material.

Surface-Reacted Calcium Carbonate Comprising Filler 39 (Powder 39)

Powder 39 was a surface-reacted calcium carbonate (BET specific surface area=139 $m^2/g$, $d_{50}$ (vol)=6.1 μm, $d_{98}$ (vol)=14.2 μm) prepared with the following method:

In a mixing vessel, 350 liters of an aqueous suspension of natural ground calcium carbonate was prepared by adjusting the solids content of a ground marble calcium carbonate from Hustadmarmor, Norway with a particle size distribution of 90 wt.-% less than 2 μm as determined by sedimentation, such that a solids content of 10 wt.-%, based on the total weight of the aqueous suspension, is obtained.

Whilst mixing the suspension, 62 kg of a 30% concentrated phosphoric acid was added to said suspension over a period of 10 minutes at a temperature of 70° C. Additionally, during the phosphoric acid addition, 1.9 kg of citric acid was added rapidly (about 30 s) to the slurry. Finally, after the addition of the phosphoric acid, the slurry was stirred for additional 5 minutes, before removing it from the vessel and drying.

Surface-Treated Surface-Reacted Calcium Carbonate Comprising Filler 40 (Powder 40)

Powder 40 was prepared by surface-treating powder 39 with 5 wt.-% of treatment A. To carry out the treatment, the treatment agent (35 g) was first dispersed in 300 mL of deionized water, heated to 60° C. and neutralized to pH 10 with sodium hydroxide.

A suspension of powder 39 (700 g in 7 L deionized water) was prepared in a 10 L ESCO batch reactor and heated to 85° C. The pH was adjusted to 10 with $Ca(OH)_2$ and the neutralized treatment agent was then added under vigorous stirring. Mixing was continued at 85° C. for 45 minutes, and the suspension was then filtered on a Buchner funnel and dried overnight in an oven (110° C.). The dried filter cake was then deagglomerated using a Retsch SR300 rotor beater mill.

Precipitated Hydromagnesite Filler 41 (Powder 41)

Powder 41 was a precipitated hydromagnesite (BET specific surface area=46.7 $m^2/g$, $d_{50}$ (vol)=8.75 μm; $d_{98}$ (vol)=29 μm)

Surface-Treated Precipitated Hydromagnesite Filler 42 (Powder 42)

Powder 42 was prepared by surface-treating powder 41 with 5 wt.-% of treatment A. To carry out the treatment, the treatment agent (35 g) was first dispersed in 400 mL of deionized water, heated to 60° C. and neutralized to pH 10 with sodium hydroxide. A suspension of powder 41 (700 g in 6 L deionized water) was prepared in a 10 L ESCO batch reactor and heated to 85° C. The pH was adjusted to 10 with $Ca(OH)_2$ and the neutralized treatment agent was then added under vigorous stirring. Mixing was continued at 85° C. for 45 minutes, and the suspension was then filtered on a filter press and dried overnight in an oven (110° C.). The dried filter cake was then deagglomerated using a Retsch SR300 rotor beater mill.

Precipitated Hydromagnesite Filler 43 (Powder 43)

Powder 43 was produced through wet grinding of powder 41 (BET specific surface area=46.5 $m^2/g$, $d_{50}$ (vol)=7.9 μm; $d_{98}$ (vol)=27 μm). The material had a residual total moisture content of 1.2 wt.-%, based on the total dry weight of the at least one calcium carbonate-comprising material.

Surface-Treated Surface-Reacted Calcium Carbonate Comprising Filler 44 (Powder 44)

Powder 44 was prepared by surface-treating powder 21 with 5 wt.-% of treatment A. To carry the treatment, the treatment agent (35 g) was first dispersed in 400 mL of deionized water, heated to 60° C. and neutralized to pH 9-10 with sodium hydroxide.

A suspension of powder 21 (0.7 kg in 6 L deionized water) was prepared in a 10 L ESCO batch reactor (ESCO-Labor AG, Switzerland) and heated to 85° C. The pH was adjusted to 10-11 with $Ca(OH)_2$ and the neutralized treatment agent was then added under vigorous stirring. Mixing was continued at 85° C. for 45 minutes. The suspension was then filtered using a filter press (ca 6 bar). The filter cake was then transferred to metallic tray and dried in an oven (110° C.). The dried cake was then deagglomerated using a SR300 rotor beater mill (Retsch GmbH, Germany).

Surface-Treated Calcium Carbonate-Comprising Filler Material 45 (Powder 45)

Powder 45 was a ultrafine ground calcium carbonate (BET specific surface area=44.1 $m^2/g$), which was surface treated with 2% treatment A and 15% treatment G. The material obtained had a residual total moisture content of 0.5 wt.-%, based on the total dry weight of the at least one calcium carbonate-comprising material.

3. Examples

Example Series A: Elastomer Formulations

Compounding:

Step 1: Internal Mixing

As a first step, each batch were mixed in a HAAKE internal mixer with 300 $cm^3$ capacity equipped with Banbury rotors. The temperature was set at 40° C. at the beginning of each mixing, during the process the temperature raised up to 90° C. depending on the filler being incorporated. The mixing procedure set out in the following table 7 has been used for each batch

TABLE 7

Internal mixing procedure:

| Time (min) | Operation | Speed (rpm) |
|---|---|---|
| t = 0 | Introduction of elastomer and mineral filler (40° C.) | 40 |
| t = 1 | Insertion of carbon black and oil | 40 |
| t = 5 | Dumping of the mixture | 40 |

Step 2: External Mixing

For the second step, mixing with the peroxide curing agent was performed on an instrumented cylinder mixer (150×350). All the rubbers were mixed with the same times, cylinder speeds, and cylinder spacing as to not influence in their rheological properties comparison. The cooling system was set to 25° C. and the metal guides were set as to allow the rubber to occupy 70% of the cylinder surface. In between two accelerations the cylinders are cleaned and are let cool. The detailed proceedings for this process are described in table 8 below.

TABLE 8

External mixing procedure

| Time (min) | Operation | Cylinder Spacing (mm) |
|---|---|---|
| t = 0 | Introduction of the mix from Step 1 | 1 |
| t = 2 | Insertion of the curing system (peroxide and coagent) | 1 |

TABLE 8-continued

| External mixing procedure | | |
|---|---|---|
| Time (min) | Operation | Cylinder Spacing (mm) |
| t = 6 | 5 thin passings | 0.6 |
| | Calendering sheet, thickness 2 mm | 2 |

Step 3: Molding

The pieces were then molded at 160° C. or 180° C. and 100 kg/cm$^2$ pressure by compression molding. This way, small 150×150×2 mm sheets were prepared. The curing time, which determines the molding time, was determined through a rheological MDR test. The examples for the series A are set out in table 9 below.

TABLE 9

| Examples for series A: | | |
|---|---|---|
| Example | A-E10 (inventive) | A-CE16 (comparative) |
| EPDM Vistalon 2504 (phr) | 100 | 100 |
| Powder 10 (phr) | 100 | |
| Powder 16 (phr) | | 100 |
| Torilis 6200 (phr)# | 30 | 30 |
| Peroxide DC40 (phr) | 7 | 7 |

NB: all amounts in phr by weight;
#commercially available lubricant from TOTAL

The effect on the mechanical properties—tensile tests—and on various other mechanical properties of the elastomer compound of the series A are set out in the following tables 10 and 11.

TABLE 10

| Effect on Mechanical properties-tensile tests | | | | |
|---|---|---|---|---|
| Example | M100 modulus at 100% elongation (MPa) | M200 modulus at 200% elongation (MPa) | M300 modulus at 300% elongation (MPa) | Strength at break (MPa) |
| A-E10 (inventive) | 1.1 | 2 | 3 | 11 |
| A-CE16 (comparative) | 0.8 | 1 | 1.2 | 3.8 |

TABLE 11

| Effect on various properties of the elastomer compound | | | | | |
|---|---|---|---|---|---|
| Example | Hardness IRHD (°) | Hardness Shore A | Tear resistance/ DELFT (MPa) | Electrical resistivity (Ohm/cm$^2$) | Compression set 72 h-100° C. (%) |
| A-E10 (inventive) | 52 | 48 | 19.3 | 6.70E+16 | 23.1 |
| A-CE16 (comparative) | 42 | 38 | 14.4 | 6.40E+15 | 56.7 |

Examples Series B: EPDM, Sulfur-Cured Formulation

Compounding:

Step 1: Internal Mixing

As a first step, each batch was mixed in a HAAKE internal mixer with 300 cm$^3$ capacity equipped with Banbury rotors. The temperature was set at 40° C. at the beginning of each mixing, during the process the temperature raised up to 90° C. depending on the filler being incorporated. The mixing procedure set out in the following table 12 had been used for each batch

TABLE 12

| Internal mixing procedure: | | |
|---|---|---|
| Time (min) | Operation | Speed (rpm) |
| t = 0 | Introduction of elastomer and mineral filler (40° C.) | 40 |
| t = 1 | Insertion of carbon black and oil | 40 |
| t = 5 | Dumping of the mixture | 40 |

Step 2: External Mixing

For the second step, mixing with the peroxide curing agent was performed on an instrumented cylinder mixer (150×350). All the rubbers were mixed with the same times, cylinder speeds, and cylinder spacing as to not influence in their rheological properties comparison. The cooling system was set to 2500 and the metal guides were set as to allow the rubber to occupy 70% of the cylinder surface. In between two accelerations the cylinders are cleaned and are let cool. The detailed proceedings for this process are described in table 13 below.

TABLE 13

| External mixing procedure | | |
|---|---|---|
| Time (min) | Operation | Cylinder Spacing (mm) |
| t = 0 | Introduction of the mix from Step 1 | 1 |
| t = 2 | Insertion of the curing system (peroxide and coagent) | 1 |
| t = 6 | 5 thin passings | 0.6 |
| | Calendering sheet, thickness 2 mm | 2 |

Step 3: Molding

The pieces were then molded at 16000 or 18000 and 100 kg/cm$^2$ pressure by compression molding. This way, small 150×150×2 mm sheets were prepared. The curing time, which determines the molding time, was determined through a rheological MDR test. The examples for the series B are set out in table 14 below.

TABLE 14

| Examples for series B | | | | |
|---|---|---|---|---|
| Example | B-E11 (inventive) | B-CE9 (comparative) | B-E22 (inventive) | B-CE21 (comparative) |
| EPDM KELTAN ® 6950C (phr) | 100 | 100 | 100 | 100 |
| Powder 11 (phr) | 57 | | | |
| Powder 9 (phr) | | 59 | | |
| Powder 17 (phr) | 40 | 40 | 40 | 40 |
| Powder 22 (phr) | | | 58 | |
| Powder 21 (phr) | | | | 61.5 |
| Torilis 6200 (phr)# | 20 | 20 | 20 | 20 |
| ZnO neige (phr) | 5 | 5 | 5 | 5 |
| Stearic acid (phr) | 1 | 1 | 1 | 1 |
| Protector octamine (phr) | 1 | 1 | 1 | 1 |
| CBS 80 (phr) | 2.5 | 2.5 | 2.5 | 2.5 |
| TBzTD 70 (phr) | 1 | 1 | 1 | 1 |
| Sulfur (phr) | 1.5 | 1.5 | 1.5 | 1.5 |

NB: all amounts in phr by weight. Amounts of experimental fillers have been adjusted according to the measured density of each filler to correspond to the same volume as 40 phr of Powder 17 (Carbon black);
#commercially available lubricant from TOTAL.

The effect on the mechanical properties—tensile tests—and on various other mechanical properties of the elastomer compound of the series B are set out in the following tables 15 and 16.

TABLE 15

| Effect on Mechanical properties-tensile tests (series B) | | | |
|---|---|---|---|
| Example | M100 (Modulus at 100% elongation, MPa) | Strength at break (MPa) | Elongation at break (%) |
| B-E11 (inventive) | 3.4 | 11.4 | 307 |
| B-CE9 (comparative) | 2.1 | 8.9 | 318 |
| B-E22 (inventive) | 4.8 | 15 | 388 |
| B-CE21 (comparative) | 3.9 | 12.6 | 345 |

TABLE 16

| Effect on various properties (series B) | | | | |
|---|---|---|---|---|
| Example | Hardness IRHD (°) | Hardness Shore A | Tear resistance/ DELFT (MPa) | Compression set 72 h-100° C. (%) |
| B-E11 (inventive) | 70 | 67 | 21 | 41 |
| B-CE9 (comparative) | 66 | 63 | 19 | 60 |

TABLE 16-continued

| Effect on various properties (series B) | | | | |
|---|---|---|---|---|
| Example | Hardness IRHD (°) | Hardness Shore A | Tear resistance/ DELFT (MPa) | Compression set 72 h-100° C. (%) |
| B-E22 (inventive) | 76 | 72 | 37 | 42 |
| B-CE21 (comparative) | 75 | 71 | Not measured | Not measured |

Examples Series C: Simple EPDM Formulation

Compounding:

Step 1: Internal Mixing

As a first step, each batch was mixed in a HAAKE internal mixer with 300 cm$^3$ capacity equipped with Banbury rotors. The temperature was set at 40° C. at the beginning of each mixing, during the process the temperature raised up to 90° C. depending on the filler being incorporated. The mixing procedure set out in the following table 17 had been used for each batch

TABLE 17

| Internal mixing procedure | | |
|---|---|---|
| Time (min) | Operation | Speed (rpm) |
| t = 0 | Introduction of elastomer and mineral filler (40° C.) | 40 |
| t = 1 | Insertion of carbon black and oil | 40 |
| t = 5 | Dumping of the mixture | 40 |

Step 2: External Mixing

For the second step, mixing with the peroxide curing agent was performed on an instrumented cylinder mixer (300×700 or 150×350). All the rubbers were mixed with the same times, cylinder speeds, and cylinder spacing as to not influence in their rheological properties comparison. The cooling system was set to 25° C. and the metal guides were set as to allow the rubber to occupy 70% of the cylinder surface. In between two accelerations the cylinders are cleaned and are let cool. The detailed proceedings for this process are described in table 18 below.

TABLE 18

| External mixing procedure | | |
|---|---|---|
| Time (min) | Operation | Cylinder Spacing (mm) |
| t = 0 | Introduction of the mix from Step 1 | 1 |
| t = 2 | Insertion of the curing system (peroxide and coagent) | 1 |
| t = 6 | 5 thin passings | 0.6 |
| | Calendering sheet, thickness 2 mm | 2 |

Step 3: Molding

The pieces were then molded at 160° C. and 200 bar pressure by compression molding. This way, small 150×150×2 mm sheets were prepared. The curing time, which determines the molding time, was determined through a rheological MDR test. The examples for the series C are set out in table 19 below.

TABLE 19

| Examples for series C | | | | | | | |
|---|---|---|---|---|---|---|---|
| Example | C-CE12 (comparative) | C-E13 (inventive) | C-E15 (inventive) | C-CE17 (comparative) | C-CE19 (comparative) | C-CE20 (comparative) | C-E24 (inventive) |
| EPDM Vistalon 2504 (phr) | 100 | 100 | 100 | | | | 100 |
| Powder 12 (phr) | 75* | | | | | | |
| Powder 13 (phr) | | 75* | | | | | |
| Powder 15 (phr) | | | 75* | | | | |
| Powder 17 (phr) | 50 | 50 | 50 | 100 | 50 | 50 | 50 |
| Powder 19 (phr) | | | | | 73* | | |
| Powder 20 (phr) | | | | | | 75* | |
| Powder 24 (phr) | | | | | | | 60* |
| Torilis 6200 (phr)# | 10 | 10 | 10 | 10 | 10 | 10 | 10 |
| Peroxide DC40 (phr) | 7 | 7 | 7 | 7 | 7 | 7 | 7 |
| Rhenogran TAC 50% (phr) | 2 | 2 | 2 | 2 | 2 | 2 | 2 |

*NB: All formulations were done with an isovolumic amount of fillers. All fillers were coupled 50/50% with carbon black in volume. Therefore, the carbon black reference batch contains 100 phr of N550. The amount of white fillers was calculated using the measured density of the raw material (untreated) to match the volume of 50 phr powder 17 (N550 Carbon Black);

#commercially available lubricant from TOTAL.

The effect on various mechanical properties of the elastomer compound of the series C are set out in the following tables 20, 21 and 22.

TABLE 20

| Effect on hardness (series C) | |
|---|---|
| Sample | Hardness IRDH (°) |
| C-E13 (inventive) | 79.6 |
| C-E15 (inventive) | 84.9 |
| C-CE19 (comparative) | 75.7 |
| C-E24 (inventive) | 82.8 |

TABLE 21

| Effect on modulus M100 and strength (series C) | | |
|---|---|---|
| Sample | Modulus M100 (MPa) | Strength at break (MPa) |
| C-E13 (inventive) | 6.39 | 13.37 |
| C-E15 (inventive) | 5.001 | 11.45 |
| C-CE20 (comparative) | 3.78 | 7.34 |
| C-E24 (inventive) | 11.63 | 6.09 |

TABLE 22

| Effect on elongation and tear resistance (series C) | | |
|---|---|---|
| Sample | Elongation (%) | Tear resistance/ DELFT (MPa) |
| C-E13 (inventive) | 183.75 | 27.74 |
| C-E15 (inventive) | 229.25 | 31.38 |
| C-CE17 (comparative) | 144.75 | 20 |
| C-E24 (inventive) | 200 | 31.6 |

Example Series D: Elastomer Formulations

Compounding:

Compounding was performed with a method similar to the one described in Example series A.

TABLE 23

| Examples for series D: | | | | |
|---|---|---|---|---|
| Example | D-E9 (inventive) | D-CE25 (comparative) | D-CE26 (comparative) | D-E28 (inventive) |
| EPDM Keltan 2470s (phr) | 100 | 100 | 100 | 100 |
| Powder 9 (phr) | 100 | | | |
| Powder 25 (phr) | | 100 | | |
| Powder 26 (phr) | | | 100 | |
| Powder 28 (phr) | | | | 100 |
| Torilis 6200 (phr)-paraffinic oil | 20 | 20 | 20 | 20 |
| Active ZnO (phr) | 5 | 5 | 5 | 5 |
| Tinuvin P (UV protector) (phr) | 2.5 | 2.5 | 2.5 | 2.5 |
| Riowax 54/56 (paraffinic wax) (phr) | 3 | 3 | 3 | 3 |
| Dicup 40 (peroxide) (phr) | 7 | 7 | 7 | 7 |
| Rhenogram TAC-50 (phr) | 2 | 2 | 2 | 2 |

NB: all amounts in phr by weight;

The effect on the mechanical properties—tensile tests—and on various other mechanical properties of the elastomer compound of the series A are set out in the following tables 24 and 25.

TABLE 24

| Effect on Mechanical properties-tensile tests | | | |
|---|---|---|---|
| Example | M100 modulus at 100% elongation (MPa) | M300 modulus at 300% elongation (MPa) | Strength at break (MPa) |
| D-E9 (inventive) | 2.5 | 8.4 | 8.6 |
| D-CE25 (comparative) | 2.6 | 5 | 10.2 |
| D-CE26 (comparative) | 1 | 1.6 | 7 |
| D-E28 (inventive) | 3.7 | 7.3 | 7.3 |

TABLE 25

| Effect on various properties of the elastomer compound | | | |
|---|---|---|---|
| Example | Hardness Shore A | Tear resistance/ DELFT (MPa) | Compression set 72 h-100° C. (%) |
| D-E9 (inventive) | 66.8 | 24 | 8 |
| D-CE25 (comparative) | 70 | n.d. | 34 |
| D-CE26 (comparative) | 55.4 | 12 | 8 |
| D-E28 (inventive) | 78.2 | 34 | 14 |

n.d. = not determined

Examples Series E: Tire Tread Sulfur-Cured SBR Formulations

Step 1: Internal Mixing

As a first step, batches of SBR rubber and filler were mixed in a 2 L Banbury internal mixer according to the mixing procedure shown in Table 26 below. The temperature was set at 4000 at the beginning of each mixing, and the temperature raised up to 15000 during the process the temperature, depending on the filler being incorporated.

TABLE 26

| Internal mixing procedure. | | |
|---|---|---|
| Time (min:s) | Operation | Speed (rpm) |
| t = 00:00 | Introduction of SBR rubber | 50 |
| t = 00:30 | Addition of the filler + 1/3 powder 29 | 50 |
| t = 01:45 | Addition of 2/3 of powder 29 + Torilis 6200 (phr) − paraffinic oil | 50 |
| t = 02:45 | Addition of the curing system (sulfur and accelerators) | 50 |
| t = 04:15 | Ramp cleaning | adjusted |
| t = 06:30 | Dumping of the compound | adjusted |

Step 2: External Mixing

For the second step, mixing with the curing system was performed on an external mixer Agila (300×400). All the elastomer precursors were mixed with the same times, cylinder speeds, and cylinder spacing. The cooling system was set to 40° C. and the metal guides were set as to allow the elastomer precursor to occupy 70% of the cylinder surface. The detail proceedings for this process are described in Table 27 below.

TABLE 27

| External mixing procedure. | | |
|---|---|---|
| Time (min:s) | Operation | Cylinder Spacing (mm) |
| t = 00:00 | Introduction of the mix from Step 1 | 1 |
| t = 01:30 | Insertion of the curing system (sulfur and accelerators) | 1 |
| t = 06:00 | 3 thin passes | 0.5 |
| | Calendering sheet, thickness 2 mm | 2 |

Step 3—Compression Molding

Sheets of the elastomer composition were produced by compression molding at 160° C. or 180° C. and 100 kg/cm$^2$ pressure. This way, small 300×300×2 mm plates were made. The curing time, which determines the molding time, was determined through a rheological MDR test.

The following elastomer compositions of Tables 28 and 29 were obtained following the method described above. All elastomer compositions had an isovolumic amount of fillers. The amount of filler was adjusted to match the volume occupied by 40 phr carbon black (powder 29), depending on the density of the filler (indicated in Tables 28 and 29 with an asterisk).

TABLE 28

| SBR elastomer compositions (phr: parts per hundred). | | | | | | |
|---|---|---|---|---|---|---|
| Example | E-CE31 (comparative) | D-E32 (Inventive) | D-E33 (Inventive) | D-E35 (Inventive) | D-E36 (Inventive) | D-CE30 (comparative) |
| SRB - Buna VSL-2538-2 (phr) | 137.5 | 137.5 | 137.5 | 137.5 | 137.5 | 137.5 |
| Powder 31 | 55.6* | | | | | |
| Powder 32 | | 58.4* | | | | |
| Powder 33 | | | 55.8* | | | |
| Powder 35 | | | | 44.9* | | |
| Powder 36 | | | | | 47.8* | |
| Powder 29 | 40 | 40 | 40 | 40 | 40 | 40 |
| Powder 30 | | | | | | 61.1* |
| Vivatec 500/plasticizer (phr) | 16 | 16 | 16 | 16 | 16 | 16 |
| Protector - 6PPD (phr) | 2 | 2 | 2 | 2 | 2 | 2 |
| Protector - Antilux 500 (phr) | 2 | 2 | 2 | 2 | 2 | 2 |
| ZnO - Silox actif (phr) | 3 | 3 | 3 | 3 | 3 | 3 |
| Stearic acid - TP2 (phr) | 1.5 | 1.5 | 1.5 | 1.5 | 1.5 | 1.5 |
| Sulfur (phr) | 2 | 2 | 2 | 2 | 2 | 2 |
| CBS (phr) | 1 | 1 | 1 | 1 | 1 | 1 |
| MTBS (phr) | 0.5 | 0.5 | 0.5 | 0.5 | 0.5 | 0.5 |

TABLE 29

SBR elastomer compositions (phr: parts per hundred)

| Example | E-E10 (Inventive) | E-E38 (Inventive) | E-E37 (Inventive) |
|---|---|---|---|
| SRB-Buna VSL-2538-2 (phr) | 137.5 | 137.5 | 137.5 |
| Powder 10 | 57.7* | | |
| Powder 38 | | 57.1* | |
| Powder 37 | | | 58.2* |
| Powder 29 | 40 | 40 | 40 |
| Powder 30 | | | |
| Vivatec 500/plasticizer (phr) | 16 | 16 | 16 |
| Protector-6PPD (phr) | 2 | 2 | 2 |
| Protector-Antilux 500 (phr) | 2 | 2 | 2 |
| ZnO-Silox actif (phr) | 3 | 3 | 3 |
| Stearic acid-TP2 (phr) | 1.5 | 1.5 | 1.5 |
| Sulfur (phr) | 2 | 2 | 2 |
| CBS (phr) | 1 | 1 | 1 |
| MTBS (phr) | 0.5 | 0.5 | 0.5 |

The obtained elastomer compositions had the following mechanical properties compiled in Table 30 below.

TABLE 30

Effect on mechanical properties (series D).

| Sample | M100 Modulus (MPa) | Shore A Hardness | Compression set (%) | Tear resistance/ DELFT (N) |
|---|---|---|---|---|
| E-CE31 (Comparative) | 1.9 | 39.2 | 12 | 23 |
| E-E32 (Inventive) | 3.3 | 55.7 | 14 | 28 |
| E-E33 (Inventive) | 1.9 | 54.8 | 12 | 27 |
| E-E35 (Inventive) | 1.8 | 53.8 | 11 | 22 |
| E-E36 (Inventive) | 1.8 | 49.8 | 9 | 28 |
| E-CE30 (Comparative) | 0.8 | 39.2 | 24 | 17 |
| E-E10 (Inventive) | 0.8 | 40.4 | 24 | 23 |
| E-E38 (Inventive) | 0.8 | 40.4 | 15 | 20 |
| E-E37 (Inventive) | 3.7 | 56.4 | 12 | 30 |

Examples Series F: EPDM Elastomer Formulations

Step 1—Internal Mixing

As a first step, each batch was mixed in a 2 L Banbury internal mixer. The temperature was set at 4000 at the beginning of each mixing, during the process the temperature raised up to 15000 depending on the filler being incorporated. The following process had been used for each batch (Table 31):

TABLE 31

Internal mixing procedure.

| Time (min:s) | Operation | Speed (rpm) |
|---|---|---|
| t = 00:00 | Introduction of EPDM | 50 |
| t = 00:50 | Addition of the filler | 50 |
| t = 02:30 | Addition of 2/3 of Powder 17 | 50 |
| t = 05:30 | Addition of 1/3 of Powder 17 + paraffinic oil | 50 |
| t = 06:30 | Ram cleaning | 50 |
| t = 08:30 | Dropping | 50 |

Step 2—External Mixing

For the second step, mixing with the peroxide crosslinking agent was performed on a cylinder mixer (300×700). All the elastomer precursors were mixed with the same times, cylinder speeds, and cylinder spacing. The cooling system was set to 4000 and the metal guides were set as to allow the elastomer precursor to occupy 70% of the cylinder surface. The detail proceedings for this process are described in Table 32 below.

TABLE 32

External mixing procedure.

| Time (min: s) | Operation | Cylinder Spacing (mm) |
|---|---|---|
| t = 00:00 | Introduction of the mix from Step 1 | 2.5 |
| t = 01:30 | Insertion of the crosslinking system | 2.5 |
| t = 06:00 | 3 thin passes | 0.5 |
| | Calendering sheet, thickness 2 mm | 2 |

Step 3—Compression Molding

Sheets of the elastomer composition were produced by compression molding at 180° C. and 200 bar pressure. This way, small 300×300×2 mm plates were made. The curing time, which determines the molding time, was determined through a rheological test in MDR. The T98 was taken as time of curing for the press plates. The fabrication of the compression set test specimens was done with the same procedure, meaning by compression molding. The curing time used was the addition of 10 min to the T98 as the thickness of these test specimens is higher than the press plates.

EPDM Elastomer Compositions

The following elastomer compositions of Table 33 were obtained following the method described above. All elastomer compositions had an isovolumic amount of fillers. All fillers were coupled 50/50% with carbon black in volume. Therefore, the carbon black reference batch contains 100 phr of N550. The other batches contain 50 phr of N550 and a slightly variable amount of mineral filler in function of their density, in order to have an amount of mineral filler equivalent to the volume of 50 phr of carbon black (indicated in Table 33 with an asterisk).

TABLE 33

| EPDM elastomer compositions | | | | | | | |
|---|---|---|---|---|---|---|---|
| Example | F-CE17 (Comparative) | F-CE39 (Comparative) | F-E40 (inventive) | F-E42 (Inventive) | F-CE43 (Comparative) | F-CE21 (Comparative) | F-E44 (Inventive) |
| EPDM Vistalon 2504N from Exxon Mobil (phr) | 100 | 100 | 100 | 100 | 100 | 100 | 100 |
| Carbon black - N550 (Powder 17) | 100 | 50 | 50 | 50 | 50 | 50 | 50 |
| Powder 39 | | 76.4* | | | | | |
| Powder 40 | | | 72.2* | | | | |
| Powder 8 | | | | 60.8* | | | |
| Powder 9 | | | | | 61.4* | | |
| Powder 21 | | | | | | 80* | |
| Powder 44 | | | | | | | 71.9* |
| Powder 45 | | | | | | | |
| Torilis 6200 plasticizer (phr) | 10 | 10 | 10 | 10 | 10 | 10 | 10 |
| Peroxide DC40 crosslinking agent (phr) | 7 | 7 | 7 | 7 | 7 | 7 | 7 |
| Rhenogran TAC 50% crosslinking coagent (phr) | 2 | 2 | 2 | 2 | 2 | 2 | 2 |

The obtained elastomer compositions had the properties set out in the following Tables 34, 35 and 36:

TABLE 34

| Shore A hardness of the elastomer compositions. | |
|---|---|
| Sample | Hardness (Shore A) |
| F-CE17 (comparative) | 79.1 |
| F-CE39 (comparative) | 84.3 |
| F-E40 (Inventive) | 86.1 |
| F-E42 (Inventive) | 83.1 |
| F-CE43 (Comparative) | 81.4 |
| F-CE21 (Comparative) | 78.1 |
| F-E44 (Inventive) | 84.2 |

TABLE 35

| Effect on tensile modulus (M50-modulus at 50% elongation) | |
|---|---|
| Sample | M50 (MPa) |
| F-CE17 | 3.7 |
| F-CE39 | 4.7 |
| F-E40 | 6.1 |
| F-E42 | 4.4 |
| F-CE43 | 3.5 |
| F-CE21 | 2.8 |
| F-E44 | 5.8 |

TABLE 36

| Effect on compression set | |
|---|---|
| Sample | Compression set (%) |
| F-CE17 | 7 |
| F-CE39 | 14 |
| F-E40 | 7 |
| F-E42 | 8 |
| F-CE43 | 19 |
| F-CE21 | 20 |
| F-E44 | 8 |

The invention claimed is:

1. A composition formed from a calcium or magnesium carbonate-comprising material selected from among sedimentary ground calcium carbonate, precipitated calcium carbonate, precipitated hydromagnesite and mixtures thereof, and excluding surface-reacted calcium carbonate, and from 0.5 to 20 wt.-%, based on the total weight of the calcium or magnesium carbonate-comprising material, of a surface-treatment composition comprising at least one cross-linkable compound, wherein the cross-linkable compound is at least one grafted polymer comprising at least one succinic anhydride group obtained by grafting maleic anhydride onto a copolymer comprising butadiene units and styrene units.

2. The composition according to claim 1, wherein the sedimentary ground calcium carbonate is selected from the group consisting of marble, limestone, dolomite, chalk and mixtures thereof, or the precipitated calcium carbonate is selected from the group consisting of the aragonitic, vateritic and calcitic mineralogical crystal forms, colloidal precipitated calcium carbonate, and mixtures thereof.

3. The composition according to claim 1, wherein the calcium carbonate-comprising material is sedimentary ground calcium carbonate and/or precipitated calcium carbonate and has i) a weight median particle size $d_{50}$ value measured by the sedimentation method in the range from 0.1 μm to 10 μm, and/or ii) a top cut ($d_{98}$) measured by the sedimentation method of ≤45 μm, and/or iii) a BET specific surface area of from 0.5 to 150 $m^2/g$ as measured using nitrogen and the BET method according to ISO 9277:2010, and/or iv) a residual total moisture content of ≤2 wt.-%, based on the total dry weight of the at least one calcium carbonate-comprising material.

4. The composition according to claim 1, wherein the magnesium carbonate-comprising material is precipitated hydromagnesite and has i) a volume median particle size $d_{50}$ from 0.1 to 75 μm, and/or ii) a volume top cut particle size $d_{98}$ from 0.2 to 150 μm, and/or iii) a BET specific surface area of from 15 $m^2/g$ to 200 $m^2/g$, measured using nitrogen and the BET method.

5. The composition according to claim 1, wherein the at least one grafted polymer is a grafted polybutadiene-styrene copolymer comprising at least one succinic anhydride group obtained by grafting maleic anhydride onto a polybutadiene-styrene copolymer and having a 1,2 vinyl content from 20 to 80 mol.-%, based on the total weight of the grafted polybutadiene-styrene copolymer.

6. The composition according to claim 1, wherein the composition is formed in that the at least one calcium or magnesium carbonate-comprising material and the at least one cross-linkable compound are provided as physical mixture and/or in that the at least one calcium or magnesium carbonate-comprising material is contacted with the at least one cross-linkable compound such that a treatment layer comprising the at least one cross-linkable compound and/or salty reaction products thereof is formed on the surface of the at least one calcium or magnesium carbonate-comprising material.

7. The composition according to claim 1, wherein the surface-treatment composition comprises at least one further surface-treatment agent selected from the group consisting of I) a phosphoric acid ester blend of one or more phosphoric acid mono ester and/or salts thereof and/or one or more phosphoric acid di-ester and/or salts thereof, and/or
II) at least one saturated or unsaturated aliphatic linear or branched carboxylic acid and/or salts thereof and/or
III) at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or
IV) at least one polydialkylsiloxane, and
V) mixtures of one or more materials according to I) to IV).

8. A dry process for the preparation of a composition according to claim 1, the process comprises at least the steps of:

a) providing the calcium or magnesium carbonate-comprising material;
b) providing the at least one cross-linkable compound in an amount from 0.1 to 10 $mg/m^2$, based on the total weight of the calcium or magnesium carbonate-comprising material,
c) optionally providing at least one further surface-treatment agent selected from the group consisting of:
  I) a phosphoric acid ester blend of one or more phosphoric acid mono ester and/or salts thereof and/or one or more phosphoric acid di-ester and/or salts thereof, and/or
  II) at least one saturated or unsaturated aliphatic linear or branched carboxylic acid and/or salts thereof and/or
  III) at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or
  IV) at least one polydialkylsiloxane, and
  V) mixtures of one or more materials according to I) to IV),
d) optionally heating the at least one cross-linkable compound, and
e) contacting the calcium or magnesium carbonate-comprising material under mixing, in one or more steps, with the at least one cross-linkable compound,
f) if present, heating the at least one further surface-treatment agent to its melting point or above such that a molten surface-treatment agent is obtained and contacting the calcium or magnesium carbonate-comprising material under mixing, in one or more steps, with the molten surface-treatment agent simultaneously or subsequently to the at least one cross-linkable compound.

9. A curable elastomer mixture comprising a) an elastomer resin, and
b) from 5 to 300 wt.-%, based on the total weight of the elastomer resin, of the composition according to claim 1, wherein the composition is dispersed in the elastomer resin.

10. The curable elastomer mixture according to claim 9, wherein the elastomer resin is selected from natural or synthetic rubber.

11. The curable elastomer mixture according to claim 9, wherein the mixture further comprises additives.

12. A cured elastomer product formed from the curable elastomer mixture of claim 11.

13. A process for preparing a cured elastomer product as defined in claim 12, wherein the process comprises the steps of a) providing the elastomer resin,
b) providing from 5 to 300 wt.-%, based on the total weight of the elastomer resin, of the at least one calcium or magnesium carbonate-comprising material as filler,
  c) providing from 0.1 to 10 $mg/m^2$, based on the total weight of the calcium or magnesium carbonate-comprising material, of the at least one cross-linkable compound,
d) optionally providing at least one further surface-treatment agent selected from the group consisting of
  I) a phosphoric acid ester blend of one or more phosphoric acid mono ester and/or salts thereof and/or one or more phosphoric acid di-ester and/or salts thereof, and/or
  II) at least one saturated or unsaturated aliphatic linear or branched carboxylic acid and/or salts thereof and/or
  III) at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or
  IV) at least one polydialkylsiloxane, and
  V) mixtures of one or more materials according to I) to IV),
e) optionally providing further additives,
f) contacting the components of step a), step b), step c) and optionally step d) and step e) in any order, and
g) curing the mixture obtained in step f) such that a cured elastomer product is formed.

14. An article formed from a cured elastomer product according to claim 12, wherein the article is selected from the group consisting of tubeless articles, membranes, sealings, gloves, pipes, cable, electrical connectors, oil hoses, shoe soles, O-ring seals, shaft seals, gaskets, tubing, valve stem seals, fuel hose, tank seals, diaphragms, flexi liners for pumps, mechanical seals, pipe coupling, valve lines, military flare blinders, electrical connectors, fuel joints, roll covers, firewall seals, and clips for jet engines.

15. The process according to claim 13, wherein in contacting step f) firstly the at least one calcium or magnesium carbonate-comprising material of step b) is contacted under mixing, in one or more steps, with the at least one cross-linkable compound of step c) and, if present, subsequently or simultaneously, with the at least one further surface-treatment agent of step d) such that a surface treatment layer comprising the at least one cross-linkable compound and/or salty reaction product(s) thereof and optionally the at least one further surface-treatment agent and/or salty reaction product(s) thereof is/are formed on the surface of said at least one calcium or magnesium carbonate-comprising material of step b), and secondly this surface-treated calcium or magnesium carbonate-comprising material is contacted under mixing, in one or more steps, with the elastomer resin of step a).

16. The process according to claim 15, wherein the further additives of step e) are contacted under mixing, in one or more steps, with the surface-treated calcium or magnesium carbonate-comprising material before or after, the surface-treated calcium or magnesium carbonate-comprising material is contacted under mixing, in one or more steps, with the elastomer resin of step a).

17. The process according to claim 13, wherein contacting step f) is carried out during curing step g) in that the at least one cross-linkable compound is contacted under mixing with the elastomer resin of step a) before or after adding the at least one calcium or magnesium carbonate-comprising material.

18. The composition according to claim 1, wherein the calcium or magnesium carbonate-comprising material is the calcium carbonate-comprising material having a BET specific surface area of from 0.5 to 14.4 $m^2/g$ as measured using nitrogen and the BET method according to ISO 9277:2010.

19. A method comprising compounding an elastomer formed from an elastomer resin and at least one filler comprising the composition of claim 1, to increase the mechanical properties of such a compounded elastomer in comparison to the same elastomer formed from the same elastomer resin and at least one calcium or magnesium carbonate-comprising material but without the at least one cross-linkable compound.

* * * * *